Aug. 14, 1951     P. R. HOOPES     2,563,839
PROCESS AND APPARATUS FOR MANUFACTURING
INLAID SOAP AND THE LIKE
Filed Aug. 27, 1945     28 Sheets-Sheet 5

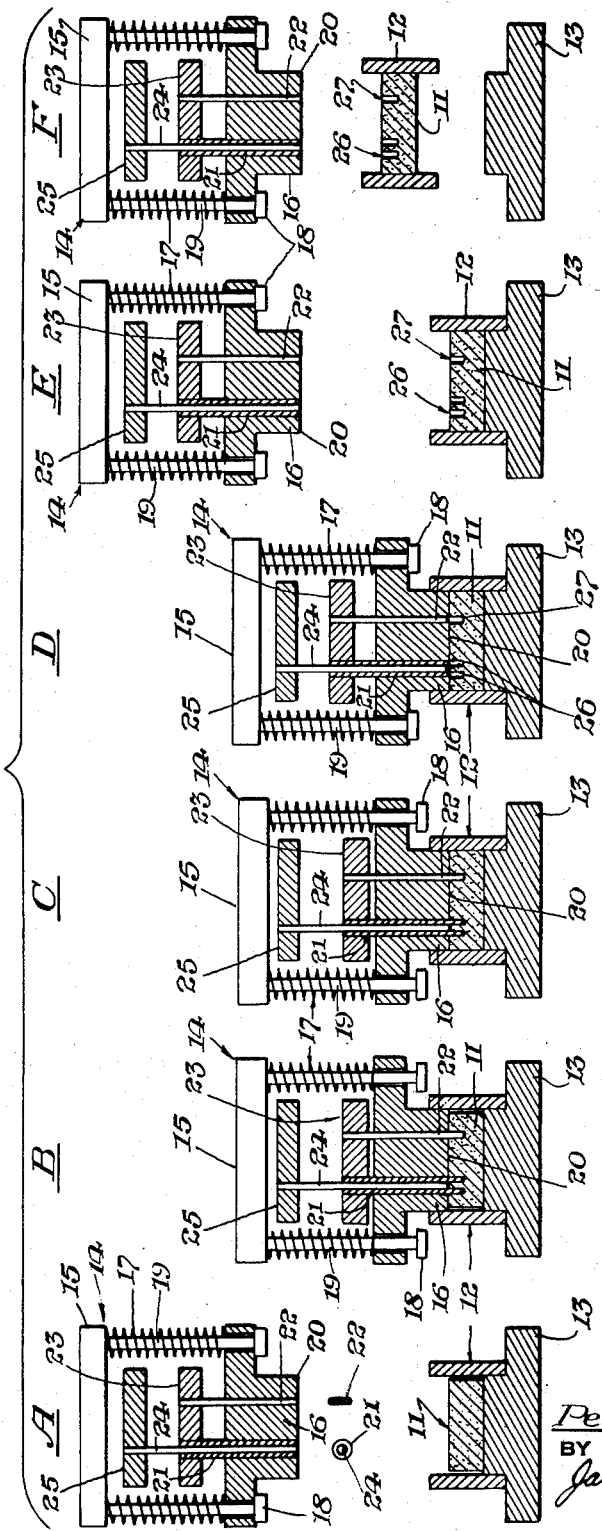

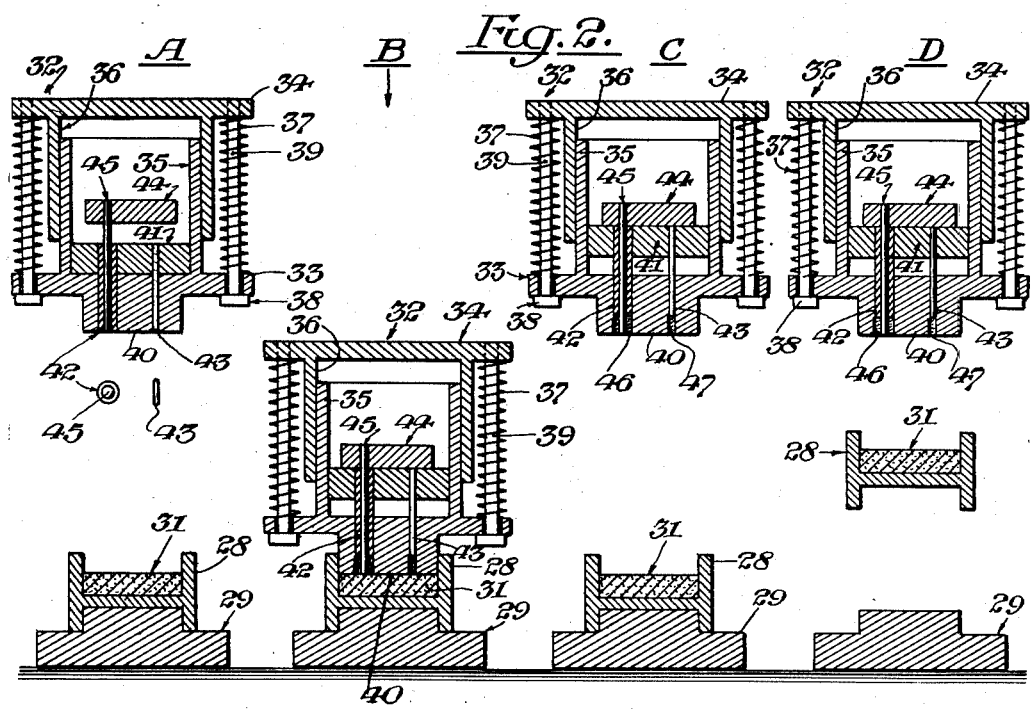
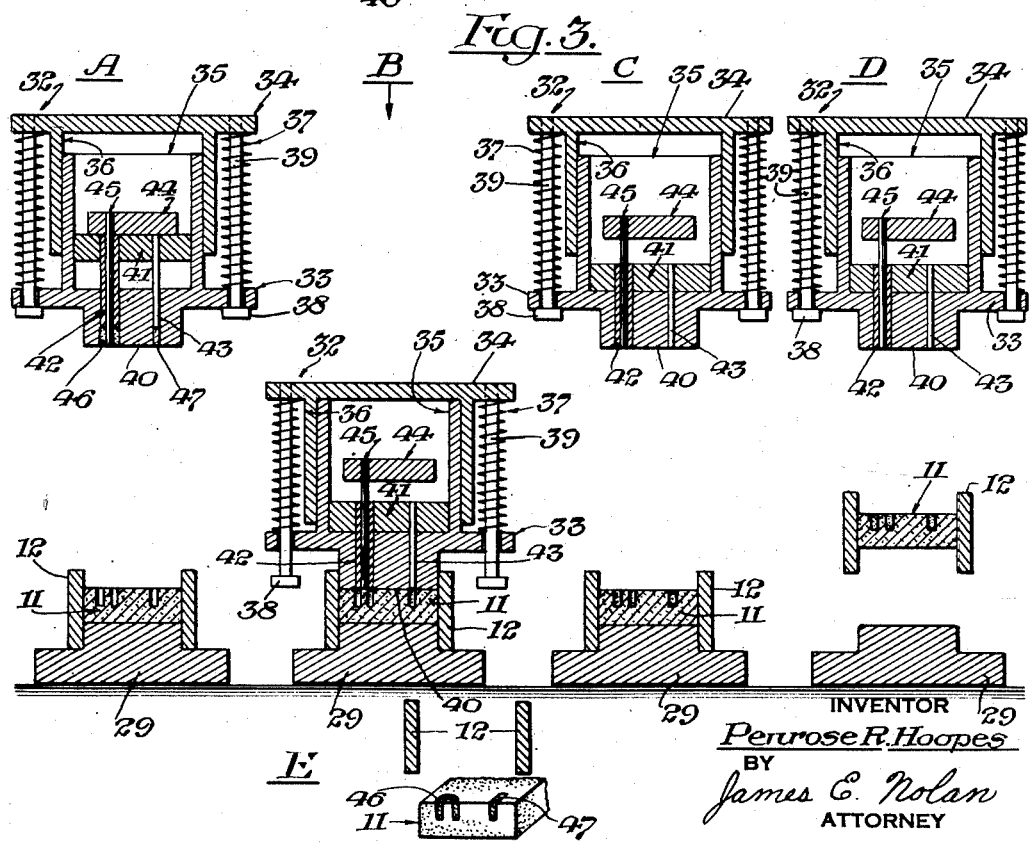

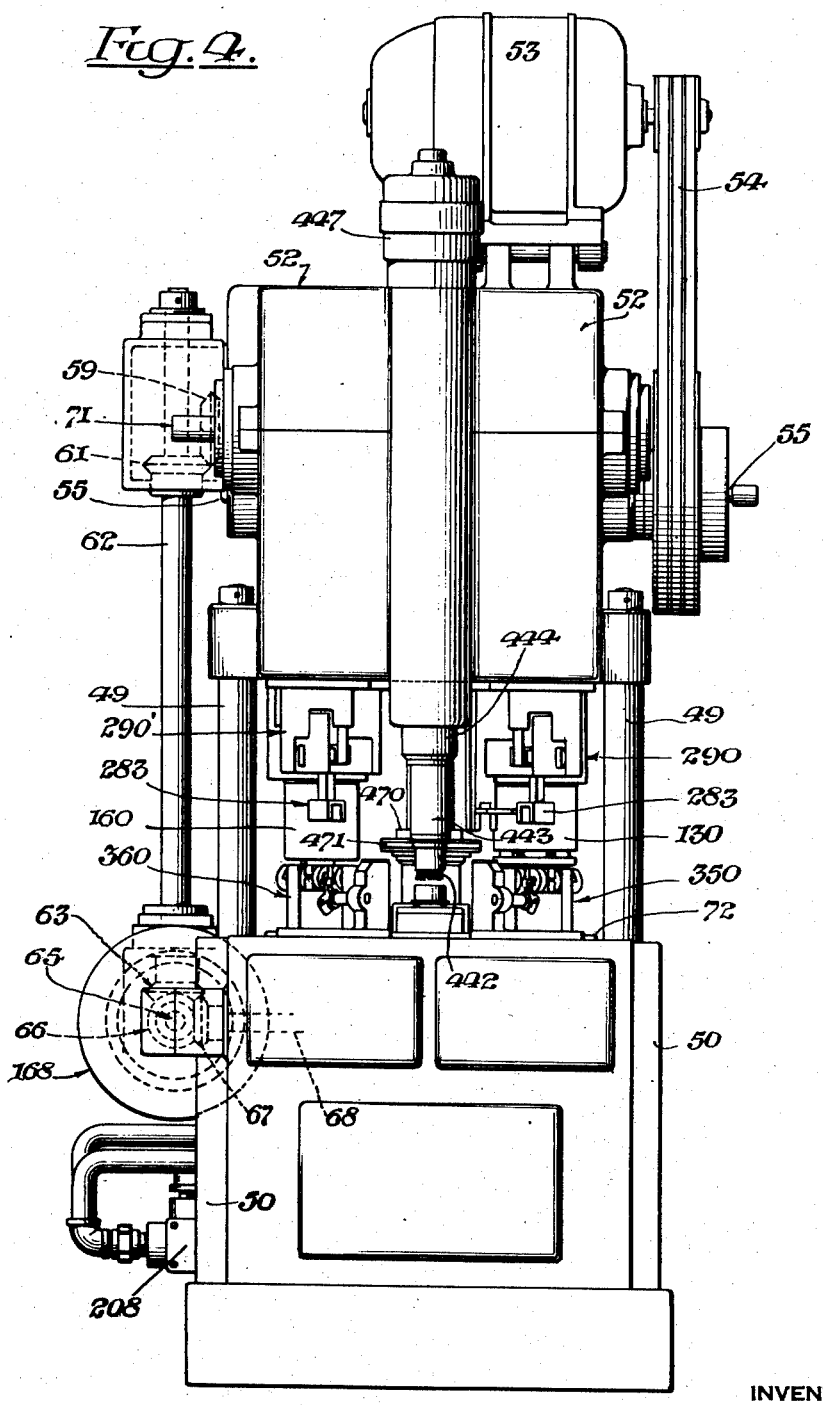

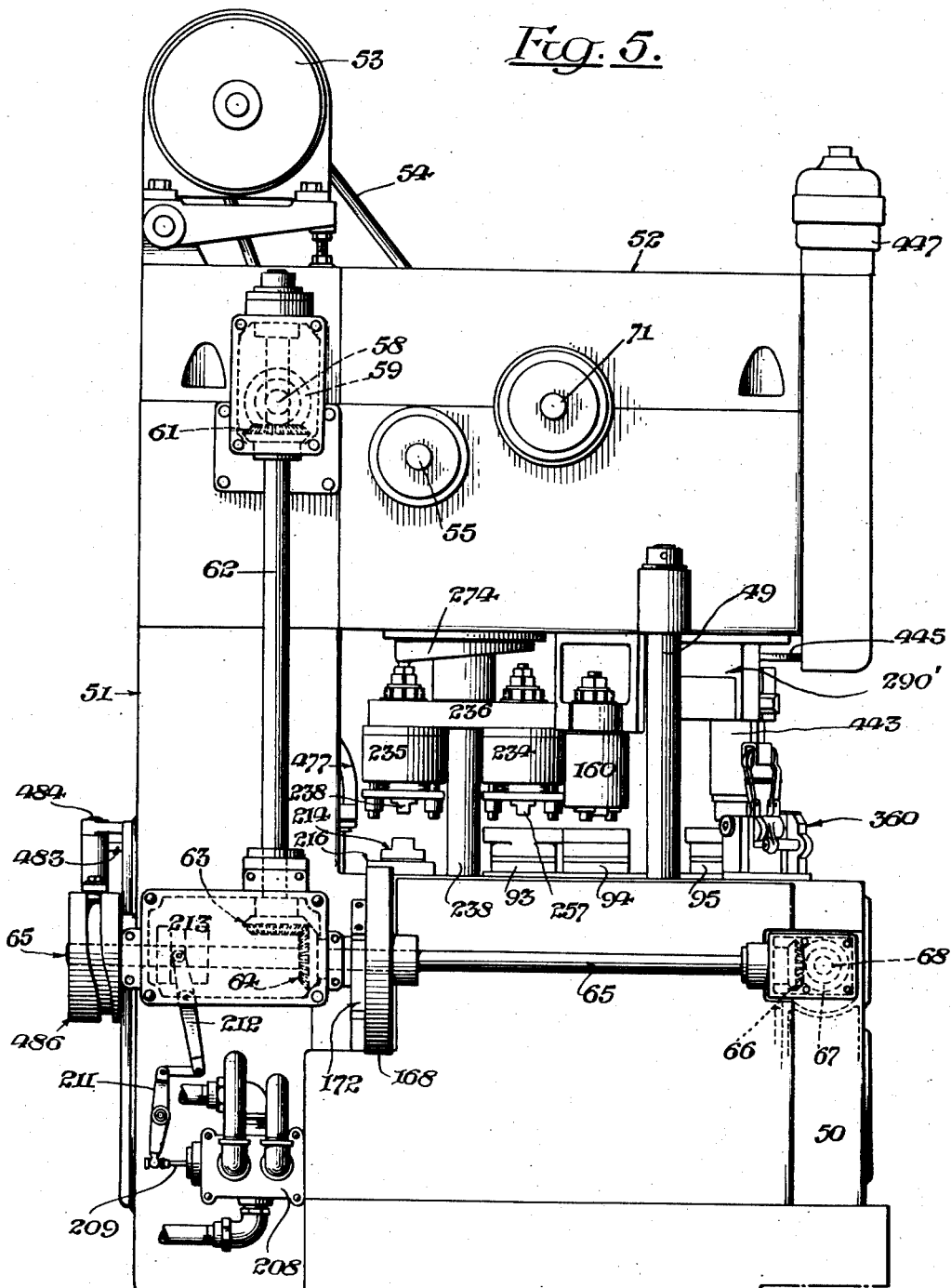

Fig. 6.

INVENTOR
Penrose R. Hoopes.
BY
James E. Nolan
ATTORNEY

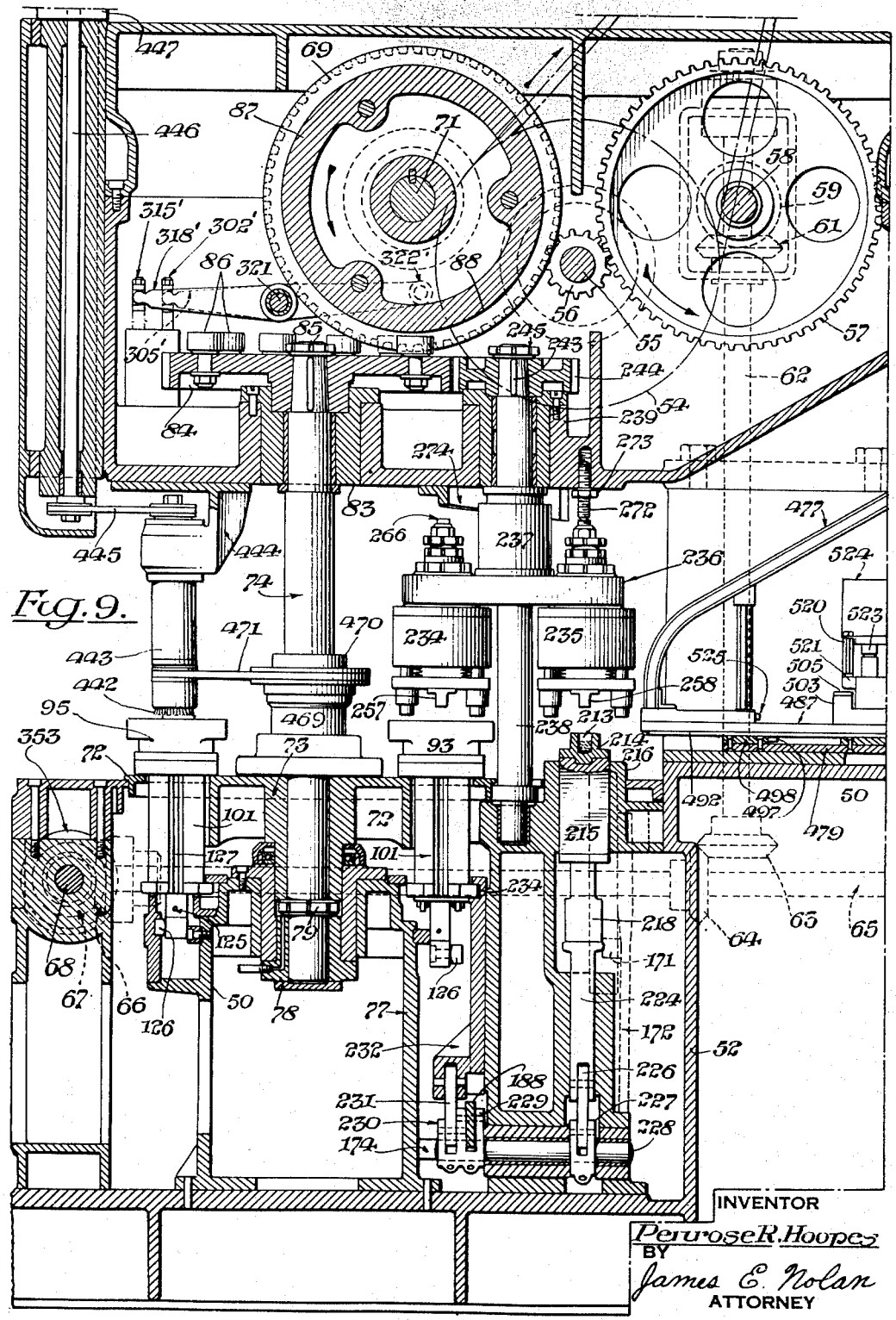

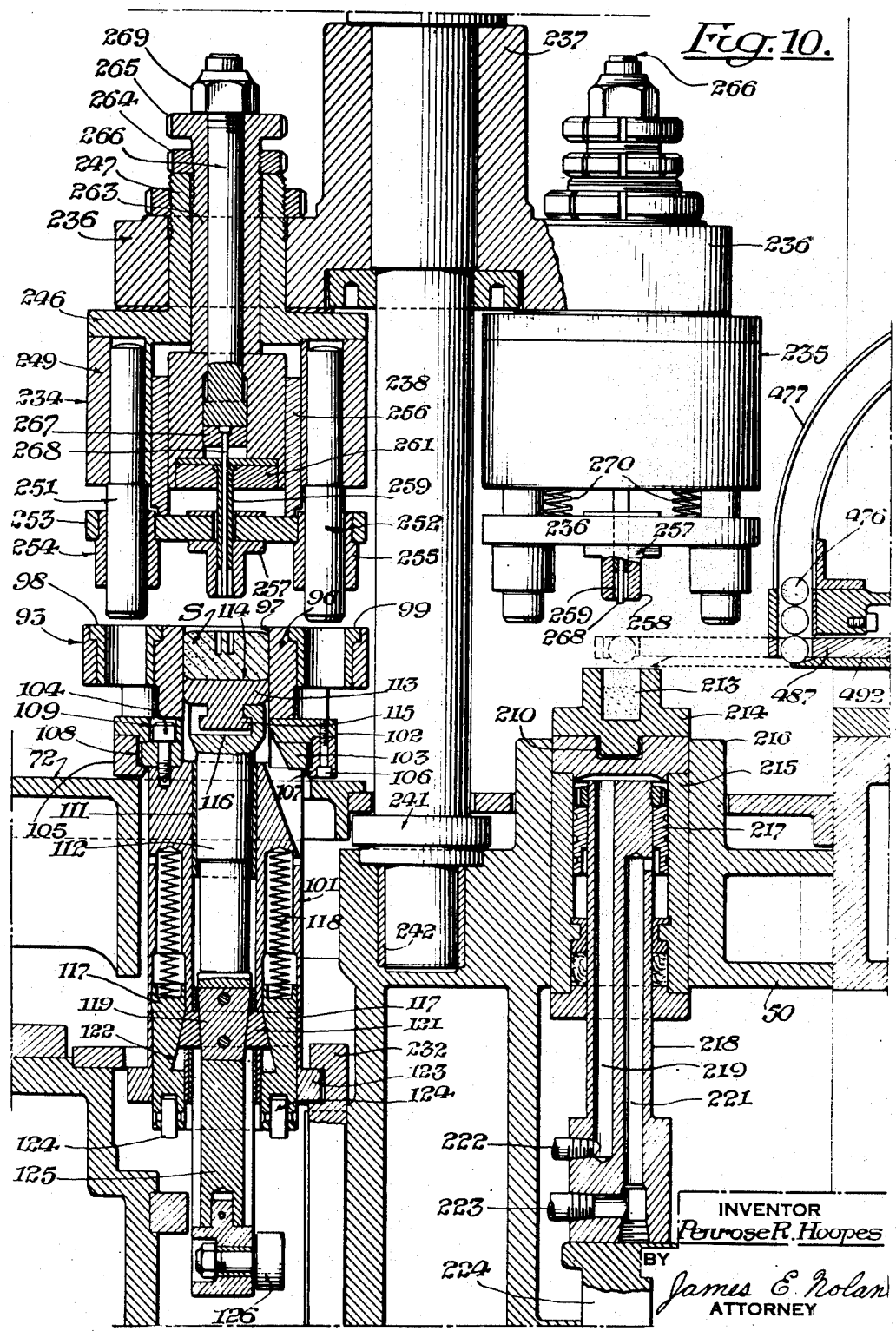

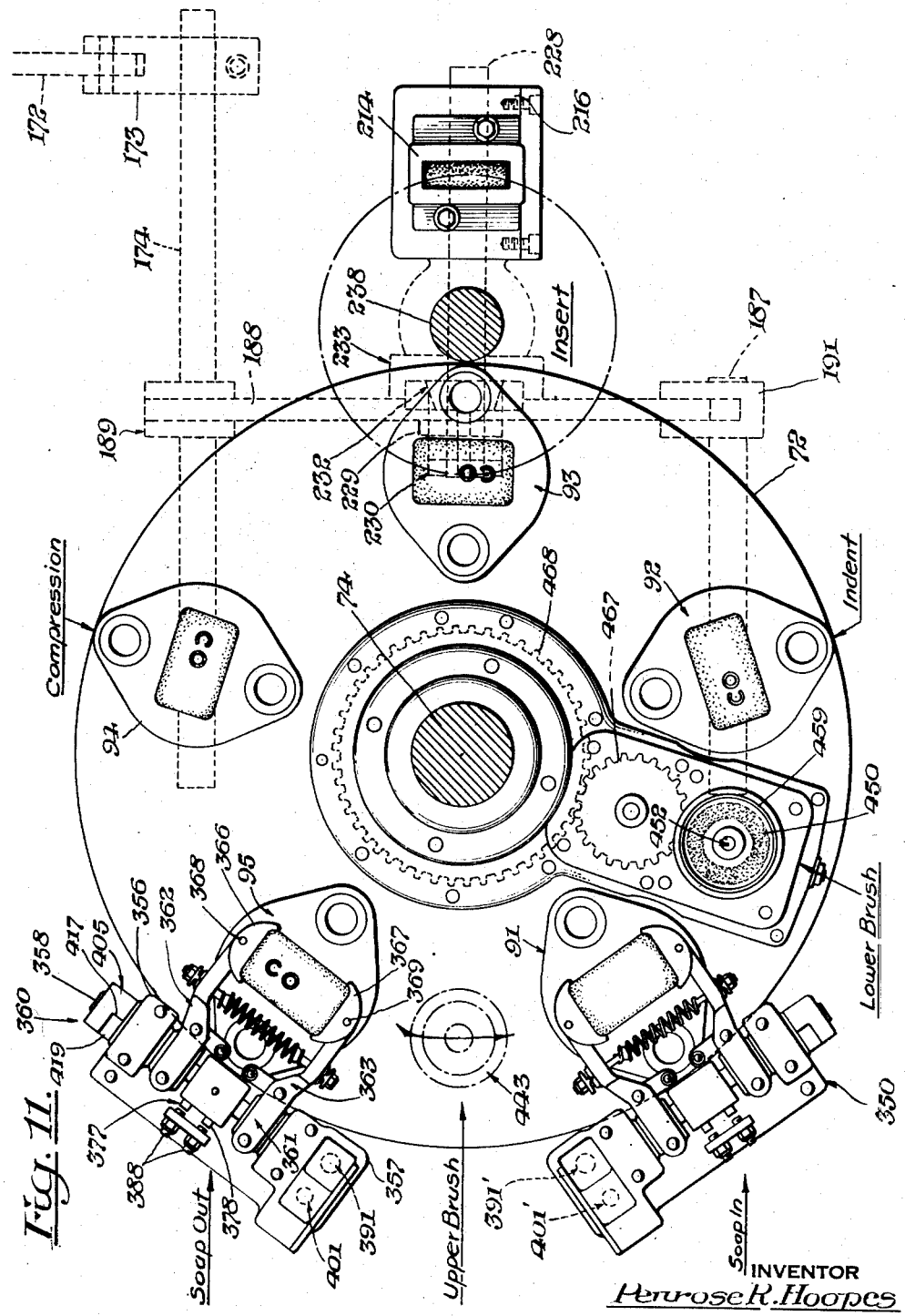

Aug. 14, 1951 P. R. HOOPES 2,563,839
PROCESS AND APPARATUS FOR MANUFACTURING
INLAID SOAP AND THE LIKE
Filed Aug. 27, 1945 28 Sheets-Sheet 11

INVENTOR
Penrose R. Hoopes
BY
James E. Nolan
ATTORNEY

Aug. 14, 1951 P. R. HOOPES 2,563,839
PROCESS AND APPARATUS FOR MANUFACTURING
INLAID SOAP AND THE LIKE
Filed Aug. 27, 1945 28 Sheets-Sheet 12

INVENTOR
Penrose R. Hoopes
BY
James E. Nolan
ATTORNEY

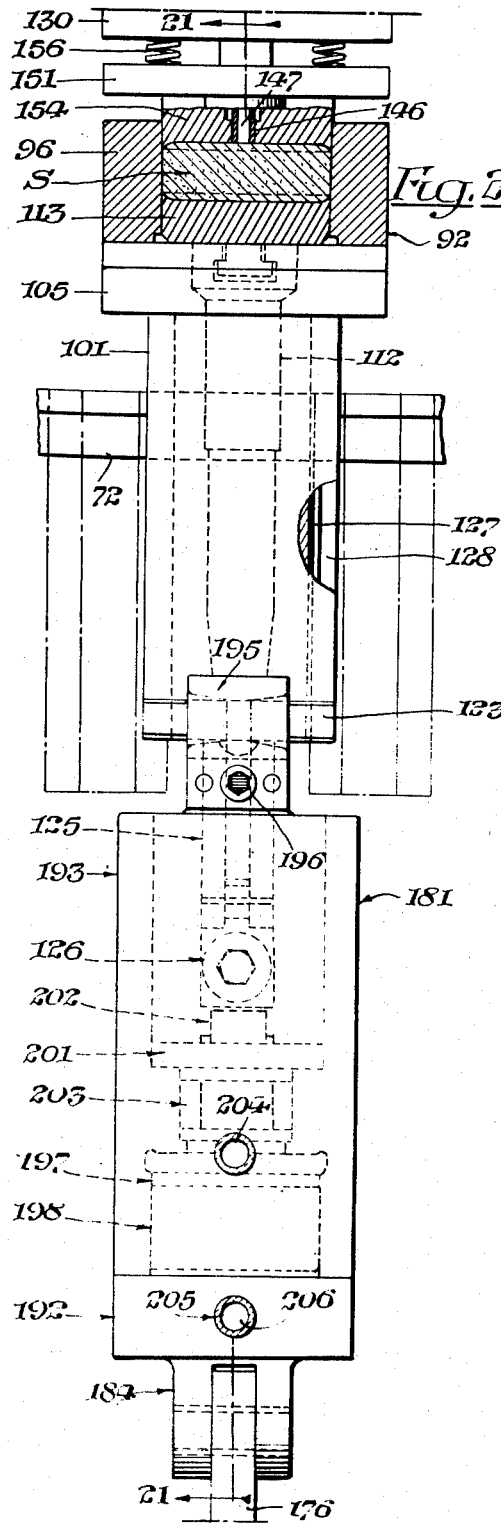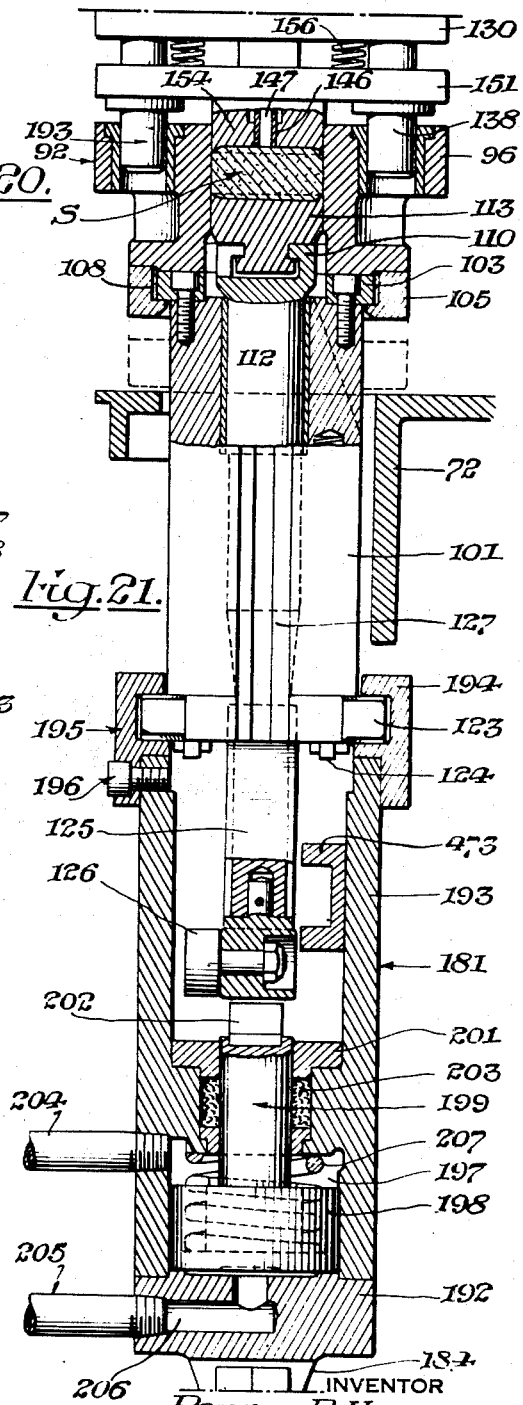

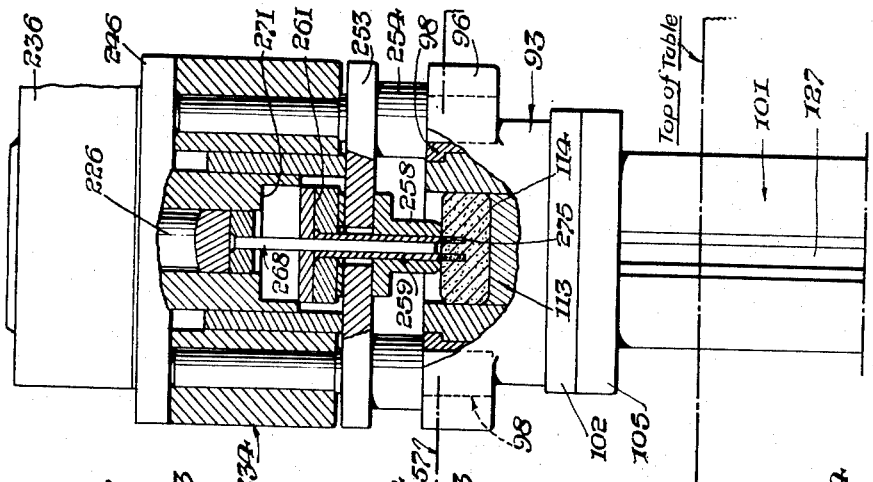
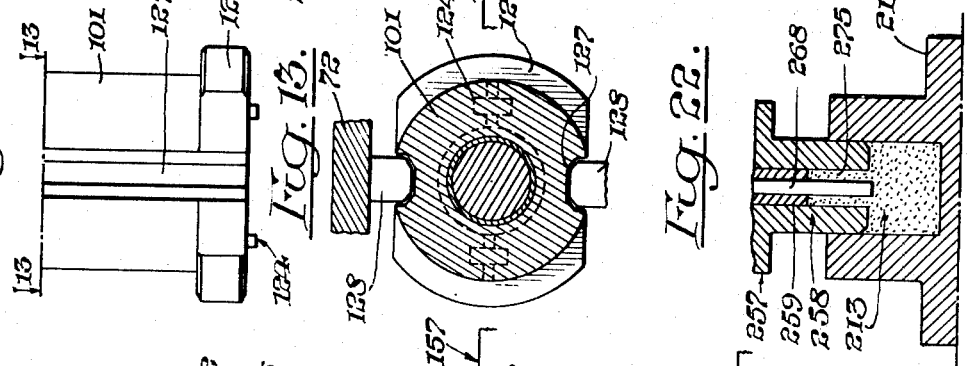
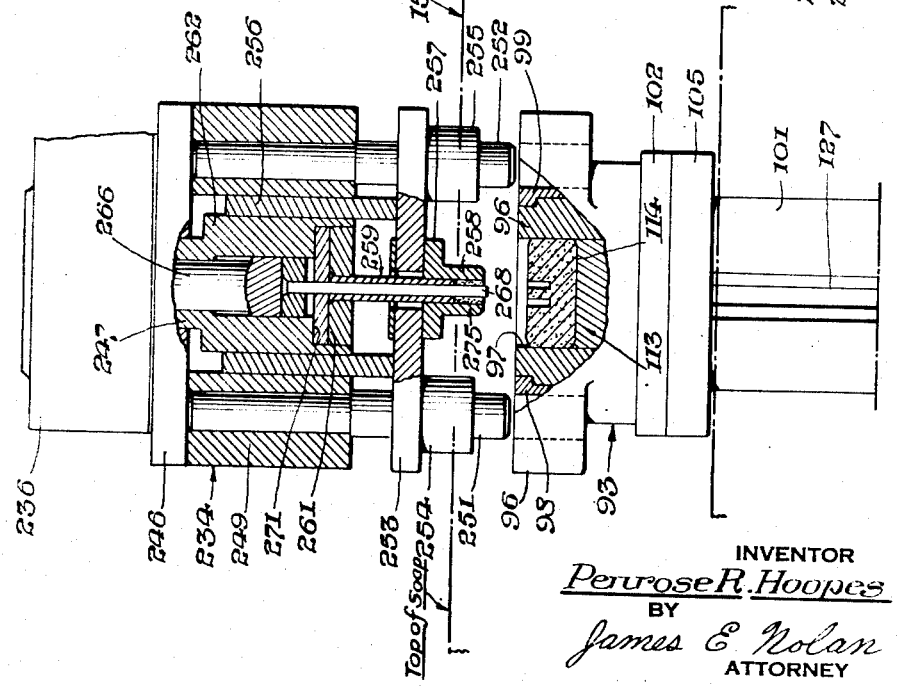

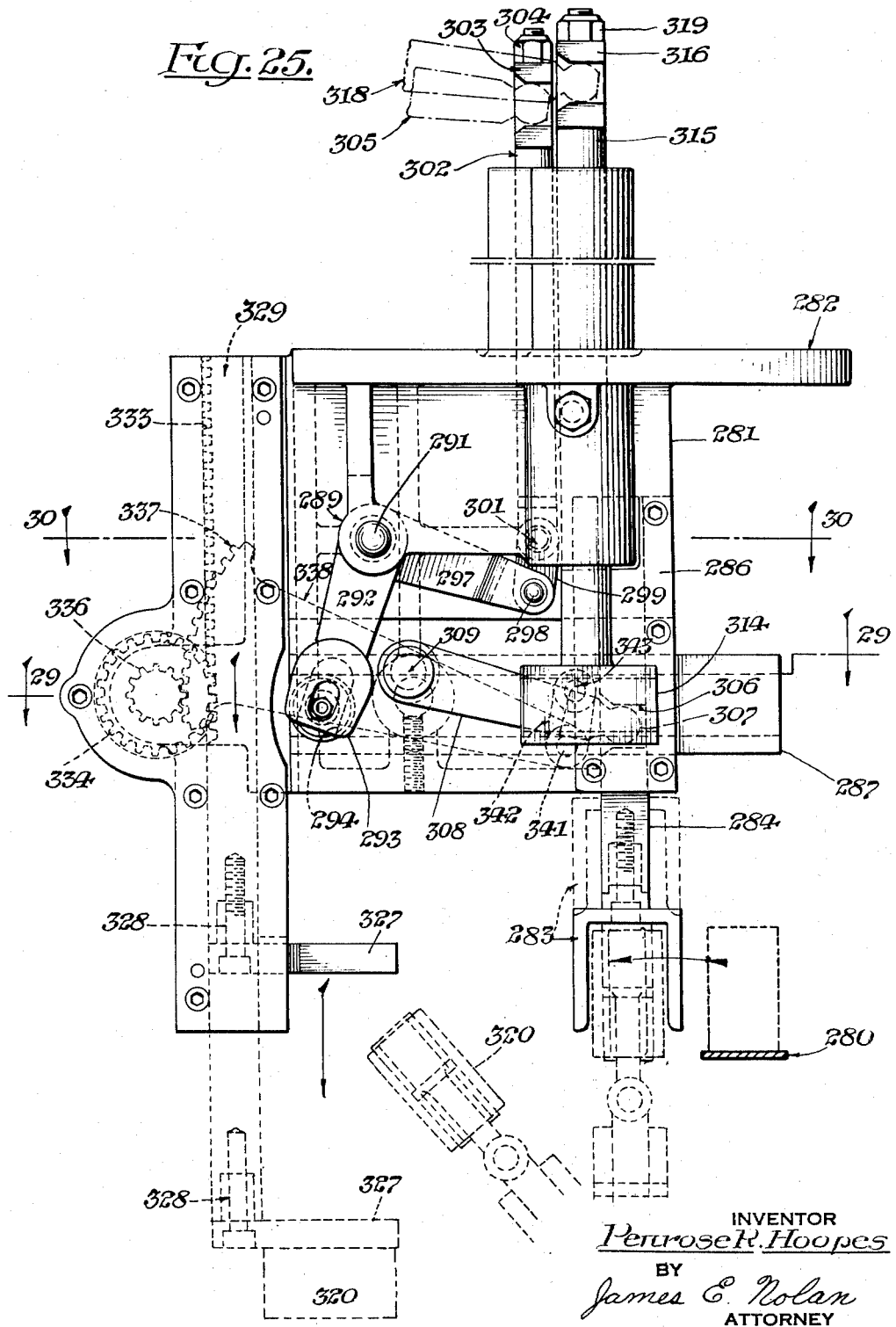

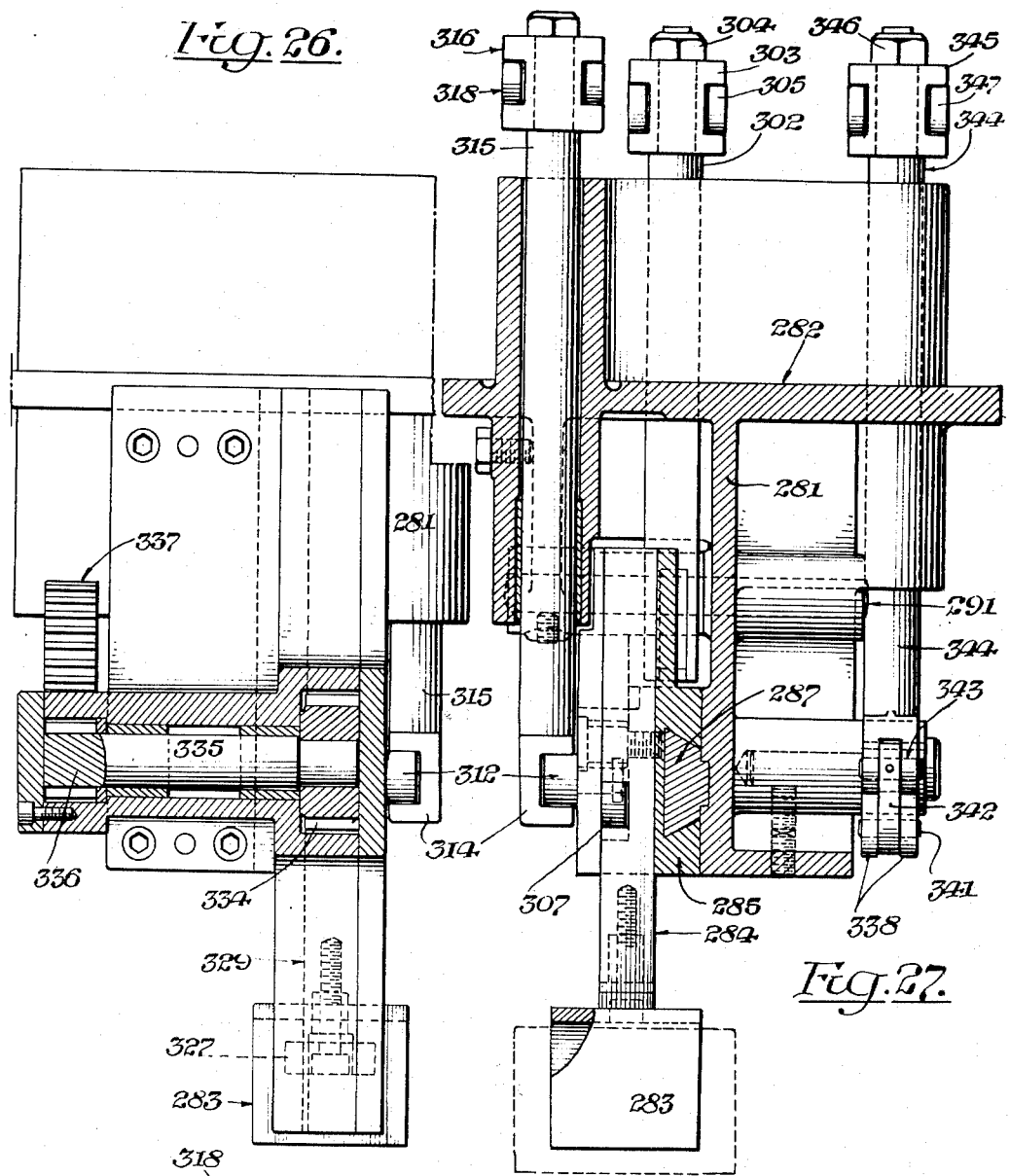
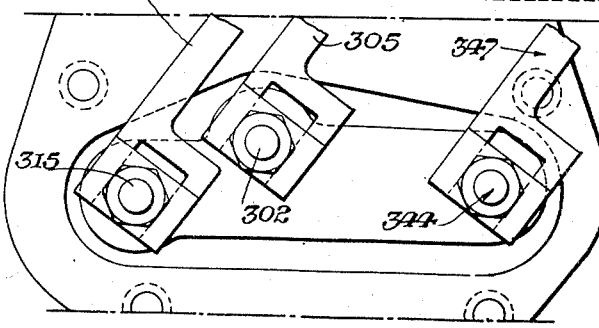

Aug. 14, 1951    P. R. HOOPES    2,563,839
PROCESS AND APPARATUS FOR MANUFACTURING
INLAID SOAP AND THE LIKE
Filed Aug. 27, 1945    28 Sheets-Sheet 21
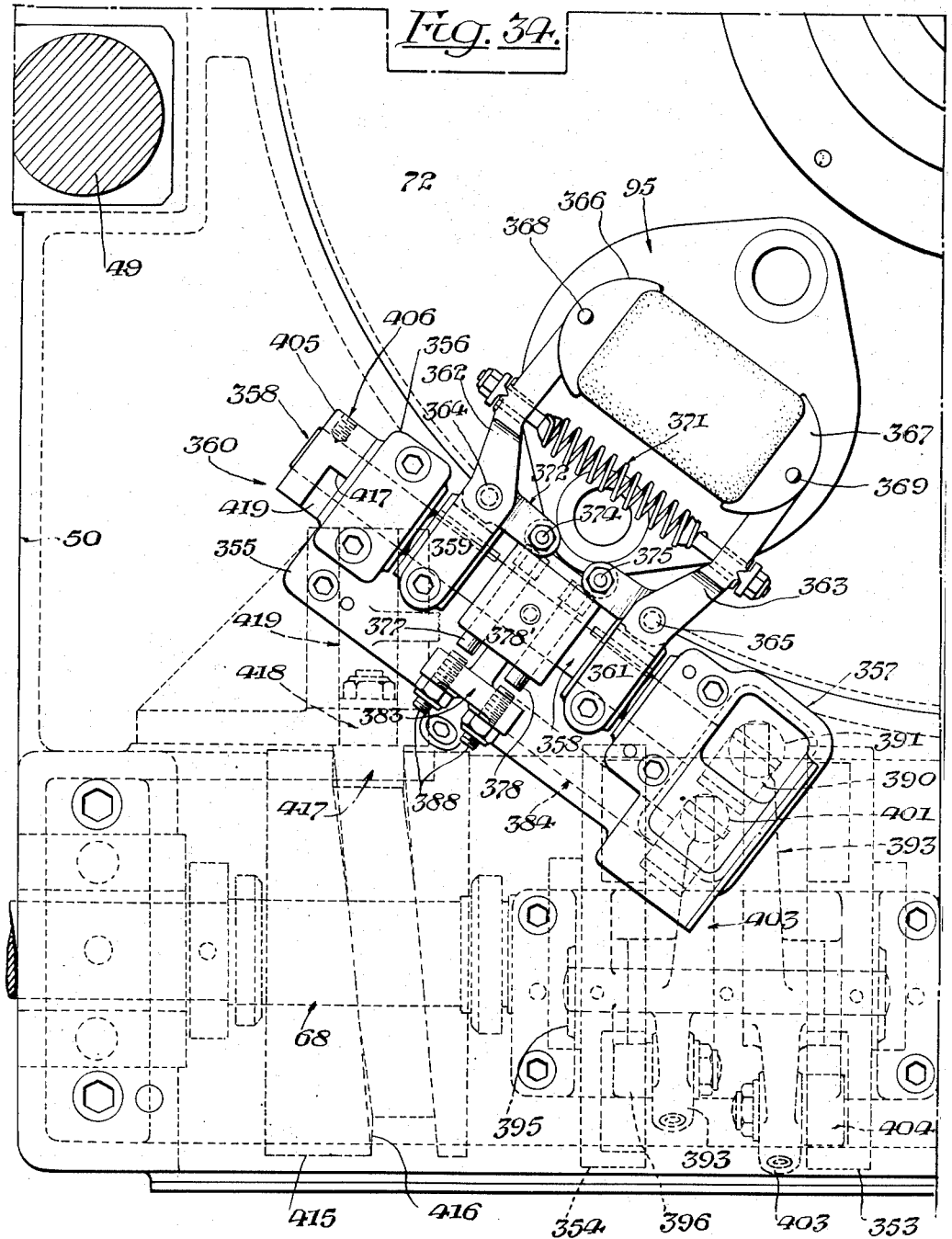
INVENTOR
*Penrose R. Hoopes*
BY
*James E. Nolan*
ATTORNEY Aug. 14, 1951  P. R. HOOPES  2,563,839
PROCESS AND APPARATUS FOR MANUFACTURING
INLAID SOAP AND THE LIKE
Filed Aug. 27, 1945  28 Sheets-Sheet 22
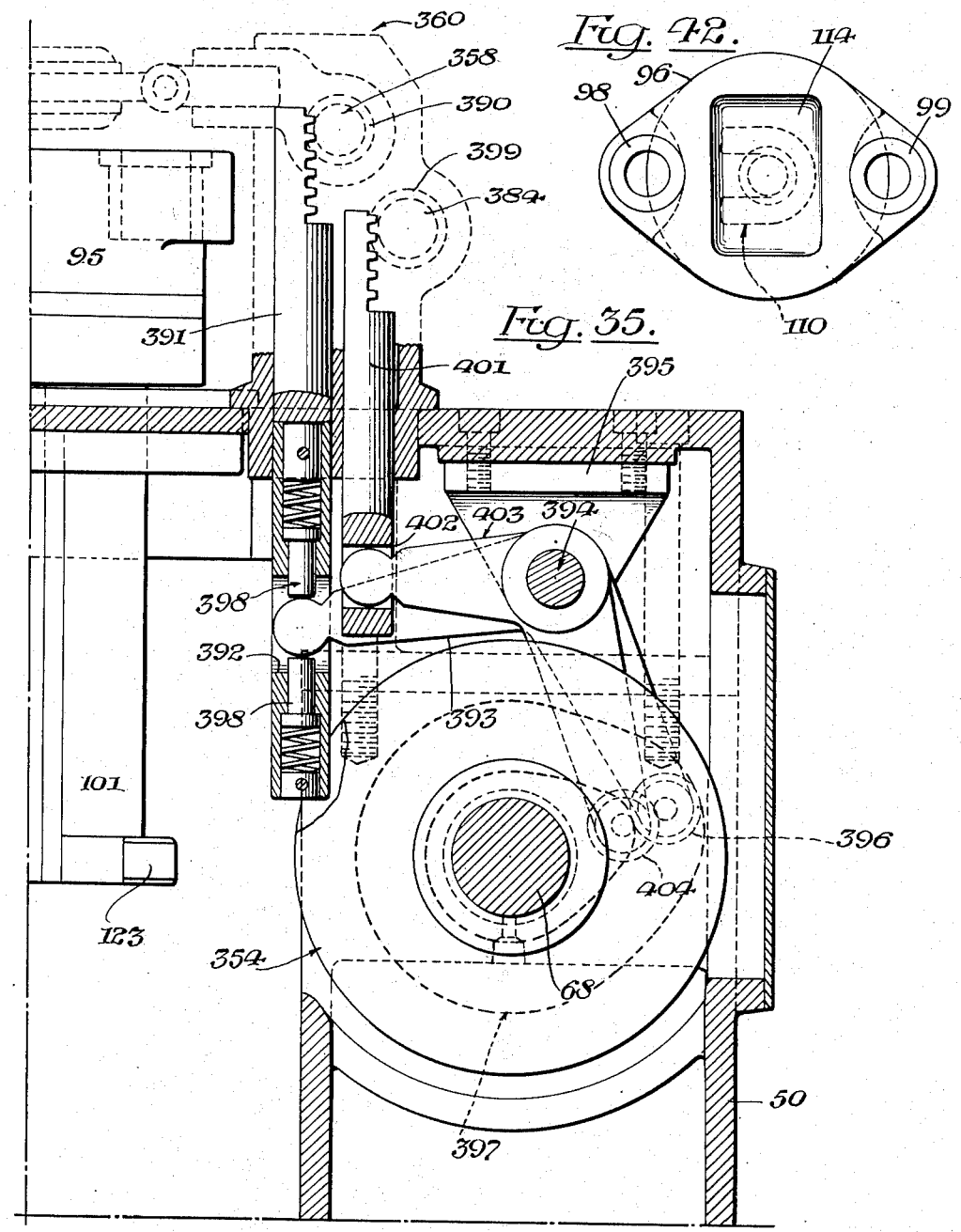
INVENTOR
Penrose R. Hoopes
BY
James E. Nolan
ATTORNEY

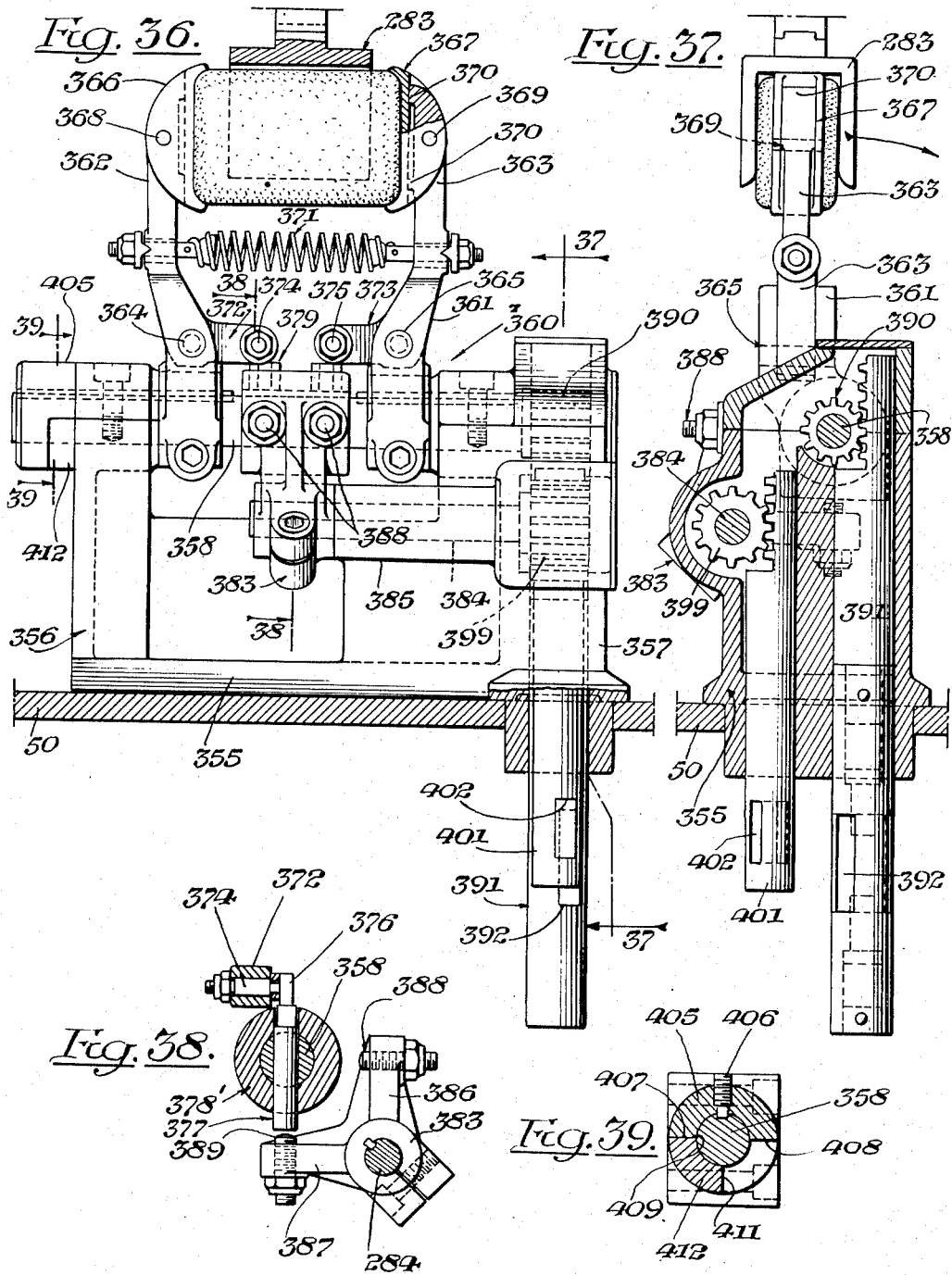

Aug. 14, 1951 P. R. HOOPES 2,563,839
PROCESS AND APPARATUS FOR MANUFACTURING
INLAID SOAP AND THE LIKE
Filed Aug. 27, 1945 28 Sheets-Sheet 25
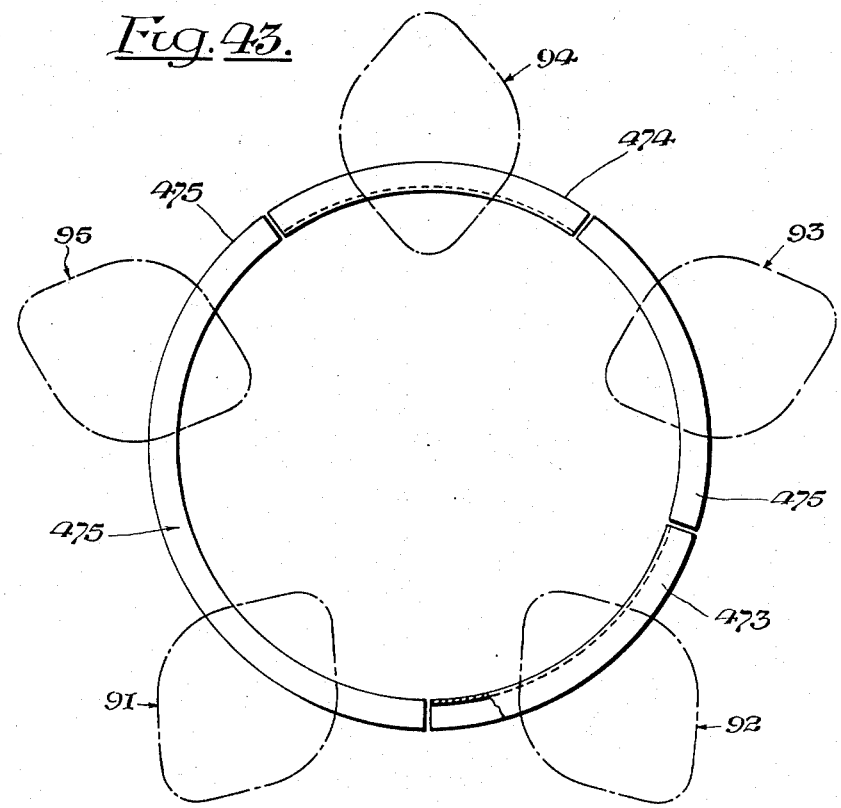
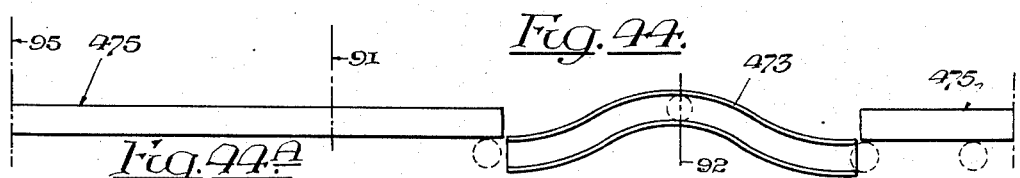
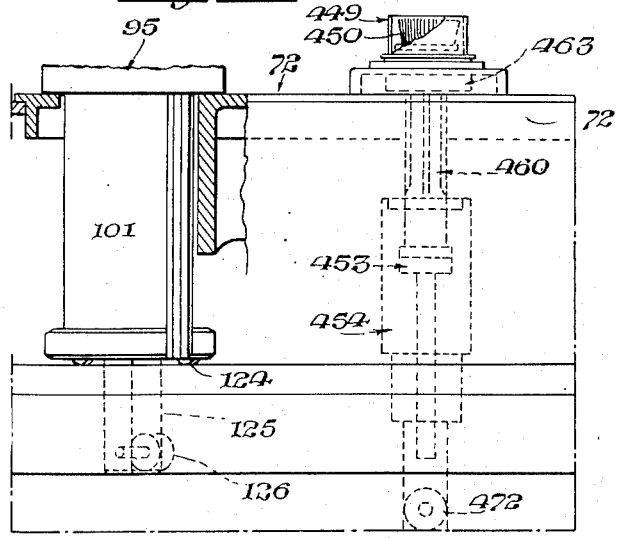
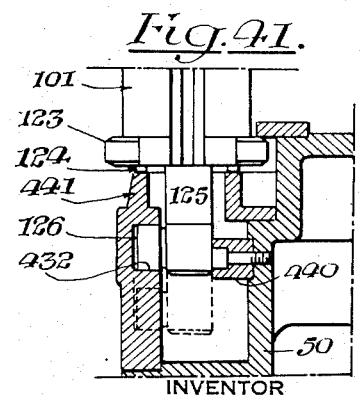
INVENTOR
Penrose R. Hoopes
BY
James E. Nolan
ATTORNEY

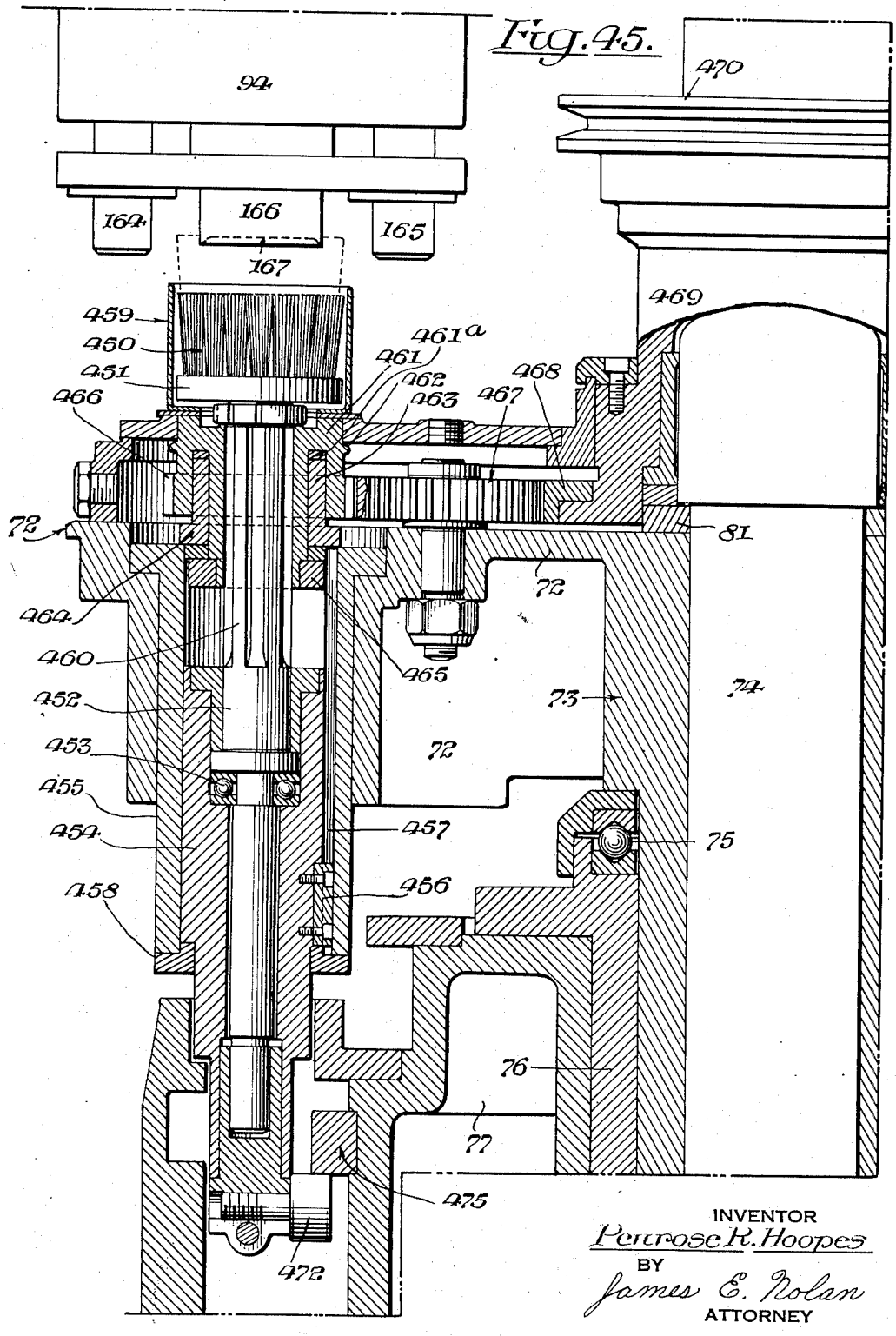

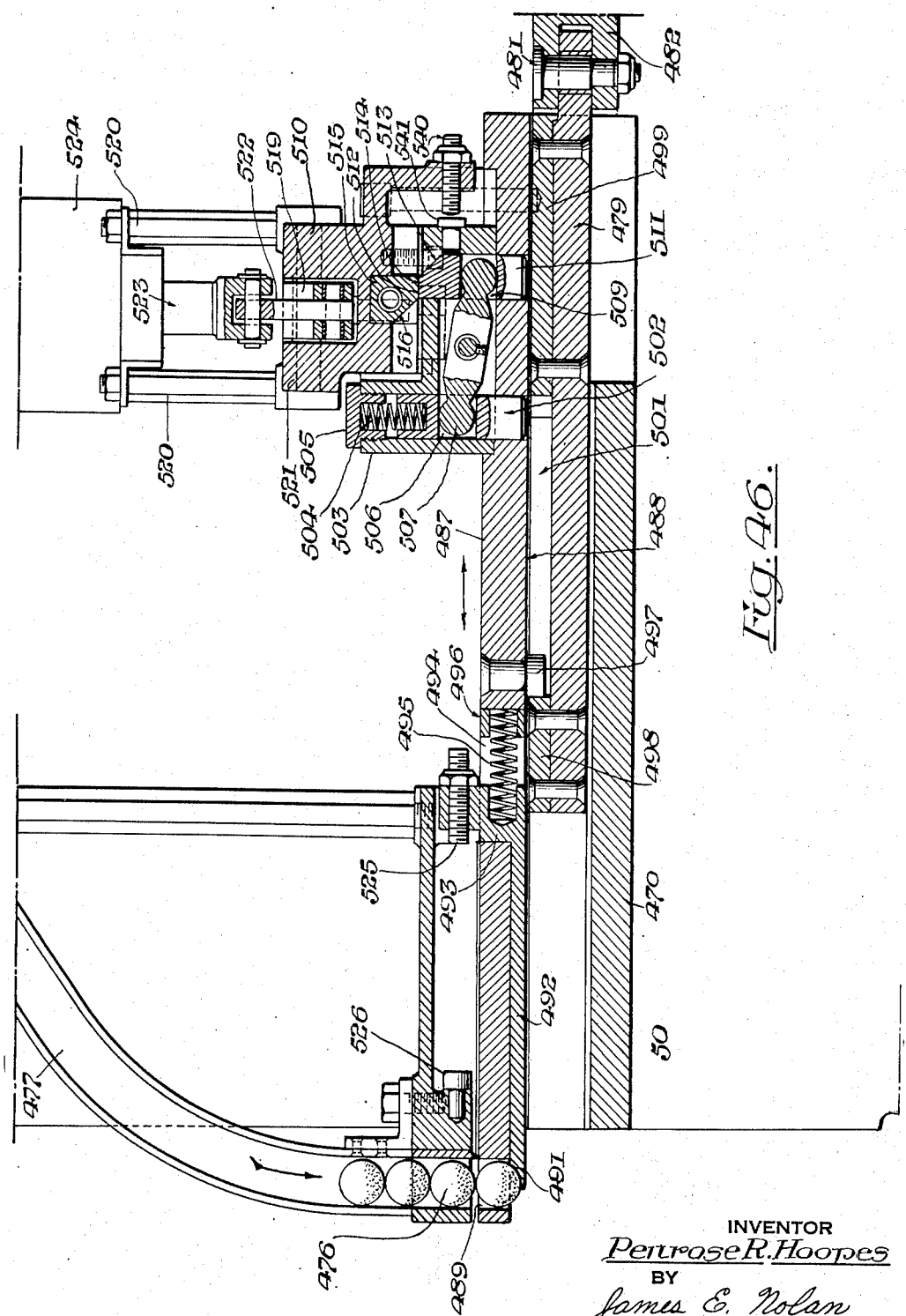

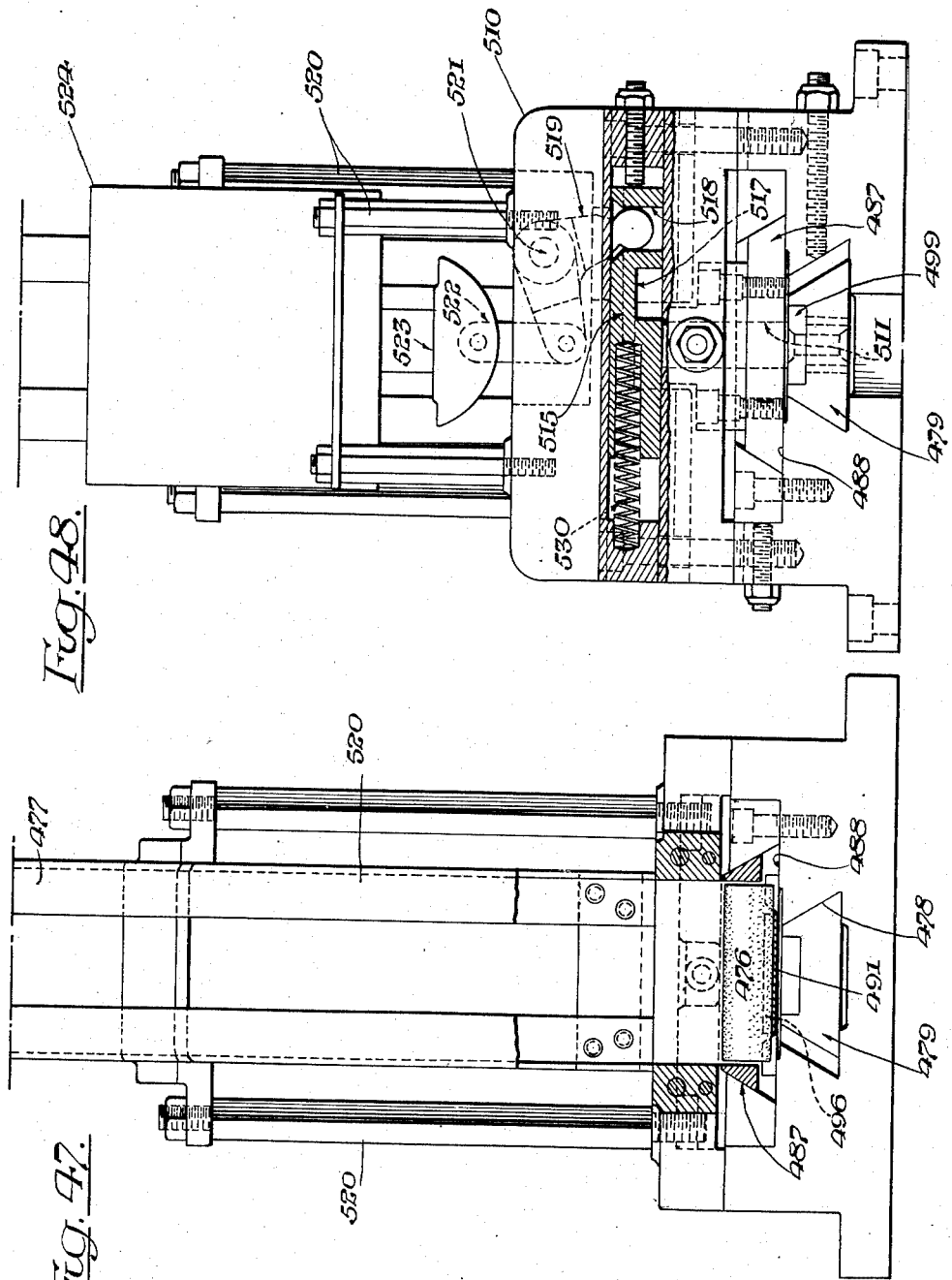

UNITED STATES PATENT OFFICE 2,563,839

PROCESS AND APPARATUS FOR MANUFACTURING INLAID SOAP AND THE LIKE

Penrose R. Hoopes, Philadelphia, Pa., assignor to Colgate-Palmolive-Peet Company, Jersey City, N. J., a corporation of Delaware Application August 27, 1945, Serial No. 612,958

33 Claims. (Cl. 75—7)

This invention relates to the production of inlaid products of soap and materials of similar viscosity and body and to methods and apparatus for their manufacture, and is particularly concerned with methods and apparatus for providing visually or otherwise sensibly distinguishable inserts or inlays of the same material or other similarly formable substances in a larger body of such material.

While the invention will be described herein in its preferred embodiment as employed for inserting indicia elements of colored soap into larger soap bodies, it will be understood that the invention is of sufficient scope to extend to the inlaying of soap with other than identification indicia, such as ornamental effects and the like, and that the invention may be applied to the similar handling and inlaying of other materials having substantially the same body, plasticity and viscosity as soap. The latter is especially true regardless of what further operation may be performed on the inlaid body, such as subsequent hardening or pressing or other operation which may be employed to ready the body for its final use. For example, the invention may be employed to provide a colored clay insert in a plastic clay block preliminary to the firing and hardening of the block requisite to its intended use.

The usual commercial cake of soap has raised or impressed on one or more surfaces a trademark, trade name or other distinctive marking identifying its source. Many of these markings have become of invaluable importance because of their long familiarity to the eyes of the purchasing public. Impressed or raised marks of this type are necessarily shallow and, as is well known, they soon disappear after the soap cake has been used for a short time, so that for most of the life of the soap cake it bears no identifying indicia. The primary purpose of this invention is to provide for identification of a soap cake throughout its useful life.

It has long been recognized that long-lasting identification marking or indicia, preferably such that cannot be effaced during the useful life of the soap, would be of outstanding commercial advantage in the trade. Many attempts have been made to solve the problem and while undoubtedly many of these have produced individual soap cakes containing colored or like indicia, to my knowledge there has been no practical solution of the problem, a fact which is attested to by the circumstance that no soap bearing such indicia was available on the market prior to the invention.

Prior proposals for introducing colored soap identification marks into soap cakes have differed widely in both method and character. A dominant feature of these earlier methods has been that they introduce the indicia in either liquid, semi-liquid or compacted powder form into the soap cake, thereby usually providing a soap cake made up of soap of two different wearing qualities which leads to uneven objectionable wearing. These prior proposed methods introducing liquid, partially liquid or compacted powdered soap into soap cake cavities are particularly not acceptable for indicia for milled soap such as is used for the better grades of toilet soap.

Recognizing the above, the art has long sought a practical manner of providing milled soap identification inserts for cakes of toilet soap quality. While the idea of such a soap has been suggested, to my knowledge the actual carrying out of the idea in the form of a commercially practical and reliable method and apparatus has not been achieved prior to this invention. This is especially true of marks or words comprising continuously closed outline figures such as circles and rectangles and letters such as O, P, A, etc.

My present invention makes available a practical, reliable and reproducible manner of providing an inlay of milled soap in a cake of milled soap and for enabling difficult closed outline figures to be employed in such indicia or marking.

With the above in mind it is a major object of the invention to provide novel method and apparatus for incorporating colored or like sensibly distinguishable indicia and the like in a body of moldable plastic material such as milled soap.

A further object of the invention is to provide a novel method and apparatus for efficiently introducing preformed colored soap insert elements into cakes of soap.

It is a further object of the invention to provide novel method and apparatus for handling soap and like plastic substances to produce therein inserts such as identification, ornamental or like elements which comprises indenting a cake of said substance to provide cavities of desired shape and size to receive preformed elements of the same or similar substance corresponding in shape and size to said cavities.

A further object of the invention is to provide a novel method and apparatus for forming cavities of desired shape and size in a cake of soap or like plastic substance wherein the cavities are formed without removing any of said substance from the cake and indentation of the cake is accompanied or followed by a compression operation substantially molding the substance about the indentation implements.

It is a further object of the invention to provide a novel association of die structures for reshaping and inlaying blanks of solid plastic material.

A further object of the invention is to provide a novel die assembly for compressing and indenting a body of soap or like solid plastic substance wherein one of the die members includes body penetrating cavity forming plungers adapted to sheath and unsheath during the operation.

A further object of the invention is to provide a novel process and apparatus for providing preformed insert elements of colored soap or a like solid plastic substance wherein said elements are made by forcing said substance under pressure into a hollow die of suitable contour preparatory to discharge into a cake of soap or the like formed with matching cavities.

It is still a further object of the invention to provide a novel process and apparatus for inserting preformed elements of colored soap or the like into matching cavities in a cake of soap or the like wherein said elements are discharged from a hollow die accurately positioned relative to said cavities.

A further object of the invention is to provide a novel dies assembly for identing soap or like substances to provide therein clean-cut cavities of accurate shape, size and location to receive suitable inserts of corresponding shape and size.

A further object of the invention is to provide a novel process and die assembly structure whereby a cake of soap or a substance of like viscosity or body may be subjected to an indenting and compression operation forming a closed letter cavity, such as the letter O, in said cake without destroying the land enclosed by the figure outline.

A further object of the invention is to provide a novel automatic apparatus for providing colored soap or like solid plastic inserts in a body of soap or like solid plastic material.

A further object of the invention is to provide a novel automatic apparatus for intermittently positioning and indexing a soap or like body at a plurality of stations in succession for performing a series of operations thereon.

It is a further object of the invention to provide a novel soap handling apparatus including an intermittently movable multi-station conveyor and novel apparatus for depositing a soap blank on the conveyor in position to be processed and for removing the processed soap bar from the conveyor at the final station, all in timed relation with the conveyor.

A further object of the invention is to provide a novel soap or like solid plastic material inlaying apparatus embodying novel die structure wherein lower die members mounted on a movable conveyor are successively indexed with and raised into operative association with cooperating upper die members at spaced stations.

A further object of the invention is to provide a novel die assembly for working on solid plastic material wherein relatively shiftable upper and lower die members are mounted for relative vertical movement to be brought together for completing the assembly, and wherein a bottom wall of said lower die member is vertically movable independently of said die member to displace said material from the lower die member and/or permit cleaning of said wall.

It is a further object of the invention to provide a novel die box structure for handling soap or like solid plastic material wherein the bottom wall of the box is independently vertically slidable and is detachably coupled to an elevating mechanism therefor.

A further object of the invention is to provide a novel die structure for a soap or like solid plastic material handling apparatus wherein a die box has a bottom wall independently movable in one direction and locked against movement in the opposite direction with respect to said die box.

A further object of the invention is to provide a novel associated cradle structure relatively movable conveyor mechanism for elevating and lowering one or more soap or like pressing die members on the conveyor when the conveyor is positioned at predetermined stations.

It is a further object of the invention to provide a novel intermittently driven multi-station conveyor wherein at an initial station a body of solid plastic material is automatically positioned with a surface at a predetermined reference level which is maintained during successive operations on the body irrespective of the height of the body.

A further object of the invention is to provide a pair of associated die members in a soap or like plastic material pressing apparatus mounted for relative lateral floating movement to compensate for mechanical inaccuracies and wear and insure accurate alignment when the die members are brought together.

A further object of the invention is to provide a novel two stage mechanism for compressing a soap or like solid plastic body within a die whereby mechanical means accomplishes preliminary positioning of the die assembly and a sequentially actuated hydraulic device completes the compression operation with materially greater force.

A further object of the invention is to provide novel process and apparatus for handling soap or a like solid plastic material wherein a blank of said material is indented with surface cavities of desired shape and size during a compression operation and suitable similarly shaped and sized inserts of solid plastic material are deposited and tightly anchored within the cavities.

It is a further object of the invention to provide an intermittently driven conveyor mounting a plurality of soap or like solid plastic material pressing dies adapted to dwell at a plurality of successive work stations and novelly associated feed and take-off devices at the first and final station enabling full automatic operation.

It is a further object of the invention to provide a novel apparatus for pre-forming insert elements of colored soap or a like solid plastic substance.

A further object of the invention is to provide a novel apparatus for pre-forming a colored soap or like solid plastic insert synchronized in movement with a soap or like body cavity forming mechanism for depositing an insert in said indented body during an overlapping portion of the cycle of each.

A further object of the invention is to provide a novel reservoir replenishing mechanism for a movable table or conveyor wherein charges of soap or like solid plastic material are automatically fed to the reservoir in response to a predetermined degree of exhaustion of the working supply therein.

A further object of the invention is to provide a novel soap pressing apparatus having relatively movable upper and lower die surfaces and brushes actuated in timed relation for cleaning those surfaces periodically.

It is a further object of the invention to provide in a movable conveyor assembly containing die surfaces adapted to contact soap and like solid plastic substances, a novel arrangement of brushes for cleaning either or both upper and lower die surfaces in timed relation with conveyor movement for insuring that operation of the brushes does not interfere with normal handling of the substance by the apparatus.

Further objects of the invention will presently appear as the description proceeds in connection with the appended claims and the annexed drawings wherein:

Figure 1 is a series of sectional views of a die assembly illustrating the principles of the method of the invention in steps 1—A to 1—F and showing in detail the manner in which a soap cake is indented and compressed to shape according to initial phases of the invention;

Figure 2 is a similar series of sectional views of another die assembly illustrating a series of steps 2—A through 2—D and showing in detail the manner in which colored insert elements are preformed to the requisite shape and size and readied for insertion into the cavities in the soap cake formed as in Figure 1; and Figure 3 is a similar series of sectional views of combined parts of the die assemblies of Figures 1 and 2 in operative association illustrating in steps 2—A through 3—E the manner in which the preformed colored insert elements are introduced into the indented soap cake and the method of invention completed;

Figure 4 is a front end elevation of an automatic machine according to a preferred embodiment of the invention;

Figure 5 is a side elevation of the machine of Figure 4 illustrating certain details of drive and control arrangements;

Figure 6 is a side elevation of the apparatus of Figure 4 viewed from the side opposite that of Figure 5;

Figure 9 is a side elevation chiefly in section illustrating further details of the cam and drive mechanism, the drive for the die cleaning brushes, and the colored soap insert station;

Figure 10 is an enlarged vertical section through part of the machine illustrating particularly the colored soap charging station and the insert station;

Figure 11 is a partly diagrammatic horizontal plan view looking down on the turntable, illustrating chiefly the association of the five station turntable with the two station soap insert device, and further illustrating the location of the lower brush on the turntable and the associated swinging feed devices for placing the blank on the table and removing the finished soap cake;

Figure 12 is an enlarged side elevation of the lower part of a representative lower die box of the turntable or rotary conveyor;

Figure 13 is a horizontal section through the die box of Figure 12 as viewed on the line 13—13 thereof;

Figures 14, 15 and 16 are enlarged elevational views mainly in section through the associated upper and lower die assemblies at the indent station wherein compression and indenting of the blank is accomplished, these views illustrating the sequences of that operation;

Figure 20 is an enlarged elevation partly in section illustrating a lower die elevator mechanism as it appears after the mechanical lifting part of the stroke has been accomplished and the soap has contacted the upper die preliminary to application of the hydraulic compression part of the stroke;

Figure 21 is a section through the mechanism of Figure 20 substantially at right angles to Figure 20 along the line 21—21 of Figure 20, illustrating especially details of the lower die box and its lateral floating association with its support as well as the hydraulic mechanism for compressing the soap;

Figure 22 is a fragmentary section illustrating charging of the upper die with colored soap;

Figure 23 is a vertical partly sectional elevation illustrating the overlapped position of a die box on the turntable and the charged die of the colored soap transfer device prior to raising of the soap to receive the insert;

Figure 24 illustrates the apparatus of Figure 23 with the lower die box raised to receive the colored insert of the upper die;

Figure 7:
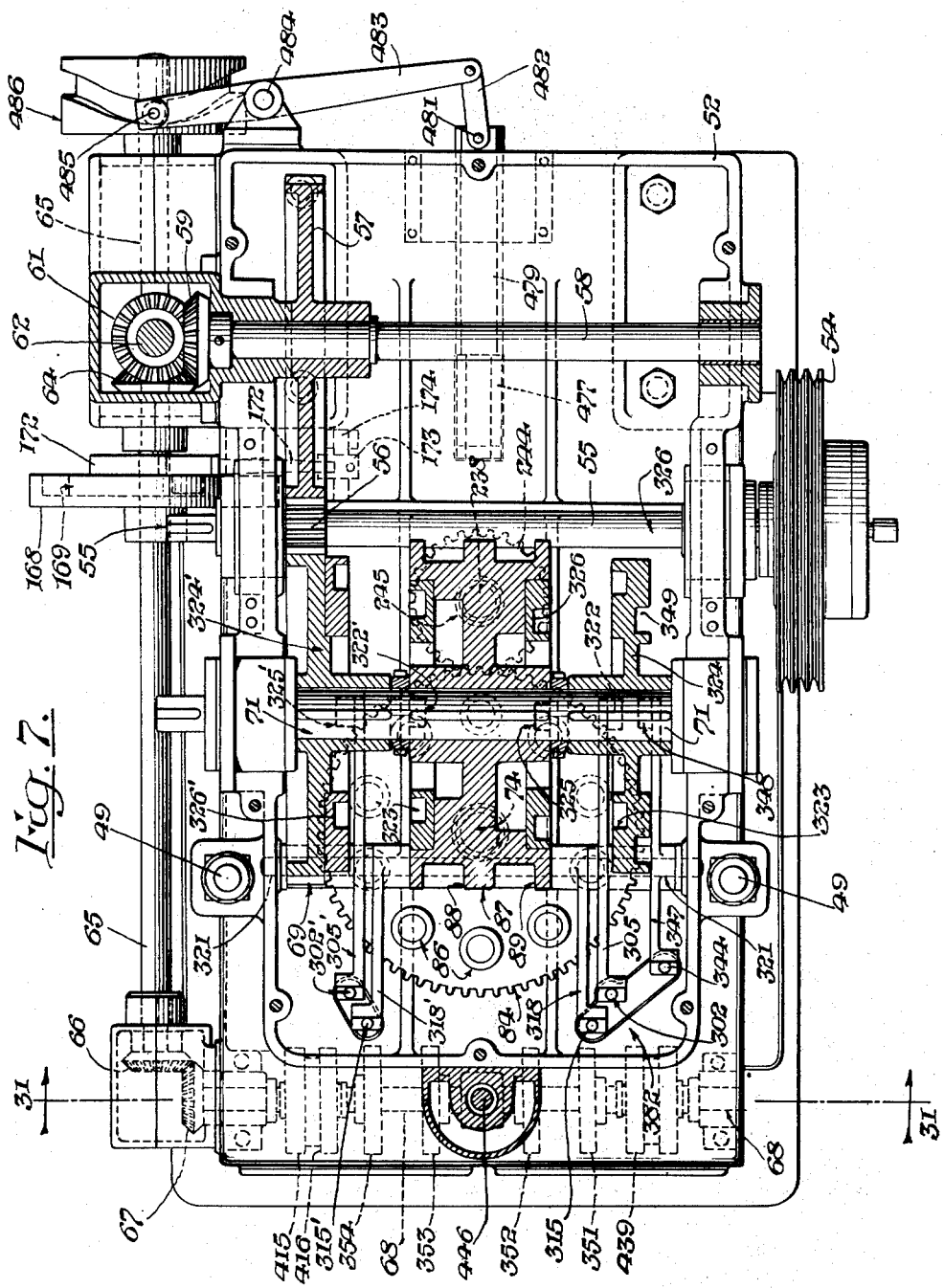
Figure 7 is a horizontal plan view partly in section along line 7—7 of Figure 6, illustrating the drive arrangements and the main cam shaft assembly of the machine.
Figure 29:
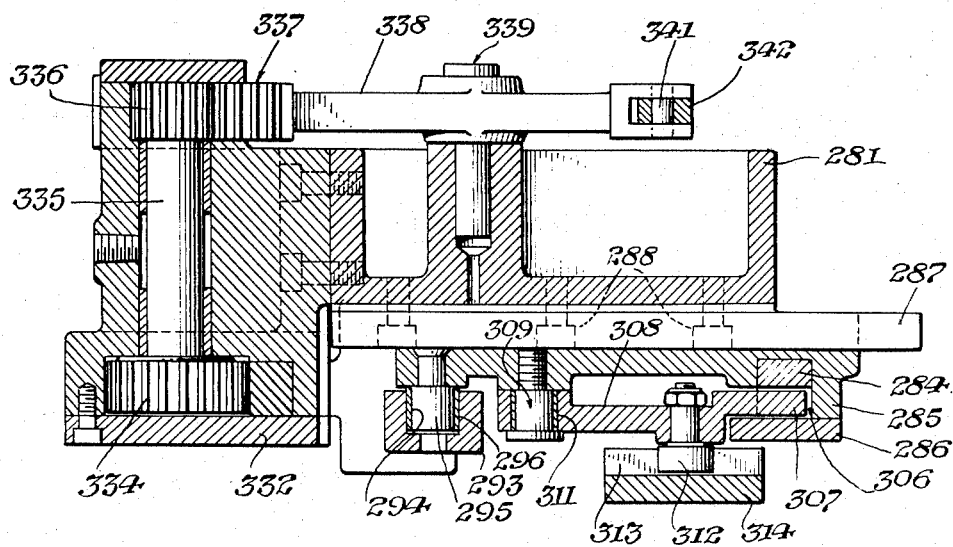
Figure 30:
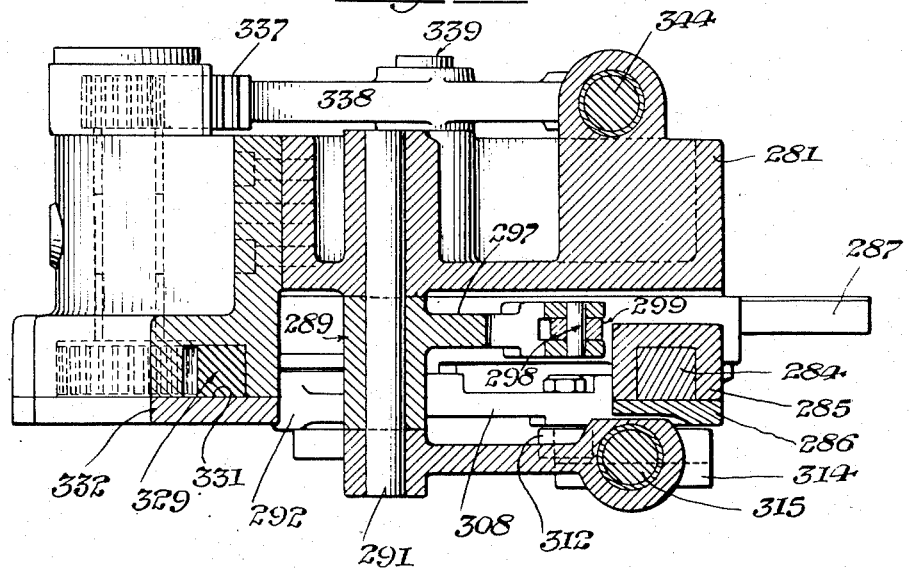
Figure 31:
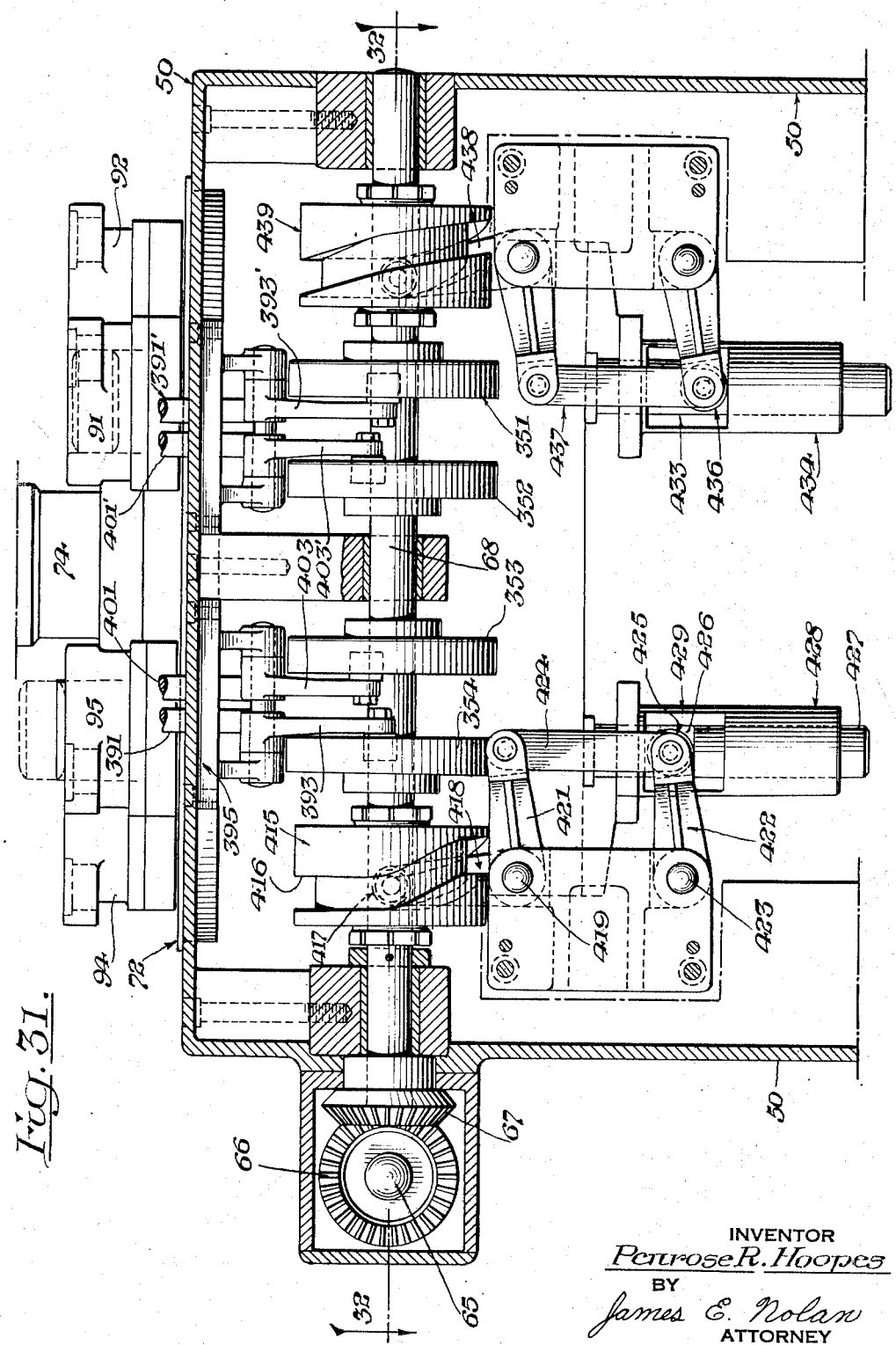
Figure 32:
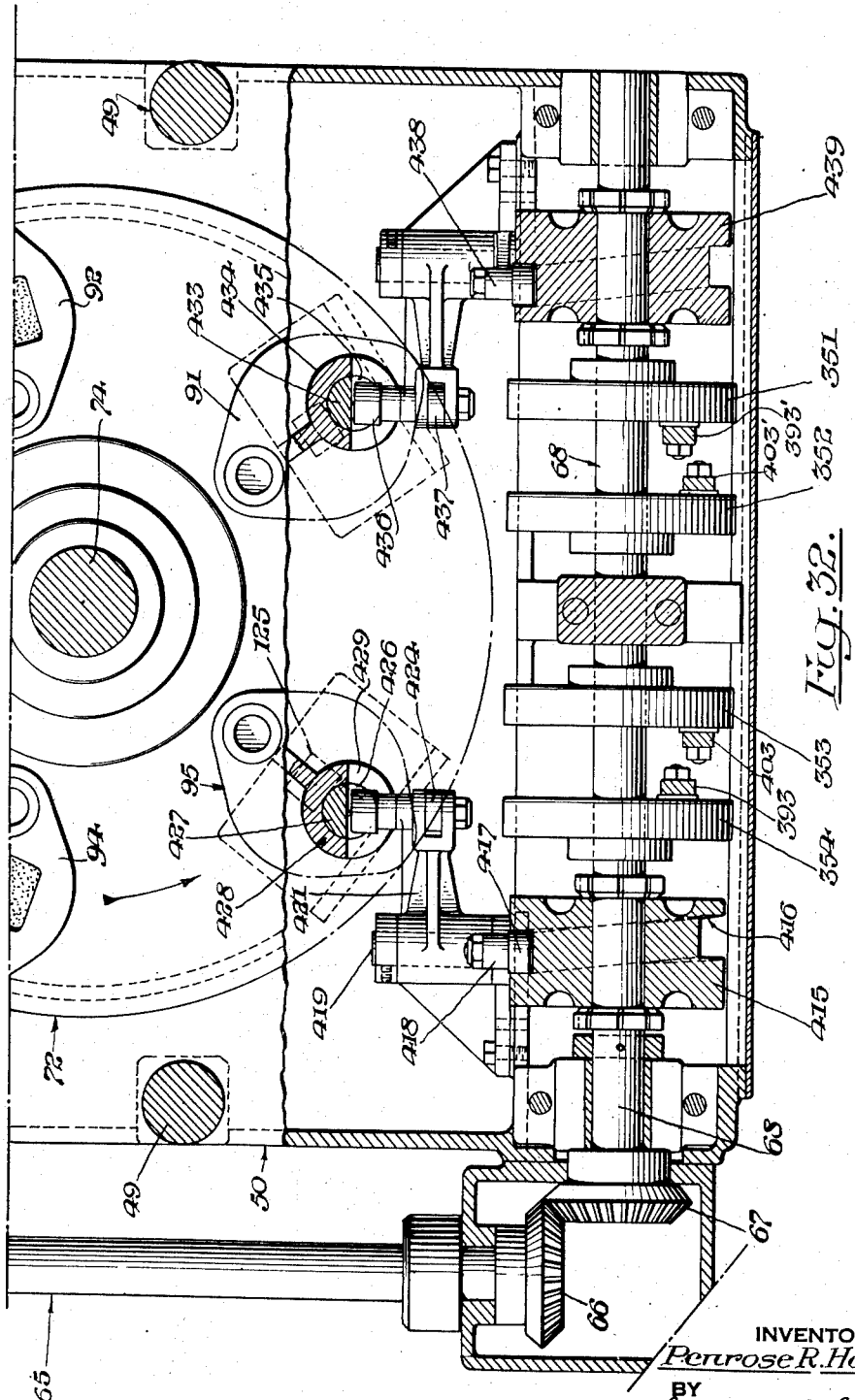
Figure 33:
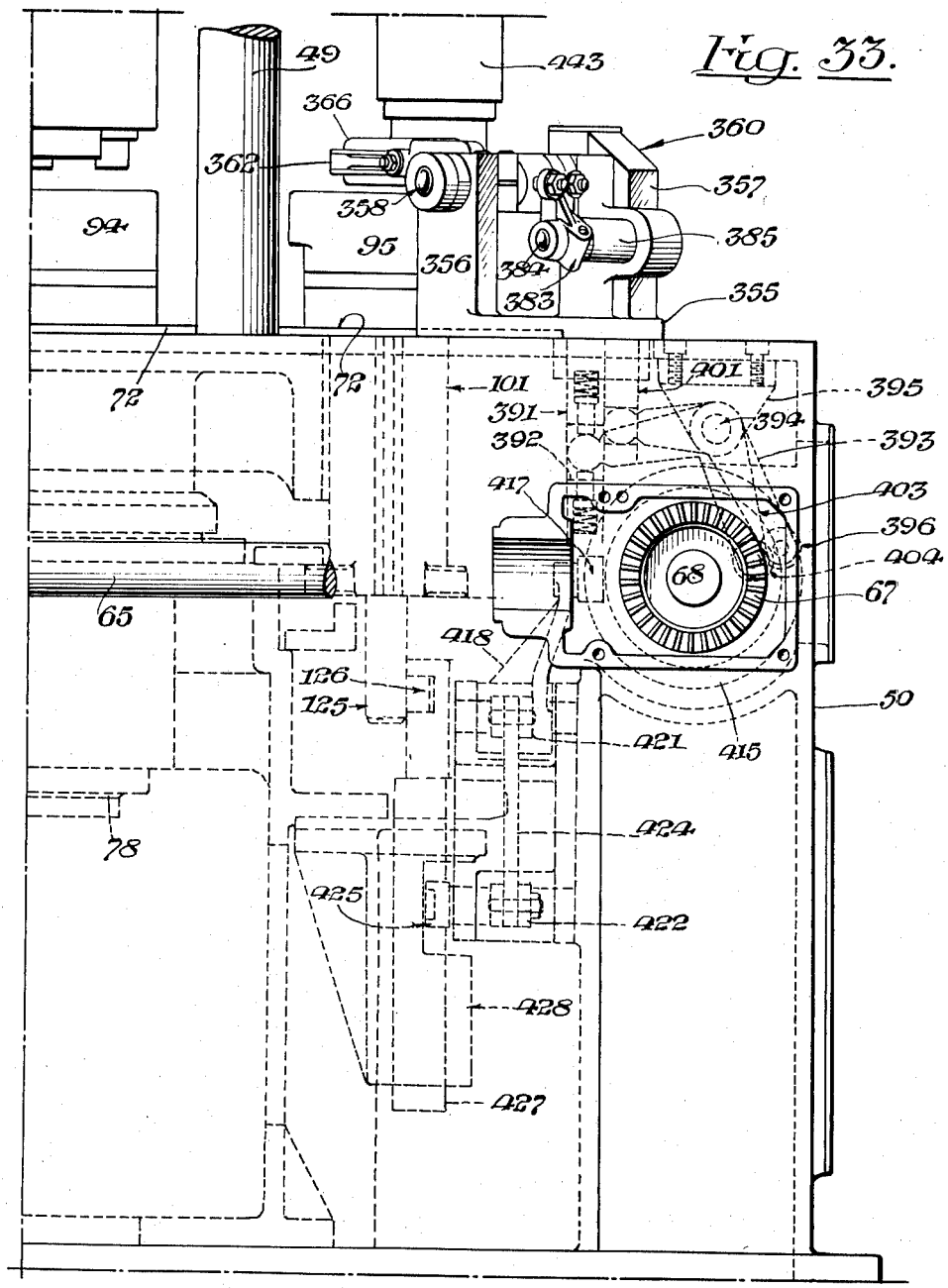
Figure 40:
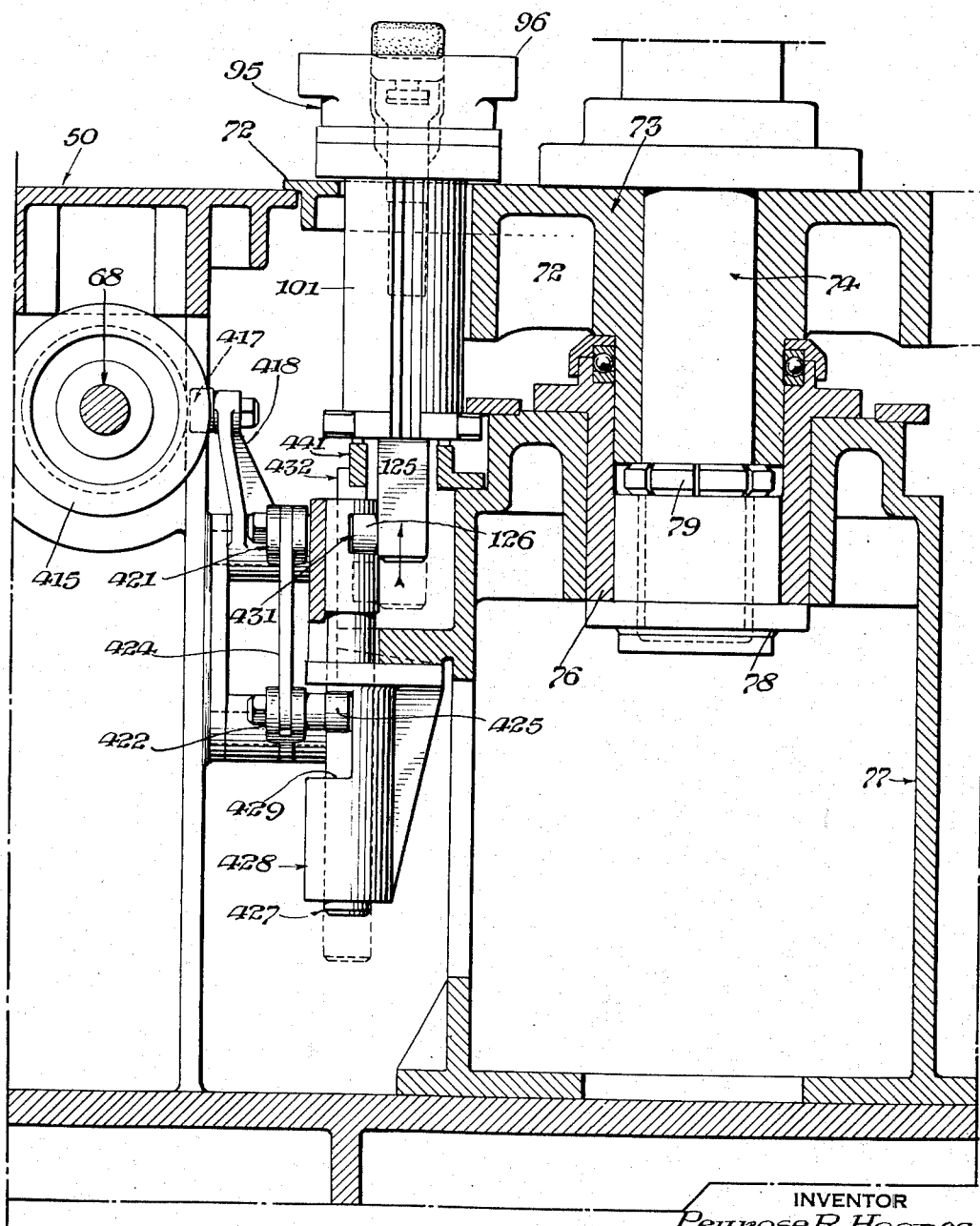

Figure 25 is a side elevation of a preferred mechanism for transferring a soap blank from a supply conveyor to the swinging feed device which delivers the soap blank to the turntable and positions it within the die box at the first station, and also illustrative of the similar mechanism by which a completed soap cake is removed from the swinging feed device at the final station on the turntable and transferred to a take away conveyor;

Figure 26 is an end elevation partly in section looking from left to right in Figure 25;

Figure 27 is an end elevation partly in section looking from right to left in Figure 25;

Figure 28 is a top plan view illustrating the actuator connections for the mechanism of Figure 25;

Figure 29 is a section taken substantially along line 29—29 of Figure 25 illustrating details of the four motion linkage;

Figure 30 is a horizontal section taken substantially along line 30—30 of Figure 25 illustrating further details of the four motion linkage;

Figure 31 is a front end elevation, partly in section along line 31—31 of Figure 7 illustrating the cam and actuator mechanism for the swinging feed devices of Figures 33-39 and the bottom die box wall elevator mechanism of Figures 40 and 41;

Figure 32 is a top plan view of the base of the machine with the top surface partly broken away and substantially in section along line 32—32 of Figure 31 illustrating said actuator mechanism further;

Figure 33 is a side elevation partly in section and partly broken away, illustrating the relative location of the swinging feed device, actuator mechanism and the turntable;

Figure 34 is an enlarged plan view looking down on the swinging feed device at the soap-out station illustrating especially jaw operating mechanism;

Figure 35 is an enlarged side elevation partly in section illustrating the cam, crank and rack mechanism for each swinging feed device;

Figure 36 is a side elevation of a swinging feed device illustrating further details of the cam operated linkage;

Figure 37 is an end elevation in section along line 37—37 of Figure 36 illustrating further the rack drive for the swinging feed device;

Figure 38 is a fragmentary sectional view substantially along line 38—38 of Figure 36 illustrating the jaw actuating mechanism;

Figure 39 is a section on line 39—39 of Figure 36 illustrating the stop construction for the rock shaft of the swinging feed device;

Figure 40 is a side elevation, partly in section, illustrating details of cooperation of the bottom die box wall with the associated raising and lowering mechanism;

Figure 41 is a fragmentary section illustrating the track for maintaining each bottom die box wall raised for brushing at the end of each operational cycle;

Figure 42 is a fragmentary top plan view illustrative of each lower die box and showing the detachable coupling of the lower wall with its elevating member;

Figure 43 is a diagrammatic top plan view illustrating the cam and track for elevating and lowering the lower brush;

Figure 44 is a diagrammatic side development of the cam and track of Figure 43;

Figure 44A is a fragmentary elevation partly in section illustrating further the lower brush raising and lower mechanism;

Figure 45 is an enlarged section illustrating details of the lower brush mounting and drive mechanism;

Figure 46 is a side elevation chiefly in section illustrating details of the colored soap charge dispensing mechanism;

Figure 47 is a front elevation of the colored soap dispensing mechanism of Figure 46; and Figure 48 is a rear end elevation partly in section of the dispensing mechanism showing the solenoid operated release and latching arrangement.

Briefly the invention in its preferred embodiment contemplates the forming of clean-cut cavities of proper size and shape in a milled soap body and then inserting into those cavities accurately preformed elements of colored milled soap. The cavities are formed in the soap body without removing material therefrom and without damaging the surface smoothness thereof. The colored soap elements are formed in a hollow die which is accurately aligned with the cavities in the soap body. This requires precise location and alignment of the cavities and the charged die, which is accomplished in the invention. The soap, or other material handled, is of such consistency and composition as to retain the given shape of the cavities and the insert elements during the process.

Referring now to Figure 1, operational steps 1—A to 1—F in Figure 1 accomplish indentation of the soap body preparatory to the insert operation of Figure 3.

Step 1—A illustrates a blank of soap 11 positioned within an open-ended die box 12 seated on a stationary lower die member 13. This blank is usually a freshly cut cake from the plodder. A vertically movable upper die member 14 is composed of relatively slidable parts 15 and 16 normally urged apart by springs 17, the normal separation of parts 15 and 16 being determined by stops 18 on rods 19 which are rigid with part 15 and slidably engaged with part 16. The flat smooth lower face 20 of die part 16 is shaped to snugly slidably fit into die box 12 when the die members are brought together.

Indicia forming plungers 21 and 22 are rigid with common support 23 and slidable through upper die part 16 which thus serves as a vertical guide for reciprocal movement of the plungers. Support 23 is rigid with die part 15 and moves vertically therewith.

Two shapes of indicia forming plungers are illustrated for explaining the invention. Plunger 21 is a hollow cylindrical punch designed to form an annular cavity representing the letter O, and plunger 22 is a linear punch element designed to form a continuous non-closed cavity representing the letter I. These two punches are truly representative of all the conditions encountered in forming cavities shaped as the usual letters of the alphabet and the common Arabic numerals and even ornamental markings, plunger 21 representing the closed outline letters such as O, P, A, Q, R, B, etc. and plunger 22 representing the remaining non-closed outline letters such as W, X, Y, C, etc., for example.

Of especial difficulty is the formation of closed outline letters and figures by the indentation method contemplated in the invention since a hollow plunger of the size adapted to indent the usual soap cake will upon withdrawal tend to remove also the land within the closed outline due to the relatively low tensile strength of the soap and so provide a completely open cavity instead of an outline indentation.

This problem has been solved in the invention by provision in the die assembly of a stem element 24 secured to a bridge 25 rigid with die part 16. Stem 24 is shaped to be slidably received within hollow plunger 21 and its lower end is preferably flat in the plane of face 20 and adapted to bear on the surface of the circular land within the letter O formed by indentation of plunger 21.

After the soap blank usually a rough rectangular body of the required weight, is placed within box 12 as in step 1—A, the first operation is to bring die members 13 and 14 together to indent the soap body and compress it to substantially its final shape and dimensions. This is preferably a combined operation but is separately illustrated in steps 1—B and 1—C for clarity of understanding.

Step 1—B illustrates upper die member 14 lowered until die part 16 telescopes with box 12. Since die member 13 is stationary, when the upper die first contacts the soap body under pressure applied to the top of die part 15, die part 16 is temporarily arrested as permitted by compression of springs 17 and unsheaths plungers 21 and 22 which continue to move with die part 15 and penetrate the soap body as illustrated in step 1—B.

Further downward movement of die part 15 completes the penetration of plungers 21 and 22, and as the springs 17 become more compressed die part 16 is also moved downwardly and pressure of the bottom face 20 of die part 16 upon the soap blank compresses and reshapes the soap into a size and form corresponding to the final bar, this size and form being determined by the dimensions of the space within die box 12 and between the upper face of die member 13 and the lower face of die part 16.

Soap displaced in the body to permit penetration of the plungers and displaced by the compression action flows laterally to fill out box 12, and when the condition illustrated in step 1—C has been attained the soap is a compressed cake within the die space but with the plunger ends disposed in the now formed cavities in the soap bar. The top surface of the bar is smooth and shaped in accord with the bottom face 20 of die part 16 and there is no injury to the surface of the soap bar as might be caused by simply forcing plungers therethrough without the compression action. Further, the confining action of the die assembly effectively molds the soap about the plunger ends so that the soap bar is not structurally weakened by plunger forcing pressures.

As above stated, steps 1—B and 1—C are preferably carried out in a single continuous operation without distinction between the actual indentation or entry of the plungers into the soap and the pressure molding operation which firms the soap and reshapes it to the form defined by the die walls and the plungers. The advantage of this procedure in compressing while the plungers are in the soap is that of accurately pre-locating the cavities in the soap relative to the die members so that the inserts may later be correctly aligned with the cavities. If the compression operation were done after the cavities were made, such would probably displace or even fill them. The pressure exerted on the plungers is positive to insure a uniform depth of penetration and, the pressure exerted to compress and mold the soap is resilient so as not to break the die when the die space is completely filled as in step 1—C. Downward displacement of die part 16 ceases after predetermined compression.

The depth of the cavities in the soap cake is predetermined by the stroke of the upper die member which can be set at any desired amount depending on the thickness of the soap. It is preferable to make the cavities of a depth equal to one-half the thickness of the compressed soap cake, as it can be assumed that the soap will wear evenly on both sides.

In step 1—D the cavity forming plungers are cleanly withdrawn from the soap cake without injuring the surface of the cake or damaging the contour of the cavities. This is accomplished cleanly according to the invention by firmly backing the upper surface of the soap cake especially adjacent the cavity edges during withdrawal of the plungers. Face 20 of die part 16 and the lower end of stem 24 are maintained against the entire upper surface of the soap cake as the downward pressure on die part 15 is released to the extent that springs 17 move die part 15 and plunger support 23 upwardly sufficiently to withdraw plungers 21 and 22 from the soap. During this action the bottom face 20 of die part 16 functions as a stripper surface so that substantially no soap is accumulated on the plungers.

During withdrawal of hollow plunger 21, the lower end of stem 24 rigid with die part 16 maintains firm pressure on the soap surface surrounded by the cavity made by plunger 21 and thereby insures that the circular land in the center of the closed outline cavity is not withdrawn with the plunger. Stem 24 acts also as a stripper for the interior of plunger 21.

Steps 1—E and 1—F diagrammatically indicate opening of the die assembly to extract the soap cake which is now cleanly indented with the desired O and I cavities and is ready to have those cavities filled with colored soap or like inserts. For purposes of explanation of the process the soap is illustrated in step 1—F as removed in die box 12 and its further handling will be described below in connection with the insert operation of Figure 3.

Figure 2 illustrates a series of steps whereby colored milled soap is preformed into insert elements of such size and shape as to accurately fit within the cavities, and readied for such insertion. This is accomplished by an extrusion operation whereby the colored soap is forced into hollow dies internally shaped to the contour of the desired indicia or markings.

A die box 28 having the same internal transverse dimension as box 12 is seated on a stationary lower die member 29 and contains a suitable amount of colored soap 31. An upper die member 32 comprises a lower part 33 and an upper die part 34 slidably connected by telescoped central bosses 35 and 36. Compression springs 37 normally urge die parts 33 and 34 part, and stops 38 on the ends of rods 39 fixed to die part 34 limit their separation.

The interior of boss 35 serves as a guide for relatively free vertical movement of a support 41 to which is rigidly secured a hollow cylindrical plunger 42 and a linear plunger 43, the lower ends of these plungers being slidably guided within die part 33. A bridge 44, to which is rigidly secured a cylindrical stem 45 having its lower end in slide guide relation with the interior of plunger 42, is mounted rigidly with die part 33 and far enough above support 41 to permit vertical plunger movement.

After step 2—A in which the colored soap reservoir 31 is placed in the open die assembly, the upper and lower die members are brought together under pressure by a force exerted downwardly on die part 34. During this step I suitably interconnect die parts 33 and 34 solidly so that springs 37 cannot compress, and the full applied force will cause compression of the colored soap mass in box 28 when the lower flat smooth face 40 of die part 33, which is shaped to snugly slidably fit with box 28, contacts colored soap 31. Increased compression at room temperature conditions results in the plastic colored soap being extruded, forcing plungers 42 and 43 upwardly and filling the space in die part 33 below the plunger ends. Due to the resistance of the plungers, this extrusion is accomplished with the extruded colored soap under appreciable compacting pressure so that the resultant insert elements are solid and not porous and are of sharp cleanly cut contour. These elements are self-sustaining and capable of retaining their given shape.

Upward displacement of the plungers proceeds until support 41 engages bridge 44 which is suitably rigid with die part 33 and thus serves as a stop for determining the depth of the insert elements, so that when step 2—B is completed preformed charges of colored soap consisting of elements of the required O and I shapes have been taken up by the upper die member.

The die members 29 and 32 are then separated. During this separational movement I have found that the lower ends of the preformed colored soap elements indicated at 46 and 47 in step 2—C break off cleanly with the upper surface of the colored soap reservoir 30, probably because the frictional adhesion of these elements to the die member is so much greater than the relatively low tensile strength of the soap. In any event no special severing operation is here required. It will be especially noted that as a result of such clean break and since the lower face of die part 33 is smooth and flat and since the flat lower end of keeper 45 is maintained against the top surface of the colored soap at the same level as that lower die part face, each completed extruding and withdrawal operation leaves the colored soap reservoir with an even flat upper surface and in condition for another extruding operation, an important factor in automatic apparatus as will appear. The colored soap level is simply lowered with each extrusion operation, and with almost no alteration of shape of its uper surface.

Step 2—D illustrates simply removal of the colored soap reservoir from die member 29 to permit the mounting on die member 29 of die box 12 containing the indented soap removed from the die assembly of Figure 1.

Figure 3 illustrates the insert operation wherein the preformed colored soap elements of Figure 2 are inserted into the cavities of the soap bar indented in Figure 1. During this operation the rigid interconnection of die parts 33 and 34 maintained during the steps of Figure 2 is released so that the upper die member is collapsible against the force of springs 37. However, plunger support 41, which was freely movable in Figure 2, is now suitably made rigid with die part 34.

Step 3—A illustrates the indented soap bar 11 positioned in the die assembly of Figure 2 beneath and in exact alignment with the charged upper die of step 2—D because boxes 12 and 28 are of interchangeable fit with die member 29. In step 3—B the upper and lower die members are brought together by downward force exerted on die part 34, and the bottom face of die part 33 is brought into contact with the upper surface of soap bar 11. Since die boxes 12 and 28 have the same interior dimensions in plan, die part 33 fits snugly with box 11; and since the plungers 21, 22 and 26, 27 are exactly similarly located in their respective die parts 16 and 33, the preformed colored soap elements 46 and 47 are now located precisely above the corresponding cavities 26 and 27 of the soap bar.

Downward movement of die part 33 is arrested preferably just short of contact with the upper surface of soap bar 11 but compression of springs 37 permits continued downward displacement of plungers 42 and 43 relative to die part 33, so that preformed colored soap elements 46 and 47 are positively inserted into cavities 26 and 27 respectively. The downward stroke of the plungers equals at least the depth of the cavities so as to provide positive full insert. It has been found advantageous to provide such downward movement of the plungers as will actually produce compression and resultant thickening and anchoring of the inserted colored soap elements within the cavities.

At the end of this plunger stroke, the support 41 engages die part 33 and the latter becomes rigid with die part 34 and further pressure of the die members together accomplishes a final compression of the soap bar 11. This compression is effective to further securely anchor the insert elements 46 and 47 in the soap bar and if necessary to slightly reshape the soap bar to final form for use. If desired, the compression operation may be carried out at a subsequent separate station.

Steps 3—C, 3—D and 3—E simply represent separation of the die assembly after insertion and compression, removal of the die box from the assembly, and removal of the finished soap bar from the die box, respectively.

It will be appreciated that the above die assemblies may be of any shape in plan, and that the plungers may be of any desired number, shape or size without departing from the spirit of the invention. Also, while the process steps are described as involving a stationary lower die member, it will be evident that any apparatus producing the above described relative motions between the die members and parts may be used in practicing the invention, such as apparatus wherein the lower die member moves into contact with the plungers.

My process is simple and efficient. The soap bar is provided with clean-cut cavities of controlled depth into which are thrust preformed colored soap elements to exactly fill the cavities. The entire available surface of the soap bar is firmly backed both during formation of the cavities and insert of the colored soap elements. The final soap bar, the colored soap being of the same quality of soap as the remainder of the bar, has the wearing and washing qualities of a homogeneous integral soap bar, with the attendant advantage of a permanent indicia visible throughout its useful life.

The insert elements are precisely formed as to shape and size in cross-section and are sufficiently rigid to withstand and accomplish the preforming and insert operations. Usually I make the insert elements of such dimension as to provide a surrounding space or clearance of about 0.005 inch with the cavity walls, mainly to allow for small unavoidable errors of alignment and to permit escape of air during insertion. These insert elements are precisely controlled as to length by the distance between bridge 44 and die part 33, which of course can be adjusted and held as desired.

Usually I try to make the insert element of a length at least equal to the depth of the associated cavities, but in some instances it is desirable to make each insert element slightly longer than its associated cavity so that the final part of the inserting plunger stroke compresses and thickens the insert now within the cavity and more firmly anchors it. During the final compression stage the insert elements are compressed and bonded into closely cohesive relation with the soap cake so that the soap cake structure is of equal strength with the usual non-inlaid soap cake, and the inlay is made flush with the top surface of the soap cake. The indicia thus appear cleanly visible on one surface of the soap cake.

Since the colored insert elements extend through one-half the thickness of the soap cake, progressive wearing away thereof does not efface the indicia which remain permanently visually distinct. Also since the insert elements are made of milled soap, the weight of the final soap cake is the same as when cut from the plodder bar.

Instead of indicia insert elements like O or I, I may employ the invention to provide ornamental colored strata and like effects. Also the inserts may contain or comprise selected medication or chemicals, such as antiseptics, healing substances and the like, or perfumes, or even special detergent substances. The invention may be used to produce cakes of composite soaps and detergents.

It will be understood that the term soap as used herein includes conventional soaps, soap-like substances and detergents including synthetic detergents such as sodium salts of sulfated or sulfonated fatty acids, fatty alcohols, monoglycerides of fatty acids, etc.

The above described apparatus may take any suitable embodiment for accomplishing the process of the invention. For rapid and automatic machines, the die assemblies of Figures 1 and 2 may be, for example, mounted on intermittently and synchronously driven turntables or conveyors adapted to overlap for the insert operation. In such machines the soap cake, after formation of the cavities, and the colored soap charging die member, after receipt of a charge of colored insert elements, would be brought into alignment by movement of one or the other prior to the insert operation.

*Automatic machine*

Figures 4–48 illustrate a machine for automatically carrying out invention in high speed mass production of inlaid soap cakes, according to a preferred construction.

The machine has a heavy base 50 enclosing operation mechanism later described herein, an upright rear standard 51, and an upper housing 52 enclosing operating mechanism later to be described and overhanging base 50. A pair of upright posts 49, rigid with base 50 at their lower ends, are affixed to upper housing 52 for further support of the overhanging housing and the mechanism within it.

Figure 8:
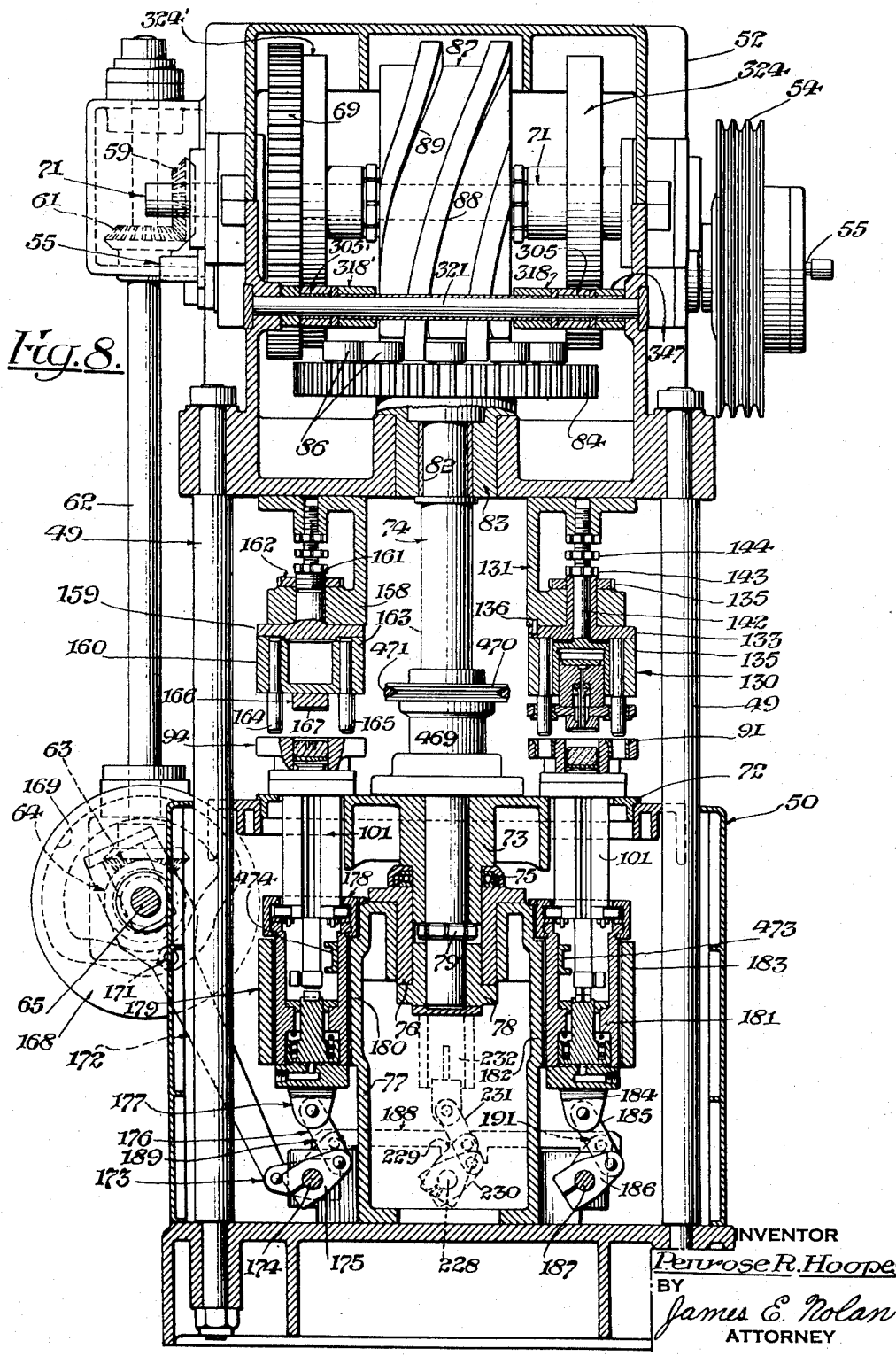
Figure 8 is an enlarged front elevation mainly in section illustrating details of the cam and drive arrangement of the machine, the turntable, and the lower die elevating mechanism.

An electric motor 53, which drives all the moving parts of the machine about to be described except the brushes, is suitably mounted on housing 52 and connected by a belt and pulley speed reduction drive 54 to a horizontal transverse main drive shaft 55 having a pinion gear 56 rigid therewith and meshed with a larger gear 57 fixedly mounted on a suitably journalled horizontal mechanism drive shaft 58 as illustrated best in Figures 7–9.

Shaft 58 has affixed thereto a bevel gear 59 meshed with a bevel gear 61 on the upper end of a vertical shaft 62 as illustrated best in Figure 8. Shaft 62 transmits drive power to the level of base 50 and has at its lower end a bevel gear 63 meshed with a bevel gear 64 on a suitably journalled horizontal shaft 65 extending from front to rear along one side of base 50. At its front end, shaft 65 carries a bevel gear 66 meshed with a bevel gear 67 on a transverse horizontal cam shaft 68 suitably journalled within base 50. As will hereinafter appear, shafts 65 and 68 are main mechanism control shafts for effecting predetermined operation of mechanism carried by base 50.

Pinion 56 is also meshed with a larger gear 69 on a horizontal transverse main cam shaft 71 suitably journalled within upper housing 52. As will later appear, shaft 71 controls movement of the turntable or other conveyor employed for carrying the soap from station to station in the machine and other soap handling devices.

A circular lower work platform or turntable 72 for supporting the soap cake to be inlaid is mounted for rotation about a vertical axis with its upper surface preferably just above the level of base 50. Platform 72 is formed with an integral hub 73 non-rotatably secured to the lower end of a vertical shaft 74. Hub 73 is shouldered to seat upon a suitable thrust bearing assembly 75 mounted on a sleeve 76 fixed to an upstanding supporting column 77 rigid with base 50. The lower end of shaft 74 is seated in a suitable radial bearing assembly indicated at 78. Shaft 74 is held against axial movement with respect to platform 72, as by locknut 79 and a suitable shoulder and retainer assembly at 81 in Figure 45.

Shaft 74 thus carries the entire weight of platform 72 and is supported rotatably on base 50. Shaft 74 extends across the space between base 50 and overhanging housing 52 and has its upper end suitably laterally supported and journalled within housing 52 in a bushing 82 carried by a sleeve 83 fixed to housing 52. A large spur gear 84 is fixed to the upper end of shaft 74 between a suitable shoulder and a locknut 85, the upper surface of gear 84 being flat and horizontal.

A plurality of upstanding cylindrical cam rollers 86 are suitably mounted on gear 84 for idle rotation about vertical axes as illustrated in Figure 9. These cam rollers coact with suitable surface grooves on a cylindrical drive cam 87 rigid with shaft 71 so that rotation of shaft 71 effects intermittent rotation of shaft 74 and turntable 72. The axes of rollers 86 lie in a circular line which is perpendicularly intersected by a vertical passing through the axis of shaft 71. In the illustrated embodiment of the invention, see Figure 11, table 72 is moved angularly an equal amount five times during each complete revolution as will appear. I prefer to provide for this movement a series of ten equally spaced cam rollers 86 cooperating with two generally spiral grooves 88 and 89 on cam 87.

Cam grooves 88 and 89 are so shaped that, during each complete revolution of cam 87, the gear 84 is rotated one-fifth of a revolution. The dual cam and groove arrangement is provided to insure accurate indexing of the turn table at the five operational stations since at least one roller 86 is always fully within a cam groove regardless of the angular position of the cam. Any equivalent intermittent drive for gear 84 and turntable 72 may be employed.

*Turntable*

Turntable 72 supports and positions the soap cake during the entire cycle of operations, here five in number. Referring to Figure 11, table 72 carries a series of five identical equally spaced circumferentially lower die members adapted to be successively indexed at the five operational stations 91–95 by 87.

As illustrated in Figure 10, each lower die member comprises a hard metal die box 96 internally formed with an opening 97 dimensioned and shaped in accord with the desired lateral dimensions and shape of the finished soap cake. Here opening 97 is rectangular with smooth flat vertical side walls. On opposite sides of opening 97, box 96 is formed with two spaced apertures in which are seated hollow cylindrical guide bushings 98 and 99 adapted to snugly telescope with guide posts on an upper die member as will appear.

Box 96 is mounted for slight lateral floating displacement on a cylindrical support member 101. A plate 102 apertured in alignment with opening 97 is suitably fixed to the bottom of box 96 and its lower flat horizontal surface rests slidably upon the upper flat horizontal surface of a ring member 103 secured to the top of support 101, as by machine screws 104. An annular guide member 105, secured to plate 102 as by screws 106, is formed with an inturned lip 107 engaging the bottom of ring 103. The interior of guide member 105 is cylindrical and surrounds ring 103 with an annular clearance exaggeratedly indicated at 108. An annular clearance indicated at 109 is also provided between the heads of screws 104 and plate 102.

Thus box 96 is mounted on support 101 for lateral float in any direction in a horizontal plane, but is restrained against vertical movement relative to support 101 because of engagement of plate 102 and lip 107 on opposite sides of ring 103. As will appear later, this lateral float provides for exact automatic alignment of the upper and lower die members when they are brought together.

Internally, support 101 has a cylindrical bore lined with a bushing 111 in which a cylindrical rod 112 is mounted for vertical reciprocation. The upper end of rod 112 has an enlarged head 110, open at one side as illustrated in Figure 42, on which a hardened metal block 113 comprising the bottom of die box 96 is removably mounted. Block 113 is rectangular with its lateral walls smooth and slidably fitting snugly with opening 97 and having a smooth upper face 114 slightly cupped in accord with the final soap cake shape. Block 113 is formed on its bottom with a generally T-shaped stud 115 adapted to removably interfit with a suitable groove 116 formed on the enlarged head of rod 112. Thus the bottom wall 114 of die box 96 is vertically reciprocable with respect to box 96 and, although block 113 is transversely slidably removable from rod 112, the block is longitudinally fixed with respect to rod 112 so that vertical positioning of rod 112 accurately locates the horizontal level of the top surface of the soap cake in die box 96. There is also sufficient lateral clearance between stud 115 and groove 116 to permit the above-described lateral float of die box 96.

Within tubular support 101 are two vertically slidable plungers 117. Two diametrically located normally compressed springs 118, preferably seated in aligned sockets in support 101 and plungers 117, normally resiliently urge the support and plungers apart longitudinally. Within support 101 central rod 112 is formed with a rigid flat-sided wedge section 119. A pair of diametrically opposite locking elements 121 each have an inner tapered surface of the same taper as wedge section 119 in contact with wedge section 119, and have an oppositely tapered outer surface seated in a correspondingly shaped inclined slotted surface 122 on plungers 117. Each element 121 is held against displacement longitudinally of support 101 by virtue of close fit with suitable apertures in support 101 as illustrated in Figure 10.

At its lower end, support 101 is formed with external guide flanges 123 adapted to be engaged by a suitable lifting device or cradle at the indent and compression stations indicated at 92 and 94 in Figure 11 as will be described. The lower ends of plungers 117 project a short distance below support 101 and carry a pair of parallel rollers 124 the purpose of which will later be described. An extension 125 of rod 112 projects downwardly beyond plungers 117 and carries at its lower end a transversely disposed idly rotatable cam follower roller 126 adapted for coaction with a suitable cam on base 50 to raise block 113 for ejection of the completed inlaid soap cake at the final operational station at 95 in Figure 11 as will appear.

Support 101 is lifted to raise die box 96 toward a stationary upper die member during operation, and initially rod 112 will rise along with support 101 due to the wedging action of elements 121 with both the rod and support. However, when rod 112 is moved upwardly relatively to support 101, as during the combined indent and initial compression operation at the position indicated at 92 in Figure 11, elements 121 permit such relative displacement by relatively moving inwardly in recesses 122, and the wedging action of elements 121 aided by springs 118 locks the rod and support together at the point of uppermost relative movement. This action, as will appear, is provided to prelocate the top surface of the soap cake in a predetermined plane to be maintained during its entire operational cycle through the machine.

Supports 101 are suitably mounted for vertical displacement, being provided with external guide grooves 127 interfitting with suitable vertical guide bars 128, illustrated in Figure 13, rigid with table 72. Supports 101 are thus prevented from rotation about their axes, while the desired vertical reciprocation is permitted.

In the illustrated embodiment of the invention, five identical lower die members including the die box, support and rod construction above described and enlargedly illustrated in Figure 10 are employed, one at each of stations 91–95 of Figure 11. These lower die members are permanently located on table 72 and move around with it to be intermittently positioned at the five successive operational stations. Any desired number of lower die members may of course be mounted on the table but in general their number is equal to the number of operations for maximum efficiency.

*Upper die member—Indent station 92*

Figures 14–16 illustrate in detail the structure of the upper die member 130 at the second operational station 92 of Figure 11, the soap blanks having been already placed in a die box 96 at station 91 of Figure 11 and rotated one-fifth of a revolution by cam 87. This station is also illustrated at the right side of Figure 8.

Upper die member 130 is rigid with upper housing 52, being mounted on a bracket 131 suitably secured to housing 52. Die member 130 comprises an upper plate 133 having a central hollow cylindrical boss 134 projecting upwardly through a suitable aperture in bracket 131. Boss 134 is threaded at its upper end for reception of a nut 135 which may be adjusted for locating plate 133 vertically with respect to bracket 130. Plate 133 is secured against rotation relative to bracket 131, as by a dowel 136 (Figure 8) which freely permits the above relative vertical displacement.

A body member 137 is suitably secured to plate 133, and a pair of downwardly extending cylindrical guide posts 138 and 139 rigid with body 137 are diametrically disposed above bushing apertures 98 and 99 in the lower die member. The interior of body 137 forms a vertical guide for an adjustable element 141 having a central rod 142 projecting through boss 134 and terminating in a threaded end on which is mounted a lock nut 143. For vertically adjusting and maintaining element 141 relative to body 137, the upper end of rod 142 abuts with a vertically adjustable stub assembly indicated at 144 on bracket 131 in Figure 8.

Rigid with element 141 is a bridge 145 carrying the plungers for making indentations in the soap. Figures 14–16 illustrate only one of these plungers, the hollow cylindrical plunger 146 used for impressing the O-shaped aperture in the soap, it being understood that this letter is selected only by way of example and that other and additional letter plungers may be provided rigid with bridge 145. Bridge 145 is apertured in alignment with plunger 146 for slidable reception of a land retaining stem 147 which is rigid with a member 148 vertically reciprocable within a bore 149 in element 141.

A stripper plate 151 is slidably guided for vertical reciprocation on posts 138 and 139 which pass through sleeves 152 and 153 rigid with plate 151. The lower flanged ends of sleeves 152 and 153 lie in a horizontal plane for contact with the horizontal upper surface of die box 96 when the latter is raised. An upper die part 154 is suitably rigidly secured to plate 151 and, like plate 151, centrally apertured to permit passage of plunger 146. Die part 154 is shaped to snugly slidably interfit with die box aperture 97. The lower surface 155 of die part 154 is smooth and shaped in accord with the desired shape of the upper side of the soap cake, and surface 155 thus forms the upper wall of the die box 96 when the upper and lower die members are brought together.

Plate 151 is suitably rigidly secured to slidable member 148 so that die part 154, plate 151, member 148 and stem 147 all move as a unit. A plurality of circumferentially spaced compression springs 156, seated in suitable end sockets normally urge plate 151 downwardly away from element 141, this downward movement being limited and stopped by contact of slidable member 148 with stationary bridge 145 as illustrated in Figure 14. In this normal position, the flat lower ends of plunger 146 and stem 147 terminate even with die surface 155, and comprise an effective continuation of that surface.

Referring to Figure 15, which illustrates the lower die member raised to the upper limit of its stroke, it will be seen that the soap cake is at once compressed to substantially final form in the completed die box and indented and molded about the lower end of plunger 146. The compression and indenting operation at station 91 preferably takes place in two stages. First the lower die member is raised for a major part of its vertical stroke by a mechanical linkage and associated cradle arrangement, and then the operation is completed under fluid pressure. Specific description of these mechanical and fluid pressure elevating devices will later be given. As box 96 ascends during the mechanically actuated part of the stroke, posts 138 and 139 first enter sleeves 98 and 99, their initial alignment being aided by the slightly conical lower ends of posts 138 and 139. Due to the snug sliding fit of posts 138 and 139 with the sleeves 98 and 99, the laterally floating lower die box 96 is automatically shifted into exact alignment and pre-location with upper die surface 155 and the letter forming plungers.

Once the die parts become thus accurately aligned, further upward movement of the lower die member brings the soap blank into contact with die surface 155. At this point further upward movement of die box 96 is unopposed, but further upward movement of soap S and rod 112 carrying lower die surface 114 is resiliently opposed mainly by springs 156, so that at the top of the mechanical phase of the upward stroke of the lower die member the soap cake has been partly compressed and reshaped toward final form in the now closed die box. Since plunger 146 is stationary, upward movement of die part 154 in response to soap pressure unsheathes stationary plunger 146 which penetrates the top surface of the soap cake. This penetration accompanied by compression of the soap in the die box effects a partial molding of the soap about the plunger by the time the mechanical stage of the stroke is completed. The resilient resistance of springs 156 is such as to insure the above-described combined compression and indentation of the soap. During this compression and indentation operation, the lower end of stem 147 maintains contact with the surface of the soap within hollow plunger 146, stem 147 rising with die part 154.

Immediately upon completion of the mechanical stage of the stroke, the fluid pressure device, preferably a hydraulically displaced piston acting on rod 112 as will later be described in detail, comes into operation to further elevate rod 112 and bottom member 113 of die box 96, thus further compressing springs 156. When upward movement of plate 151 is arrested in the position illustrated in Figure 15 by contact of member 148 with body 137, the full hydraulic pressure acts on die block 113 to complete formation of the soap cake. Completion of this hydraulic stage of the stroke places the parts in the position illustrated in Figure 15.

When the parts have attained the position of Figure 15, the top surface of the soap lies in a plane designated at 157, and the locking wedge connection between rod 112 and support 101 maintains the relative vertical positions of block 113 and die box 96 when the support 101 is lowered to its downward position preparatory to the next advance of table 72. Thus the top soap cake surface is elevated to the same level relative to table 72 each time support 101 is subsequently elevated at stations 93 and 94. Location of the top surface of the soap cake in a reference plane maintained during subsequent operations is independent of variations in the amount of soap in the blank or variations in the height of the soap cake. The hydraulic compression force resiliently suits itself to the dimensions of the soap cake so that the die is not excessively stressed or burst. As will later be explained, the mechanism for raising support 101 at the indent, insert and compression stations imparts the same upward stroke thereto so that at each of those stations the upper surface of the soap is located in the plane 157 predetermined at the indent station.

Figure 16 illustrates separation of the die members after the soap cake has been compressed and indented and just as the die members are separated sufficiently to withdraw plunger 146 from the soap. This withdrawal is effected by downward movement of the lower die member. As the soap cake moves downwardly from fixed plunger 146, die part 154 under the urge of expanding springs 156 retains pressure contact with the top surface of the soap until the soap is clear of plunger 146. During this stripping operation the end of stem 147 which is always level with surface 155 continues pressure on the land of soap within the O-shaped cavity being formed by the separating plunger 146 and thus prevents that land of soap from being pulled out of the soap. When the parts reach the position illustrated in Figure 16, plunger 146 has been stripped externally and internally from the soap and is clean and ready for the next indent operation. The soap cake is formed to desired shape and size and contains the desired letter forming cavity or cavities. The indented soap cake surface and die block 113 have now however assumed a predetermined fixed position relative to die box 96 and retained in that position during the subsequent insert operation. Further separation of the upper and lower die members brings them back to the position of Figure 14 except for such location of the soap cake, after which the machine is ready to shift the indented soap cake to the insert station at 93.

Adjustment of nut 135 is an overall height adjustment for the entire upper die member and hence of the height of plane 157, shims being inserted as required between parts 131 and 133. Adjustment of nut 143 raises or lowers element 141 and bridge 145 and thereby effects control of the depth of penetration of the soap by the plunger.

*Upper die member—Compression station 94 (Figure 8)*

The upper die member 160 at the compression station is secured upon a bracket 158 rigid with upper housing 52. A plate 159 has a central boss 161 extending through a suitable aperture in bracket 158. A nut 162 on the threaded end of boss 161 provides for vertical adjustment of plate 159 and the die body member 163 rigid therewith. Diametrically spaced posts 164 and 165 and an upper die part 166, similar to die part 154 but with a continuous surface 167, are rigidly secured to body 163. A dowel similar to that at 136 prevents rotation of the die member 160 during vertical adjustment.

At the compression station as will further appear, the inlaid soap cake is lifted into contact with upper die part 166 to give the soap cake a final and finishing compression which determines the shape of the final cake, and compresses the soap about the inserts so that the latter are more securely anchored within the soap cake.

*Lower die raising mechanism*

A face cam 168 (Figure 8) mounted on shaft 65 is formed with a cam groove 169 in which is disposed an idler roller 171 mounted on an arm 172. The upper end of arm 172 is slotted and supported on a cylindrical guide concentric with shaft 65, so that rotation of cam 168 causes arm 172 to effectively reciprocate under control of groove 69.

At its lower end, arm 172 is pivotally connected to a lever 173 which is rigid with a suitably journalled shaft 174 rockable about a fixed axis on base 50. A lever 175 rigid with shaft 174 has one end pivotally connected to a link 176, and the other end of link 176 is pivotally connected to an ear 177 on the bottom of a cradle member 178 which is mounted for vertical reciprocation in slide guides 179 and 180. At the indent station, a similar cradle 181 is mounted for vertical reciprocation in slide guides 182 and 183. An ear 184 depending from cradle 181 is pivotally connected to a link 185 whose other end is connected pivotally to a lever 186 rigid with a short rock shaft 187. Shafts 174 and 187 are interconnected by a motion transmitting link 188 pivotally connected at opposite ends to arms 189 and 191 rigid with the respective shafts so that rocking of shaft 174 by cam 168 and arm 172 effects equal angular rocking of shafts 174 and 187.

Referring to Figures 20 and 21, cradle 181 comprises a base 192, a bifurcated body 193 open circumferentially and a pair of inwardly facing track members 194 and 195 secured to the upper end of body 193 as by screws 196 and adapted to receive guide flanges 123 of support 101 as each lower die member becomes positioned at the indent station. Cradle 181 may be reciprocated in guides 182, 183 by rocking of shaft 187 to raise and lower support 101, so that cam 168 positively controls raising and lowering of the lower die member.

Within the lower end of body 193 is a cylinder 197 containing a piston 198 from which a piston rod 199 projects through the top wall 201 of the cylinder and terminates in a flat abutment member 202 adapted to contact the flat lower end of rod extension 125 depending from each lower die member. A suitable fluid tight seal is provided at 203. A flexible fluid conduit 204 opens into cylinder 197 above piston 198, and a flexible fluid conduit 205 is connected to a passage 206 in body 192 opening to the lower end of cylinder 197 at the opposite face of the piston. Thus piston 198 is positively moved by fluid pressure in either direction vertically within the cradle, a spring 207 being preferably provided within cylinder 197 to insure speedy return of the piston to its normal lower position.

Figure 17:
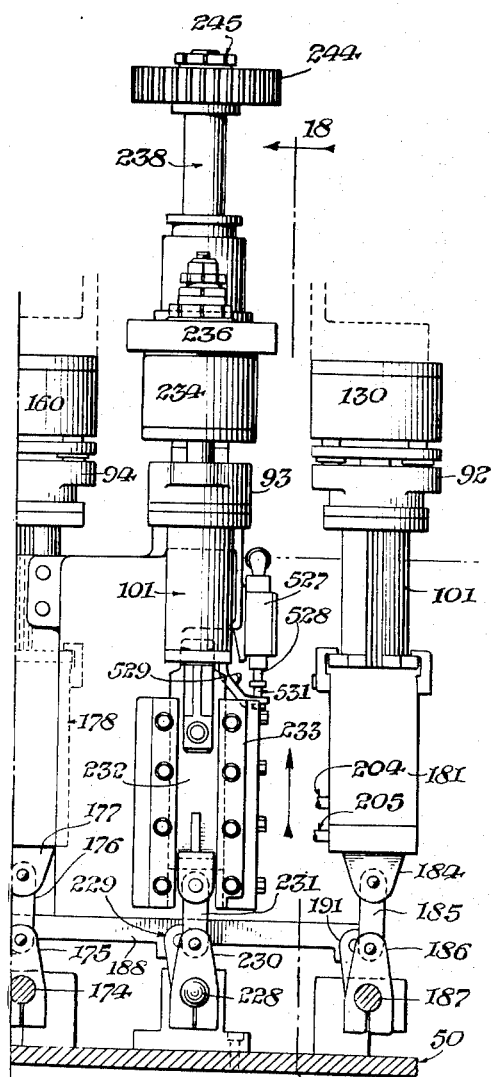
Figure 17 is an elevational view illustrating the lower die elevator mechanism at the top of the mechanical lift stroke.
Figure 18:
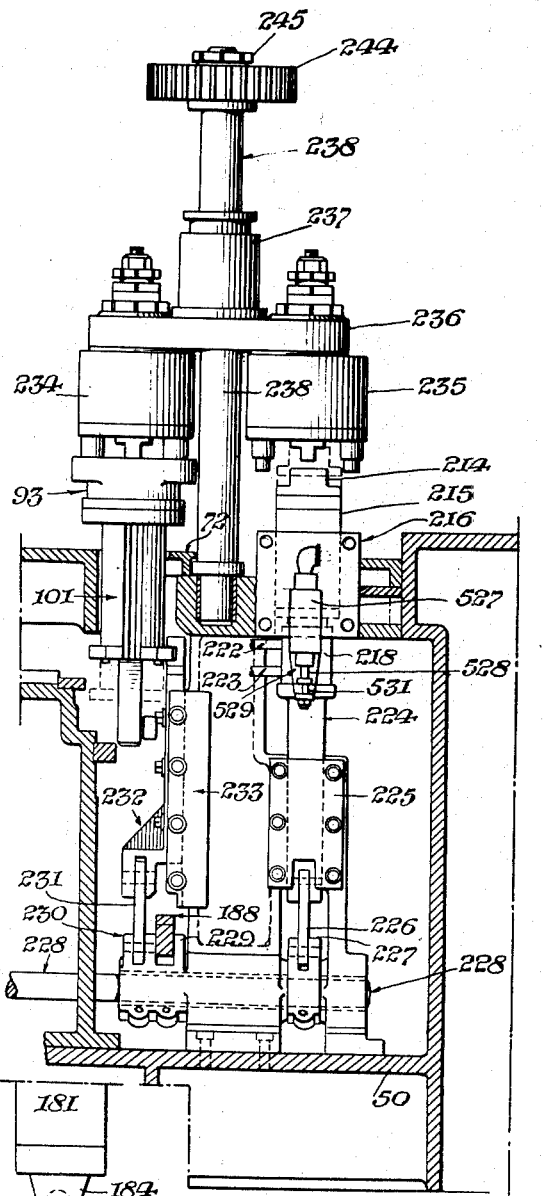
Figure 18 is an elevation of the same partly in section along line 18—18 of Figure 17.
Figure 19:
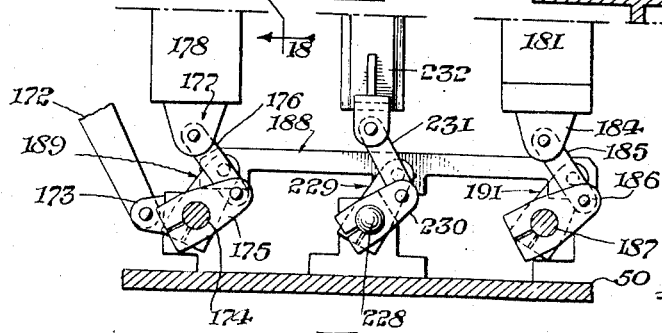
Figure 19 is a fragmentary elevation illustrating the lower part of the elevator mechanism of Figure 17 substantially at the opposite end of the mechanical lift stroke.

From the above it will be apparent that cradle 193 is raised a substantial distance by the mechanical action of cam 168, arm 172, lever 173, rock shaft 174, lever 189, link 188, lever 191, rock shaft 187, lever 186 and link 184. This mechanical lift stage is complete when shaft 187 has been rocked until lever 186 is vertical and link 185 is vertically aligned therewith as illustrated in Figure 17. At this point a fluid pressure valve assembly at 208 (Figure 5), having a valve stem 209 controlled by a suitable rock lever 211 and ram actuated lever 212 powered by shaft 65 and a suitable cam mechanism within chest 213, provides fluid under pressure through conduit 205 and passage 206 to raise piston 198 against the face of spring 207. As piston 198 raises, with cradle 181 now stationary because of a suitably timed dwell in cam groove 169, engagement of abutment 202 with the lower end of rod 112 raises rod 112 and die part 113.

The parts are so designed that the mechanical lift stage serves to lift support 101 and rod 112 together until the die box starts to compress and indent the soap cake as above described and then the fluid pressure lift stage is utilized to effect final compression and indenting of the soap within the die box. I have found that the above combination of mechanical and fluid pressure lift stages is extremely efficient. The initial mechanical lift raises the die member a longer distance than is practical with a fluid pressure lift alone, while the final fluid pressure stage enables higher compressive force to be applied than is obtainable in the mechanical lift and it takes up mechanical slack in the mechanical lift linkage. The fluid pressure lift stage accomplishes movement of the die members from the condition illustrated in Figure 21 to the indented condition illustrated in Figure 15. Furthermore the fluid pressure operation enables accurate attainment of the top surface of each soap cake in plane 157 as above explained.

Cradle 178 is substantially identical with cradle 181 and the lower die member at the compression station is subjected to the same two stage mechanical and fluid pressure lift operations simultaneously with cradle 181. Rocking of shaft 174 by cam 168 causes lever 175 and link 176 to straighten to the dead center position of Figure 17, and then the fluid pressure circuit of the piston in cradle 178 is controlled by valve 208 in parallel with the fluid pressure circuit of cylinder 197.

As soon as the two stage lift has been completed, valve 208 is actuated to reverse the fluid pressure in the cylinders in the cradles 178 and 181 and effect speedy withdrawal of the die parts, the cam groove 169 then completing downward movement of the lower die members before table 72 is rotated to the next station.

*Insert mechanism*

Referring now to Figures 9, 10, 22, 23 and 24 colored soap to be inserted into the O-shaped cavity formed in soap cake S at the indent station is provided as a reservoir 213 in a lower die box 214 suitably mounted for lateral movement as indicated at clearance 210 on the upper end of a cylinder 215 which is vertically reciprocable in a suitable guideway 216 on base 50. A piston 217 is mounted within cylinder 215 and piston rod 218, which projects through the lower end wall of cylinder 215, is formed with longitudinal fluid passages 219 and 221 opening into the cylinder respectively above and below piston 217. Passages 219 and 221 are connected by flexible conduits 222 and 223 to valve assembly 208 so as to actuate piston 217 simultaneously with pistons 198 in cradles 178 and 181.

The lower end of piston rod 218 is flat and abutted by and attached to the upper end of a push rod 224 vertically reciprocable in a suitable guide 225 on base 50. The lower end of rod 224 is pivotally connected to a link 226 which in turn is pivotally connected to a lever 227 rigid with a short rock shaft 228 suitably journalled on base 50. Shaft 228 is rocked through the medium of a lever 229 rigid with shaft 228 and pivotally connected to link 188.

Lever 230 also rigid with shaft 228 (Figure 9) is pivotally connected to a link 231 which in turn is pivotally connected to a cradle 232 mounted for vertical reciprocation in a suitable slide guide 233 on base 50. At its upper end, cradle 232 is formed with a horizontal guide track 234 adapted to receive one guide flange 123 of die member support 101 at the insert station 93 indicated in Figure 11.

When shafts 174 and 187 are rocked as above described to effect the mechanical lift stage of cradles 178 and 181, rock shaft 228 is simultaneously rocked to effect a mechanical lift stage of both cradle 232 and cylinder 215. This mechanical lift stage of cylinder 215 is followed by a hydraulic lift stage effected by applying fluid pressure under control of valve 208 to the cylinder above piston 217 whereby cylinder 215 carrying the die box 214 is raised while piston 217 remains stationary and reacting against the straightened linkage illustrated in Figure 17. There is no fluid pressure lift stage at the insert station 93 since no soap compression is here effected and the plane 157 of the top surface of the soap has been prelocated at the indent station. The lift of cradle 232 at once accurately locates the soap cake at the proper level ready for the insert operation.

The movable upper die members for picking up colored soap from reservoir 213 and discharging it as properly shaped inserts into the cavities in the soap cake at the insert station 93 are preferably two in number and are indicated at 234 and 235. Die members 234 and 235 are identical and mounted in fixed diametrically opposite relation upon the horizontal flange 236 of a supporting hub 237 non-rotatably and axially fixed on a vertical shaft 238. The upper end of shaft 238 is journalled in a suitable stationary boss 239 on upper housing 52 lined with radial bushings which give the shaft lateral bearing support. The lower end of shaft 238 is mounted in a suitable thrust bearing assembly 241 and terminates in a lateral bearing support bushing 242 in base 50 (Figure 10).

Above boss 239 (Figure 9), the tapered upper end of shaft 238 is non-rotatably secured, as by key 243, to a spur gear 244 in constant mesh with cam driven gear 84. A nut 245 holds gear 244 against axial movement on the shaft. When gear 84 and table 72 are rotated each one-fifth of a revolution by cam 87 to intermittently shift the soap from station to station in the machine, shaft 238 is simultaneously turned through one-half a revolution to position a fresh colored soap charge above station 93. This relative movement is attained by a five to two gear ratio for gears 84 and 244.

Referring now to Figure 10, each movable upper die member 234 or 235 comprises an upper plate 246 having an upstanding hollow boss 247 projecting through a suitable aperture in flange 236. An overall height adjustment nut 248 is provided on the threaded end of boss 247 above flange 236. Plate 246 has rigidly secured thereto a depending body member 249 in which are rigidly seated diametrically opposed vertical guide posts 251 and 252 adapted to enter the bushings 98, 99 in the die box therebeneath.

A stripper plate 253 is slidably connected to posts 251 and 252 as by bushing sleeves 254 and 255 rigid with plate 253. The flat lower ends of bushings 254 and 255 lie in a common horizontal plane. Plate 253 is suitably fixed to the lower end of a die element 256 mounted for vertical reciprocation within body 249. A die part 257 having a nose 258 shaped to snugly fit with the walls of reservoir 213 is fixed to the bottom of plate 253.

A hollow plunger 259, shaped and sized exactly like plunger 146, is fixed at its upper end to a plate 261 vertically slidable within the lower end of a plunger support member 262 which serves as an inner guide for element 256. Plunger 259 projects downwardly through a suitable aperture in plate 253 and slidably through a suitable aperture in die part 257. Support 262 has a hollow boss 263 which projects upward through boss 247 and is threaded above boss 247 for reception of a locknut 264. Beyond its threaded portion, boss 263 is formed with a wrench attachment adjustment flange 265.

Slidable within boss 263 is a rod 266 secured at its lower end to a bridge 267 which in turn is vertically slidable within support 262. A stem 268 rigid with bridge 267 extends through the center of plunger 259 to terminate just below the flat lower surface of nose 258 as illustrated in Figure 10. The upper end of rod 266 is threaded for reception of an adjustment nut 269 bearing on flange 265.

Plunger support 262 and plate 253 are normally urged apart by a series of circumferentially arrayed compression springs 270 suitably seated in sockets in these parts, so that normally plunger 259 is disposed with its flat lower end flush with the flat bottom face of die part 257 and stem 268 fills the hollow of the plunger and projects a small fraction of an inch therebeyond. This condition is illustrated at the right in Figure 10. Before the charging operation, plate 261 is maintained by its own weight in the normal lower position illustrated in Figure 24.

In operation, to charge the upper die, die box 214 is raised by the above described two stage mechanical and fluid pressure operations so that the nose of die part 257 enters the die box and is forced against the top surface of the reservoir of colored soap. Since die part 257 is resiliently backed, this results in resilient compression of the colored soap in the die box. The mechanical lift stage substantially raises the die box until nose 258 enters the reservoir space, this action being facilitated by the illustrated slightly bevel lower corners of nose 258 and the lateral float into exact alignment permitted by the clearance at 210. Then the fluid pressure stage brings the die members together under higher pressure.

As illustrated in Figure 22, this action compresses the colored soap in reservoir 213 and some of it is extruded by that compression up into the O-shaped recess formed when plunger 259 rises in response to soap pressure. As plunger 259 rises, plate 261 rises freely within support 262 until it contacts stop face 271 on support 262, this condition of the upper die member being illustrated best in Figure 23.

During this compression and extrusion of the colored soap, rod 266 is rigidly backed and held against vertical displacement by a stop 272 (Figure 9) mounted for vertical adjustment on housing 52, as by a suitable fixture 273, and adapted to engage the upper end of rod 266. An annular downwardly facing track 274 which is continuous except for stop 272 is suitably secured to housing 52 coaxially with shaft 238. Track 274 is never higher than stop 272 and slopes away therefrom on the approach side so that the upper end of rod 266 is forced downward as it approaches stop 272 but is not backed when it is located above the insert station 93, for a purpose to appear.

The reason for rigidly backing rod 266 at the charging station only is to prevent stem 268 from rising in response to soap pressure and thereby insuring that the closed outline letter O is formed in the charge or insert within die part 257. The distance that plunger 259 rises vertically before stopped by face 271 determines the height of the insert element 275, and this dimension may be adjusted by manipulation of flange 265 and locked by nut 264.

Figure 22 illustrates the condition of the upper die elements at the colored soap charging station after the plunger has been forced into contact with stop 271. Since motion is caused by hydraulic pressure, it ceases when the parts have come into contact. Separation of die box 214 and die part 257 is made by reversing the fluid pressure in cylinder 215 and lowering push rod 224 under control of cam 168. When the separation occurs, the formed O-shaped insert element 275 breaks cleanly and evenly with the upper surface of the soap in reservoir 213 due to the low tensile strength of the soap, leaving the reservoir with a flat upper surface ready for the next charging operation without further treatment. This is an important aspect of automatic operation.

The charging of upper die member 235 with insert element 275 and separation of the die part 257 and die box 214 takes place while the shaft 238 is stationary. At the same time the other movable upper die member 234 discharges its insert element 275 into the preformed O-shaped cavity in the soap cake.

Figures 10 and 23 illustrate the charged upper die member 234 poised above the indented soap cake at station 93. As soon as table 72 becomes stationary the lower die member is raised under control of cam 168 and through cradle 232 to locate the upper surface of the soap cake in the plane 157 predetermined by the wedge lock between rod 112 and support 101 during the preceding indent and compression operation.

As the lower die member rises, posts 251 and 252 enter bushings 98 and 99 and lateral float of the die box 96 provides automatic alignment of insert 275 with the cavity in the soap cake therebeneath. As the lower die member further rises, the flat top surface of die box 96 engages the lower ends of sleeves 254, 255 whereby resilient resistance of the springs 270 is encountered. At this time the lower surface of nose 258 is not in contact with the top surface of the soap. Further upward movement of die box 96 results in positively raising the die part 257 against the force of springs 270, and since plunger 259 is stationary the uncovered insert element 275 enters the cavity. Stem 268, being no longer rigidly backed, moves upward with the soap cake to the position illustrated in Figure 24, rod 266 sliding upwardly within boss 263. The entire insert operation is accomplished by the mechanical lift of cradle 232.

Figure 24 illustrates the position of the die members when withdrawn from each other after the above described insert operation leaving insert element 275 within the soap cake, the die element assuming the relative positions they occupied prior to the charging operation. Stem 268 will normally tend to assume its lower position due to its own weight, but even if it should initially stick at its upper position after separation of the die members, track 274 will push down on rod 266 to lower it for positioning beneath stop 272 when the station is changed.

For some purposes it may be desirable to make insert 275 of slightly longer than the depth of cavity in the soap cake so that on the succeeding compression operation the insert will be laterally thickened to fill out the .005" clearance with the cavity and become anchored therein.

*Transfer mechanism*

Figures 25–30 illustrate a preferred transfer mechanism 290 for picking up a soap blank from a supply conveyor and delivering it to a feed device, later to be described and preferably identical with that illustrated in Figures 33–39, which positions the blank within the die box 96 currently at the soap-in station designated at 91.

In practice of the invention, freshly cut soap blanks from the plodder may be brought to the vicinity of the edge of turn table 72 as by a suitable conveyor belt 280 from which it is transferred into the machine. This transfer mechanism is essentially a four motion jaw feed device controllably driven by suitable cams on main cam shaft 71 in timed relation to the movement of the other parts of the machine. It is mounted in a frame 281 which is secured to upper housing 52 and formed with a lateral flange 282.

A jaw member 283 which opens downwardly and is of substantially rectangular shape and of a width larger than the width of the soap blank to be transferred from the conveyor 280, is fixedly mounted on the lower end of a rod 284 which is substantially square in cross section as illustrated in Figures 29 and 30. Rod 284 is mounted for reciprocation in a suitable vertical guide channel in a horizontal slide member 285. The laterally open end of the guide channel in member 285 is closed by a cover plate 286 bolted or otherwise removably secured thereon for convenient access to the interior.

A dovetailed stationary guide member 287, is illustrated at Figure 25, preferably projects laterally to a position at least above the soap blank on conveyor 280 so as to enable the slide member 285 to slide horizontally sufficiently for positioning jaw 283 above the conveyor. Guide 287 is secured to frame 281 as by cap screws 288, as illustrated best in Figure 29. Horizontal slide member 285 is formed with a suitably shaped guide recess adapted to interfit with guide 287 so as to be supported thereby and guided for horizontal sliding movement during the four motion feed cycle of the jaw 283.

Horizontal reciprocation of slide member 285 is effected by means of a crank 289 which has its hub journalled on a suitable pivot pin 291 rigid with frame 281 as best illustrated at Figure 30. One arm 292 of crank 289 extends downwardly from pivot 291 and is formed at its lower end with an enlarged head 293 formed with an elongated slot 294 in alignment with arm 292. Slot 294 embraces a cylindrical follower pin 295 mounted on the outer side of slide 285. Pin 295 is preferably fixed to slide 285, and a bushing 296 is provided between the cylindrical head of pin 295 and slot 294 to provide a frictionless sliding connection between the two as crank 289 is rocked. This provides a connection permitting relative vertical movement between crank arms 292 and horizontal slide member 285 during rocking of the crank.

At the other end of crank 289, arm 297 is pivoted at its free end at 298 to a short link 299 which in turn is pivotally connected at 301 to the lower end of a rod 302 mounted for reciprocation and a suitable vertical guideway in frame 281. Rod 302 is formed at its upper end with an enlarged socket 303 removably held thereon by a nut 304 adapted to rockably receive the bifurcated end of a cam actuated lever 305 which is rockable about a horizontal axis as will later be described in detail.

Rocking movement of lever 305 causes vertical reciprocation of rod 302 and, through link 299, causes rocking of crank 289 to effect horizontal sliding movement of member 285 along guide 287. Short link 299, being freely pivoted at both ends, permits relative horizontal movement between crank arm 297 and rod 302 while transmitting actuating motion. Horizontal movement of slide 285 effects horizontal displacement of rod 284 and jaw 283, which are transversely solid therewith.

Vertical reciprocation of jaw 283 is accomplished in the following manner. Intermediate its ends rod 284, as illustrated best in Figure 25, is formed with a laterally facing recess 306 adapted to rockably receive in motion transmitting connection the cylindrically headed end 307 of a lever 308 which, as illustrated best in Figure 29, is pivoted for rocking about a horizontal axis perpendicular to slide 287 upon a cylindrical pin 309 rigid with slide 285. A suitable bushing 311 provides an anti-friction connection between lever 308 and its pivot.

Intermediate its ends, lever 308 has mounted thereon a freely rotatable roller 312 slidably disposed in an inwardly facing elongated horizontal drive and guide slot 313 formed on the enlarged head 314 of the lower end of a rod 315 which is mounted for reciprocation in a suitable vertical guide in frame 281. At the upper end of rod 315, a socket 316, formed to rockably receive the bifurcated end of a lever 318, is secured thereon as by nut 319. As will later appear, lever 318 is rockable about a horizontal pivot common with lever 305.

Rocking of lever 318 effects vertical reciprocation of rod 315 which in turn rocks lever 308 about its pivot 309, and lever 308 imparts vertical reciprocation to rod 284 and jaw 283. By providing the elongated slot 313, I insure that lever 308 and rod 315 remain in motion transmitting contact during the entire horizontal traverse of slide member 285 without interfering with that horizontal movement.

In operation, starting with jaw 283 in its dotted line normal initial position of Figure 25, the rocking movement of levers 305 and 318 are cam controlled in timed relation as will later be described in more detail, so that jaw 283 is first moved horizontally to the right in Figure 25 to a position just above the soap blank on conveyor 280 then lowered vertically to embrace the soap blank, then moved horizontally to the left in Figure 25 to place the soap blank between the jaws of the feed device of Figures 33-39, and then retracted to the initial dotted line position so as to be out of the way when that feed device swings to place the soap blank in the die box. Rock levers 305 and 318 are suitably journalled intermediate their ends upon a horizontal pivot shaft 321 rigidly mounted in upper housing 52 near cam shaft 71. At its inner end, lever 305 is provided with a laterally projecting roller 322 which functions as a cam follower disposed in a suitably contoured face cam groove 323 on a disc cam 324 rigid with shaft 71. Similarly rock lever 318 carries adjacent its outer end a roller 325 which functions as a cam follower disposed in a suitably contoured face cam groove 326 formed in the side of main drive cam 87.

According to the invention, I contemplate employing substantially exactly this same transfer mechanism structure above described for accomplishing four motion feed of a similar jaw for removing the completed soap cakes from the machine, as illustrated at 290' in Figure 4. This removal transfer mechanism will function to pick up the soap from the swinging feed device of Figures 33-39 which is mounted adjacent soap-out station 95 and shift the soap cake onto a suitable conveyor for carrying the completed article away from the machine for wrapping and packaging. As illustrated in Figure 7, rods 302' and 315', corresponding to rods 302 and 315 of Figures 25 and 30, are vertically reciprocated by rock levers 305' and 318' which are journalled on the shaft 321. Followers 322' and 325' on the respective rock levers are disposed within face cam grooves 323' and 326' corresponding to cam grooves 323 and 326 on cam 87 and a cam 324' rotatable with shaft 71. Cam grooves 323' and 325' are also suitably contoured to accomplish the necessary actuation of the removal transfer mechanism in timed relation to the movement of the turntable 72.

At station 91, where the soap blank is transferred to the jaws of the pivoted feed device, a tamper 327 is provided for insuring that the soap blank leaves the gripping jaws of the pivoted feed device and drops into the die box 96 before the turn table is revolved to the next position. The mechanism for actuating this tamper is also operated in timed relation with the movement of jaw 283 as will now be described.

Tamper 327 is preferably a flat horizontal plate secured as by cap screws 328 to the lower end of a rack bar 329 mounted for vertical reciprocation in a suitable guide 331 in frame 281. Rack bar 329 may be removed by taking off removable cover plate 332 closing one side of the guide.

Rack bar 329 is formed at its upper end with a toothed portion 333 constantly meshed with a pinion 334 fixed on one end of a horizontal shaft 335 suitably mounted for rotation in frame 281. The other end of shaft 335 has secured thereto a smaller pinion 336 in constant mesh with a segmental gear 337 formed on the end of a sector arm 338 pivoted at 339 on stationary frame 281. At its other end, the bifurcated end of arm 338 is pivotally connected at 341 to one end of a short link 342, and the other end of link 342 is pivotally connected at 343 to the lower end of a rod 344 suitably mounted for vertical reciprocation in stationary frame 281.

At the upper end of rod 344, a suitable socket 345 is held thereon by a nut 346, and socket 345 is shaped to rockably receive the bifurcated rounded end of a rock lever 347 which is journalled on shaft 321 and carries at its outer end a roller 348 functioning as a cam follower in a suitably contoured face cam groove 349 on the opposite side of cam 324 from groove 323.

When lever 347 is rocked by cam 349, rod 344 will be vertically reciprocated and such motion is transmitted to vertical reciprocation of tamper 327 between the full line and dotted line positions shown in Figure 25. The short link 342 provides a connection between the end of rod 344 and sector arm 338 to permit the free pivoting of that arm under the influence of rod 344. The actuation cycle of tamper 327 takes place once every one-fifth of a revolution of table 72 and only after the pivoted feed device has placed the soap blank in the horizontal dotted line position immediately below tamper 327 in Figure 25. Tamper 327 is preferably narrow to avoid contact with the upwardly rotating feed device jaws after the tamping operation.

Obviously there is no necessity for the tamping device in the transfer mechanism at the station 95 where the soap cake is taken off the turn table and delivered to jaw 283 so that the tamper and associated operating mechanism are omitted at the soap take out station.

Since gears 57 and 69 are of the same size, shaft 71 and the cams thereon make one complete revolution for each time the turntable 72 is advanced one-fifth of a revolution by cam 87. Grooves 88 and 89 on cam 87 contain a dwell section which provides the intermittent motion of turntable 72 by maintaining the turn table stationary for a predetermined length of time after each one-fifth revolution. This length of time or dwell period is sufficient to accomplish simultaneously and separately feed-in of the soap blank to station 91, the successive operations on the soap at stations 92—94 and the removal of the soap cake at station 95. Cam grooves 323, 326 and 349 are so contoured with suitable dwell and actuator sections and relatively angularly arranged in fixed relation with respect to each other and cam 87 as to accomplish all the above described movements of the feed transfer and tamper mechanisms in timed and predetermined relation during the dwell period of table 72. Similarly cam grooves 323' and 326' are so contoured with suitable dwell and actuator sections and relatively angularly arranged in fixed relation with respect to each other and cam 87 as to accomplish the above described removal of the soap cake from station 95 during the dwell period of table 72.

Cams 323 and 326 are so related to cams 323' and 326' that the transfer mechanism at stations 91 and 95 are concurrently but reversely actuated, so that operation of the machine is continuous as long as soap blanks are supplied to it. No further specific disclosure of the cams is believed needed to understand the invention since any suitable cam or equivalent mechanism may be used to secure timed actuation of the various parts.

*Apparatus for feeding soap between turn table and transfer mechanism*

Referring now to Figures 31 through 40, the cam shaft 68 which extends horizontally across the front end of base 50 is suitably rotatably suspended upon hangers within the base and has rigidly secured for rotation therewith four cams arranged in pairs 351, 352 and 353, 354. These cam pairs are arranged respectively beneath top surface of base 50 adjacent stations 91 and 95 of the turn table, for actuation of two similar swinging feed devices 350 and 360, one for taking the soap blank from a jaw 283 and depositing it in the die box at the soap-in station 91, and the other for removing the completed inlaid soap cake from the turn table and positioning it to be received by the jaw 283 at station 95. Attention is directed to Figures 33 through 39 wherein will be described the actuation of the take-off feed device 360 at the soap take-out station 95.

Each feed device is carried on bracket 355 (Figure 33) suitably secured to the top surface of base 50 adjacent the rim of turntable 72. Bracket 355 comprises a pair of parallel upstanding end columns 356 and 357. A horizontal rock shaft 358 (Figures 34 and 36) extends between the upper ends of columns 356 and 357 and is suitably rotatably supported therein.

A pair of spaced clamps 359 and 361 are rigidly secured to shaft 358 adjacent upstanding columns 356 and 357. A pair of jaw carrying arms 362 and 363 are pivotally mounted upon clamps 359 and 361 at pivots 364 and 365 respectively, these latter pivots being perpendicular to the axis of shaft 358. At the outer ends of arms 362 and 363, jaw elements 366 and 367 are mounted for limiting rocking movement about pivots 368 and 369 parallel to pivots 364 and 365. As illustrated in Figure 36, each such jaw has a smooth soap engaging face, and its rocking movement is limited by lugs 370 formed on arms 362 and 363. The purpose of this limited rocking movement is to enable the jaws to find full surface engagement with the ends of the soap blank or cake gripped thereby. Intermediate their pivots on the clamps and the rockable jaws, arms 362 and 363 are resiliently interconnected by a tension spring assembly indicated at 371 which normally urges jaws 366 and 367 toward each other.

Arms 362 and 363 at their inner ends are integrally formed with short crank extensions 372 and 373 terminating in hollow bosses in which are journalled headed pivot pins 374 and 375. As illustrated in Figure 38, pins 374 and 375 have their heads secured by suitable pin and slot connections to the reduced terminals 376 of plungers 377 and 378 slidably mounted diametrically of shaft 358. A suitable guide sleeve 378 surrounds shaft 358 adjacent each plunger to provide added support, and as illustrated in Figure 38, each plunger projects radially from the sleeve a sufficient distance to permit actuation by the cam controlled rocker arm described below.

When plungers 377 and 378 are displaced radially of shaft 358, upwardly in Figure 38, such causes simultaneous outward rocking of arm 362 and 363 about their pivots, thereby separating the jaws 366 and 367 against the force of spring assembly 371. The above mentioned pin and slot connections provide suitable loss motion connections between the plunger terminals and pivot pins 374 and 375 to permit necessary relative lateral displacement of these parts as the arms rock during operation. Return rocking movement of arms 362 and 363 under the urge of spring 371 is limited by engagement of cranks 372 and 373 with the respective guide sleeves on shaft 358.

Plungers 377 and 378 may be simultaneously displaced in either of two 90° apart positions by rocker 383 best shown in Figure 38. Rocker 383 is rigidly secured to a shaft 384 which is suitably journalled in an elongated boss 385 extending inwardly from side column 357. Rocker 383 comprises a pair of rigid arms 386 and 387 disposed at 90° to each other, and these arms are provided with respective pairs of adjustable terminal stops 388 and 389, each pair being adapted to coact with the plungers 377 and 378 when the latter are aligned therewith in either of the two permissible positions of the rock shaft 358. Adjustment of terminals 388 and 389 may determine the stroke of the plungers and the separation of jaws 366 and 367.

In Figure 38, the plungers are illustrated as disposed for actuation by stops 389, the relation of the parts being that which occurs when the arms 362 and 363 are in the vertical position illustrated in Figures 36 and 37. In moving the soap from that position to the die box, shaft 358 is rocked through 90° to align plungers 377 and 378 with stops 388. This condition where the device is horizontal is illustrated in Figure 34. Thus in either of the 90° limit positions of the swinging feed device, and only in those 90° positions, may the soap gripping jaws be spread apart.

Shaft 358 has at one end within column 357 a pinion 390 constantly meshed with rack teeth on the upper end of a rod 391 mounted for vertical reciprocation in bracket 355. Referring now to Figure 35, the lower end of rod 391 which projects within base 50 is formed with a socket 392 for receiving the disc-headed end of a crank arm 393 piveted about a fixed axis at 394 in a hanger 395 secured to the under surface of the top of base 50. The other end of crank arm 393 carries a freely rotatable roller 396 which functions as a cam follower, being disposed within a suitable face cam groove 397 on the side of cam 354. Rotation of cam 354 imparts rocking motion to crank arm 393 which in turn causes vertical reciprocation of rod 391 and thereby effects rocking of shaft 358.

The connections between crank arm 393 and rod 391 is a resilient lost motion connection, the opposite sides of the ball end of crank arm 393 being engaged by spring pressed pins 398 at opposite sides. The purpose of this resilient lost motion connection is to absorb the motion of the crank arm after the limit positions of the device are attained.

Shaft 384 is rocked in timed relation with shaft 358, being provided at its inner end with a pinion 399 constantly meshed with rack teeth on the upper end of the vertically reciprocable rod 401 which extends below the surface of base 50 and is formed with a socket 402 for receiving the end of a crank arm 403 also pivoted at 394. At its other end the crank arm carries a freely rotatable roller 404 which functions as a cam follower in a suitable face cam groove in cam 353.

In operation, shafts 358 and 384 are rocked in timed relation. Swinging movement of the device between its normal upright position illustrated in Figure 37 through an arc of 90° down to the horizontal position illustrated in Figure 35 and then back to upright position takes place once during every time that turntable 72 rotates a fifth of a revolution. Figure 34 illustrates the condition which exists when the jaws 366, 367 have just gripped a finished inlaid cake of soap at station 95 preparatory to moving it into the jaw 283 of the transfer mechanism. The soap being gripped in the jaws and the feed device being in its horizontal position over the die box, actuation of cam 354 causes counterclockwise rocking of shaft 358 to raise arms 362, 363 and the soap held thereby to the vertical position illustrated in Figures 36 and 37. At the time the soap reaches this position, jaw 283 of the transfer mechanism which is operated in timed relation with the feed device by reason of suitable design of the cams controlling them is brought downward to embrace the sides of the soap bar as illustrated in Figures 36 and 37. Then cam 353, which has been undergoing a dwell period, becomes effective to rock shaft 384 so that stops 388 engage and displace plungers 377 and 378 to effect separation of jaws 366 and 367, thereby enabling the subsequent horizontal stroke of jaw 283 to shift the soap cake to the right in Figure 37 and onto a suitable conveyor for carrying it to a packaging machine or the like.

The feed device then remains stationary and upright until table 72 rotates another fifth of a revolution to position a freshly finished cake of soap at station 95. The jaws are also rocked toward closed position by spring 371. Then cam 354 causes rock shaft 358 to swing arms 362 and 363 downward into the horizontal position illustrated in Figures 34 and 35. Just at the end of this swinging movement and before the soap is contacted, cam 353 rocks shaft 384 to again effect spreading of the jaws and subsequently release them to firmly grip the soap cake while the arms are in the horizontal position.

Rocking of shaft 358 is limited at 90° by providing a suitable stop collar 405 rigidly secured as by a set screw 406 on the free end of shaft 358. Collar 405 is provided with flat radial stop faces 407 and 408 which are disposed in a plane containing the axis of shaft 358 and during operation are adapted to engage stationary stop faces 409 and 411 of a segmental stop 412 rigid with bracket 355. It is seen therefore that rocking of shaft 358 is positively limited to 90° in either direction by the action of these stop faces and the resilient connection between the cam driven crank arm 393 and rod 391 affords the necessary lost motion when either of the limits has been reached.

The above described cycle of operation is carried out every time a completed cake of soap arrives at soap-out station 95. The feed device is rocked from its vertical position down to horizontal position, the jaws are clamped tight on the ends of the soap bar, the device is rocked back up to vertical, the jaws are released and the jaw 283 of the transfer mechanism takes over to transfer the soap to a delivery conveyor.

The oppositely facing surfaces of jaws 366 and 367 are preferably smooth and shaped to conform with the contour of the soap so that they do not scarify the soap. The limited rocking movement permitted by their pivoting abutment connection with the arms 362 and 363 enables them to seek full surface engagement with the ends of the soap bar regardless of the parallelism of the latter. This is important because it enables the soap cake to be firmly gripped with maximum efficiency.

Exactly the same type of device as above described is employed adjacent station 91 for picking up the soap blank from jaw 283 of the transfer mechanism at that point and swinging the blank down to deposit it in the die box. Cams 351 and 352 actuate crank arms 393' and 403' which in turn actuate vertically reciprocable rods 391' and 401', of the swinging feed device 350 which is structurally the same as device 360. The only difference is that the arrangement of the cams and other parts of device 350 parts is always currently the reverse of that above described, so that the two identical feed devices operated by cam pairs 351, 352 and 353, 354 operate currently but in opposite motions for simultaneously providing a fresh soap blank and taking out a finished inlaid soap cake during the dwell period of turntable 72 at each station. The jaws of feed device 350 thus open and grip the soap blank at the upright position of the arms 262, 263 rather than the lower position, and are opened at the lower position where synchronized tamper 327 comes down to insure that the blank leaves the jaws.

*Soap raising mechanism for take-out*

When the completed soap cake arrives at soap-out station 95, it is deep within die box 96. In order to position it for gripping by jaws 366 and 367 of the swinging feed device 360, it is necessary to raise the soap cake out of the die box to position it where its opposite ends may be gripped by the jaws. I accomplish this by automatically raising the vertically slidable bottom part 113 of the die box until the finished soap cake is disposed above the level of the die assembly on table 73 as illustrated in Figure 40. This is accomplished by the cam driven mechanism illustrated at the left side of Figures 31 and 32.

On the other hand, when turntable 72 has rotated from the soap-out station 95 to the soap-in station 91 preparatory to receiving a new blank, it is essential that the bottom surface 114 of die box 96 be at its lowermost position, and I have provided a positive cam-actuated arrangement for restoring the bottom die box wall which was elevated at station 95 to its lower position. This is accomplished by the cam driven mechanism at the right side of Figures 31 and 32.

A cylindrical cam 415, rigid with shaft 68 at the left of Figure 31, is provided with a cam groove 416 in which is disposed a roller follower 417 mounted on one arm 418 of a crank journalled upon a fixed axis pivot 419 on base 50. The other arm 421 of this crank extends parallel to a lever arm 422 of the same length pivoted at 423 on base 50. Pivots 419 and 423 are vertically aligned. The free ends of arms 421 and 422 are pivotally interconnected by a link 424, providing a substantially parallelogram linkage. At the lower part of this linkage, a roller 425 preferably in axial alignment with the pivot on the end of arm 422 is mounted and adapted to be received within a recess 426 formed in a plunger 427.

Plunger 427 is mounted for vertical reciprocation in a stationary guide 428 which is formed with an enlarged lateral aperture 429 of such axial extent as to permit entry and the necessary vertical movement of roller 425. At its upper end, plunger 427 is formed with a lateral recess 431 (Figure 40) facing in the radially opposite direction from recess 426, adapted to receive roller 126 on the bottom of die member 125 which is rigid with the die box bottom part 113.

Rotation of cam 415 rocks the parallelogram linkage above described to cause vertical reciprocation of plunger 427. When a die assembly is positioned at station 95, which is the case during every dwell between each intermittent movement of turn table, the plunger is then coupled to the bottom part 113 of the die box by reason of entry of roller 126 into plunger recess 431 as shown in Figure 40 and the upward stroke of plunger 427 will now raise the soap cake to the exposed position illustrated in Figure 40 where it is available to be gripped by the swinging take-out feed device 360. The stroke of plunger 427 is at least equal to the thickness of the soap cake.

Between stations 95 and 91 of the turn table, roller 126 in its raised position leaves groove 431 and enters and travels along a horizontal guide track 432 (Figure 41) which maintains the lower die box surface 114 in raised position during the entire one-fifth rotation of turntable 72 between stations 95 and 91. This track, as illustrated in cross-section in Figure 41, is rigid with base 50 and it is a circular arc equal in length to the distance between plunger 427 and the corresponding plunger of the similar mechanism about to be described for positively depressing the bottom of the die box at station 91. Track 432 is open and aligned with respect to the plunger recesses at its opposite ends so that bottom surface 114 of the die box is constrained to its raised exposed position during its entire movement from station 95 to station 91 chiefly to permit that surface to be brushed clean by a brush structure later to be described. A continuously coextensive arcuate guard rail 440 is rigid with base 50 opposite track 432 as illustrated in Figure 41.

Figures 40 and 41 also illustrate the horizontal track 441 on base 50 on which rollers 124 at the bottom of support 101 rest and run as turntable 72 rotates between stations. This track is substantially continuous and annular, being interrupted only at stations 92, 93 and 94 where support 101 is raised.

Track 432 ends at station 91. A plunger 433 is formed with a recess (not shown) similar to recess 431 for receiving roller 126 when the latter leaves track 432 and stops at station 91, plunger 433 being in raised position at that time. Plunger 433 is reciprocably mounted in a vertical guide 434 and formed with a lower recess 435 in which is disposed a roller 436 carried by a parallelogram link mechanism 437 similar to that at station 95. Roller 436 and this linkage are actuated to reciprocate plunger 433 through a crank 438 driven by a cam 439 similar to but of reversed contour to cam 415. The mechanism between each cam and plunger is preferably structurally the same, but the cam grooves on the respective cams are so contoured and displaced as to simultaneously reversely move the plungers. When plunger 427 is being positively raised to push out the completed soap cake, plunger 433 in timed relation is being positively lowered to provide the cavity in die box 96 for deposit of the fresh soap blank.

The action of raising the soap cake at station 95 is so timed relative to the swinging of feed device 360 that the soap cake is in its fully raised position of Figure 40 when the feed device has been swung to its horizontal position. Similarly the lowering of die part 113 is so timed relative to the swinging of feed device 350 that it is in its lowermost position by the time the jaws release the soap blank.

Die cleaning brushes

Since the soap being handled is a relatively adherent plastic mass, fragments or films of soap may become deposited on the upper and lower die surfaces, which may interfere with satisfactory operation of the machine especially when the accumulation of such becomes excessive. In my machine according to the preferred embodiment of the invention, I provide an upper brush which is adapted to automatically clean lower die surface 114 once during every revolution of the turn table, this brush acting on elevated surface 114 as it passes between the soap-out station 95 and the soap-in station 91. A lower brush assembly is also provided for cleaning the bottom surfaces of the upper die members at the two compression stations 92 and 94, once during every revolution of the turn table.

Upper brush

The function of the upper brush is to clean the smooth surface 114 of the lower die member while the latter is elevated by the mechanism above described in connection with Figures 31 through 40 and while turntable 72 is rotating from station 95 to station 91.

The upper brush comprises a bristle assembly indicated at 442 in Figure 9 mounted in a suitable rotatable holder 443 which is journalled in a bracket 444 rigid with upper housing 52, and brush 442 is constantly rotated about its axis as by a belt drive 445 with the vertically extended spindle 446 of a motor 447 mounted at the top of housing 52 adjacent the front end of the machine.

As illustrated best in Figure 11, the preferred location of the rotating upper brush is in circumferential alignment with the stations on the turn table half way between stations 95 and 91, so that as raised die surface 114 passes it during rotation of table 72 surface 114 will be subjected to a thorough scrubbing which removes all of the film and fragments of soap or other impurities which may have accumulated thereon during the cycle. Since each lower die member surface 114 is so raised once during every revolution of table 72, it is completely scrubbed free of the soap before starting a new cycle of soap handling.

Lower brush

The function of the lower brush is to clean surface 155 of the upper die assembly at indent station 92 and to clean the corresponding surface 167 at final compression station 94. The lower brush, which is rotatably driven about its axis like brush 442, is carried by the turntable 72 and is automatically raised into scrubbing contact with those two die surfaces each time it passes them during each revolution.

Referring now to Figure 45 which illustrates the mounting of the lower brush on the turn table, the brush comprises a cylindrical bristle arrangement 450 mounted in a suitable holder 451 rigid with a vertical shaft 452 rotatably mounted in a suitable step and thrust bearing assembly 453 in a sleeve 454. The axis of shaft 452 is perpendicular to the path of turntable 72 and is disposed in the same circumference as in the center of each station 91 to 95, so that when brush 450 is raised it will be automatically positioned to brush the entire die member surface with which it is associated. Sleeve 454 is non-rotatably but vertically slidably mounted in a coaxial support 455 suitably rigidly mounted on table 72. A slidable and non-rotatable connection is provided between sleeve 454 and support 455, as by a radial key 456 rigid with sleeve 454 interfitting with a slot 457 in support 455. At the lower end of support 455, an annular rim 458 is secured for supporting sleeve 454 and for thereby limiting its movement downwardly.

Thus shaft 452 carrying brush 450 is axially fixed and supported for rotation about a vertical axis in a sleeve which is vertically slidable with respect to the turn table. Normally brush 450 is disposed in a cup-shaped guard 459 rigid with table 72. Below holder 451, shaft 452 is formed with an elongated spline section 460 which is engaged with mating splines on the interior of a hub 461 mounted on turntable 72 for rotation about the axis of shaft 452. Hub 461 is journalled for rotation on a sleeve 463 and held against axial displacement by a thrust washer 461a and a nut 465 threaded on the lower end of hub 461. Sleeve 463 is rigidly secured to table 72 and hub 461 rotates upon it as a bearing in the manner described below.

Hub 461 is peripherally formed with gear teeth 466 which are in constant mesh with an idler gear 467 suitably rotatably mounted in the top surface of table 52. Gear 467 is constantly meshed with a gear 468 rigid with the lower end of a hollow sleeve 469 suitably mounted for rotation about the axis of the shaft 74. As illustrated in Figure 45, sleeve 469 is continuously rotatable entirely independent of the condition of rotation of table 72 and shaft 74. Sleeve 469 is suitably prevented from substantial axial movement with respect to shaft 74 and is formed with a grooved pulley 470 which, as illustrated in Figure 11, is drivingly connected as by a belt 471 to a suitably grooved pulley portion or rotatable holder 443 of upper brush 442. Thus motor 447 continuously drives both the upper and lower brushes.

As illustrated in Figure 45, the lower end of slidable sleeve 454 has secured thereto a laterally extending roller 472. Suitable cam tracks are provided for receiving and upwardly displacing roller 472, and consequently sleeve 454 and shaft 452 carried thereby, to raise brush 450 into the dotted line position illustrated in Figure 45 where it may traverse and brush the upper die surfaces. The elongated spline connection between shaft 452 and gear 466 maintains rotation of the brush during its entire vertical travel.

Referring now to Figures 43 and 44, two identical stationary cam tracks 473 and 474 are provided within base 50, these cam tracks facing outwardly and being adapted to accommodate roller 472.

Figure 8 illustrates cam track 473 as mounted adjacent the indent station 92 upon cradle 181, and cam track 474 as mounted adjacent the final compression station 94 upon cradle 178. Since roller 472 will enter the cam tracks only when the table 72 is moving and the cradles are at their lowermost position, roller 472 is aligned with each cam track prior to entry therein. Between these cam tracks, roller 472 is engaged by a stationary rail 475 which, as illustrated in Figure 45, prevents upward displacement of the brush except when it is positively moved upwardly by the cam tracks 473 and 474. The lowermost position of brush 450 is determined by gravity and rim 458.

Cam track 473 is located to receive and upwardly displace roller 472, before lower brush 450 traverses station 92 and then positively lower brush 450 to the full line position illustrated in Figure 45 intermediate stations 92 and 93 so that it will not interfere with the insert operation at station 93. Cam track 474 is designed to raise the brush between stations 93 and 94 and maintain it raised while traversing the station 94 and then positively lower the brush to the full position illustrated in Figure 45, after it has cleaned the lower surface of die part 166 in traversing station 94.

Preferably the entry point to track 473 is about halfway between stations 91 and 92, and the exit is about halfway between stations 92 and 93. Similarly the entry point to track 474 is preferably about halfway between stations 93 and 94 and the exit is about halfway between stations 94 and 95.

The above described or any equivalent suitable means for automatically raising the rotating lower brush into temporary contact with the soap contacting die surfaces of the upper die assemblies at stations 92 and 94 and positively lowering the brush prior to approach of the next station may be employed without departing from the spirit of the invention.

While, as above described, the upper and lower brushes are both driven from a common motor, the specific manner of driving these brushes is not important to the broader aspects of the invention.

I have found that by automatically brushing the die surfaces once during every revolution of the turn table the dies are maintained clean and free of soap film and fragments, whereby the new blank automatically assumes the same initial position as its predecessor and uniform treatment of all the blanks is assured during each cycle of operation.

Colored soap charging device

Soap reservoir 213 must be replenished periodically in order to permit constant operation of the machine, since every time one or more insert elements are formed from material taken out of the reservoir the level of the reservoir drops by that amount. In the apparatus about to be described, I have provided a preferred system for determining when the level of the reservoir approaches a predetermined low limit and for then automatically feeding into the reservoir a charge of colored soap in timed relation with the movement of the die assembly.

A preferred embodiment of such an automatic charging device is illustrated in Figures 46, 47 and 48. In practice a hopper (not shown) containing a supply of colored soap to be fed to the reservoir 213 may be provided on the upper part of the machine. Preferably the colored soap is in the form of cylindrical pellets such as illustrated at Figure 46 and the hopper is provided with an open bottom whereby the pellets are successively fed by gravity down an inclined chute 477 to a feed device which is automatically actuated to deposit a pellet into a reservoir 213 whenever it is needed.

Referring now to Figure 46, a fixture 470 secured to the top of base 50 at the rear of the machine is provided with a guide 478 in which a slide bar 479 is slidably mounted for horizontal reciprocation. Bar 479 (Figure 7) is connected at its rear end through pivot 481 to a link 482 which in turn is pivoted to the end of a lever 483 pivoted intermediate its ends on base 50 at 484 and provided with a cam follower 485 actuated by a grooved cylindrical cam 486 rigid and rotatable with shaft 65. The groove in cam 486 is so designed that, during each revolution of shaft 65, slide bar 479 reciprocates to the limit of its stroke to the left and then back to the full line position illustrated in Figure 46. Slide bar 479 is thus driven in timed relation with the rest of the automatic mechanism of the machine.

A second slide bar 487 is mounted within fixture 470 for horizontal reciprocation above and independently of slide 479 upon a horizontal guide surface indicated at 488. The horizontal guide structure for slide bars 479 and 487 may be of any suitable formation the only essential being that the two guide bars are parallelly independently slidable.

Slide bar 487 serves as a bottom closure for chute 477, and is further movable to deposit of a colored soap pellet in reservoir 213 when colored soap is called for. The front end of bar 487 is suitably apertured at 489 to receive the bottom pellet 476. The bottom of aperture 489, whose top is open to chute 477, is closed effectively by engagement of the pellet with an arcuate surface of the tip 491 of a release member 492 suitably slidably mounted on bar 487.

Release member 492 is provided with an upstanding end portion 493 disposed in a longitudinal guide slot 494 in bar 487. The rear of portion 493 is pocketed to provide a socket for one end of a compression spring 495 which extends along aperture 494 and is seated in a socket member 496 rigid with bar 487 at the other side of aperture 494. Spring 495 resiliently urges release member 492 into its normal extended position illustrated in Figure 46 where it supports a pellet in aperture 489. The depth of the pocket provided by aperture 489 is preferably such that the entire pellet therein is clear of the bottom of chute 477.

Rearwardly of aperture 494, bar 487 is provided with a rigid downwardly projecting pin 497 which is adapted to abut against a stop plate 498 suitably rigid with the front end of slide bar 479. A similar stop plate 499 is suitably rigid with the rear end of slide bar 479 forwardly of pivot 481, a space 501 being provided between opposing end faces of plates 498 and 499. Space 501 is of such length in the horizontal direction of stroke of bar 479 that, when the cam 486 has driven slide bar 479 to the limit of its stroke to the left in Figure 46, pin 497 remains out of contact with plate 499 and will therefore not provide a drive connection between bars 479 and 487. On the return stroke, the parts will merely reassume the position illustrated in Figure 46 with no movement of bar 487.

For automatically coupling bars 479 and 487 together, I provide a pin 502 vertically reciprocable in a hollow post on a carriage 503 rigid with bar 487. Pin 502 is normally urged downwardly towards space 501 by a compression spring 504 reacting between a socket on the top of pin 502 and a removable cap 505 on the top of post 503. Intermediate its ends, pin 502 is recessed at 506 to accommodate the ball end of a lever 507 pivoted on carriage 503 at 508. The other end of lever 507 is similarly seated in a recess 509 in a pin 511 vertically reciprocable in slide bar 487 and carriage 503 parallel to pin 502. Due to the simple lever connection between pins 502 and 511, they are oppositely reciprocable.

The upper end of pin 511 is formed with a flat horizontal face 512 and an inclined cam face 513. Abutment of face 512 with a corresponding flat face 514 on the bottom of a latch element 515 which is horizontally slidable at right angles to the direction of travel of bar 479 maintains pin 511 against rising vertically and holds the parts, as illustrated in Figure 46, against the action of spring 504. Latch 515 is slidably supported in a bracket 510 rigid with base 50 of the machine so that latch 515 is stationary with respect to the direction of stroke movement of bar 487. Latch element 515 is also formed with an inclined cam face 516 having the same inclination as face 513, for a purpose to be described.

Latch 515 must be shifted to enable spring 504 to depress pin 502 into space 501 and thereby establish a two-way driving connection between slide bars 479 and 487. As illustrated in Figure 48, latch 515 is formed with a notch 517 facing downwardly, and with an aperture 518 for receiving one end of a crank 519 pivoted on bracket 510 at 521. The other end of crank 519 is pivoted to the lower end of a link 522 having its upper end pivoted to the weighted armature assembly 523 of a solenoid 524 suitably rigidly supported on bracket 510 as by posts 520. When solenoid 524 is not energized, weighted armature 523 is maintained by gravity in the position illustrated in Figure 48, but when the winding of solenoid 524 is energized, armature 523 is pulled upward vertically to rock crank 519 and thereby slide latch 515 to the left in Figure 48 against the action of a compression spring 530 socketed in bracket 510. This shift locates notch 517 in alignment with the top of pin 511. Notch 517 is of such depth and size as to receive pin 511 and the latter under the urge of spring 504 will be displaced upwardly into the notch where it remains until positively retracted.

Upward movement of pin 511 results in downward movement of pin 502 into space 501, with the result that a solid drive connection is established between bars 479 and 487 and upon the next stroke to the left of bar 479 the latter will be drivingly coupled to bar 487 and both bars will move as a unit towards the dotted line position illustrated in Figure 10. This means that the bottom pellet 476 seated in the pocket of bar 487 is carried out over base 50 to be positioned above reservoir 213.

Referring again to Figure 46, before the end of the stroke of arm 479 to the left is reached, an adjustable stop pin 525 on the release member 492 engages a fixed stop 526 adjacent the lower end of chute 477 while bar 487 continues to move to the left, release member 492 is now arrested, lost motion between it and bar 487 being taken up by compression of spring 495, and tip 491 is displaced from the bottom of aperture 489 to enable the pellet carried by bar 487 to fall downward. As shown in dotted lines in Figure 10, the relative locations of stops 525 and 526 and the length of stroke of bar 479 are such that when this release action takes place bar 479 is at the inner end of its stroke and aperture 489 is located directly above reservoir 213, so that the colored soap pellet will fall directly into the reservoir. During the entire feed stroke of the slide bars, the top surface of bar 487 provides a closure for the bottom of chute 477.

Upon its return stroke, arm 479 will pick up bar 487 by reason of engagement of plate 498 with pin 497 and return the parts toward the position illustrated in Figure 46. Expansion of spring 495 returns the release member 492 to close the bottom of apertures 489 before that aperture reaches alignment with chute 477. Usually, as will later appear, the drive connection between bars 479 and 487 is preferably declutched after one complete stroke and to accomplish this I provide means for automatically withdrawing pin 502 from space 501 when the complete stroke has been accomplished.

The above described feed stroke takes place in timed relation with the operation of the lower die raising mechanism at the insert station, energization of solenoid 524 being controlled by a limit switch 527 having a depending switch button 528 as illustrated in Figure 17. An actuator arm 529 rigid with and depending from cylinder 215 is provided with a vertically adjustable stop button 531 adapted to engage button 528 of the switch.

As reservoir 213 depletes, the distance of upward stroke of the lower die member being controlled by fluid pressure increases sufficiently to insure full charging of the die at each stroke. As this stroke length increases, button 531 rigid with piston 215 progressively attains a higher level during each stroke. The parts are so arranged that when the level of colored soap in reservoir 213 has become so low as to require replenishing, button 531 will engage button 528 on its next up stroke and switch 527 is so electrically connected to solenoid 524 as to thereby energize the winding of solenoid 524 and raise armature 523 to shift latch 515 and lock the bars 479 and 487 together. Thus the insert station calls for soap by momentarily energizing solenoid 524. The solenoid is de-energized and armature 524 drops upon the down stroke of piston 215, but shifted latch 515 now prevents retraction of pin 502 and enables the above described feed of a pellet to reservoir 213 to take place.

During the rightward or return stroke of bar 479, the drive contact pressure is mainly between pin 497 and plate 498, so that pin 502 will be relatively free of drive pressure with plate 499 and may be readily withdrawn from space 501 to interrupt the drive connection between the two slide bars.

As the slide bars approach the limit of return stroke, to the right in Figure 46, inclined faces 513 and 516 become engaged and pin 511 is cammed downwardly out of notch 517 into the position illustrated in Figure 46. This movement of pin 511 forces pin 502 up into the retracted position illustrated in Figure 46. As soon as latch 515 is uncoupled from pin 511, spring 532 moves latch 515 to the right in Figure 48 to again lock pin 511 against upward movement. This operation is possible only when the solenoid is de-energized. An adjustable stop 540 on bracket 510 coacting with a mated stop 541 on carriage 530 determines the limit of return stroke of bar 487 and locates the parts for further similar operation.

In normal operation, the amount of material in each pellet 476 will be such as to almost completely fill cavity 213 so that only one stroke is needed to replenish the reservoir. Slide bar 487 not only comprises part of the feed and ejector mechanism for depositing a pellet in the reservoir but it automatically closes off the bottom end of the chute during the entire feed stroke and then enables the next pellet to drop into the aperture 489 when the stroke has been completed.

In the preferred embodiment, limit switch 527 is actuated only once to cause replenishment of the supply of colored soap in the reservoir. This is because, on the next upward stroke of cylinder 215 after the pellet has dropped into the reservoir, the travel of the piston is halted before the switch button is engaged.

I have therefore provided an automatic colored soap feeding and reservoir replenishing mechanism which is operable in timed relation to the colored soap insert forming mechanism by reason of its related cam drive therewith, and wherein actuation of the colored soap feed is controlled by a demand device responsive to the level of colored soap in the insert station reservoir on the machine. With this arrangement, supply of colored soap to the machine becomes automatic and may be maintained simply keeping a sufficient number of pellets in the hopper. It can be readily ascertained the length of time that a hopper full of pellets will continue to serve the machine.

While the above described mechanism has been identified specifically for feeding colored soap pellets to the reservoir, it may be employed for feeding pellets of the other material of which the insert is desired to be composed.

*Operation*

Freshly cut soap blanks are carried by conveyor 280 into the path of jaw 283 which is actuated as above described to periodically furnish a soap blank to swinging feed device 350. Feed device 350 operates to lay a soap blank in die box 96 at station 91 every time the table 72 stops, so that jaw 283 and feed device 350 each carry out their soap blank handling cycle five times for each complete revolution of table 72.

As the soap is intermittently carried from soap-in station 91 to soap-out station 95, the soap is compressed and indented at station 92, receives its colored insert at station 93, and is compressed to final shape at station 94. If desired, the otherwise smooth die surfaces may have additional formations for impressing further indicia in the soap surfaces.

The completed inlaid soap cake is removed at station 95 by swinging feed device 360 and transfer mechanism 290' operating in timed relation to each other and the turn table.

Operation of the machine is entirely automatic, being essentially cam controlled from the cams on shafts 71, 65 and 68 which are all driven continuously by a common power source, so that once the sequence has been established it remains fixed throughout operation.

In the invention, the soap blank is given approximately its final overall shape at station 92, where it is also formed with suitable cavities without any waste of soap, and positioned with its top surface at a predetermined reference level. That reference level is attained by the soap again when it is raised at the insert station and again when it is raised at the final compression station. This insures the provision of uniformly deep cavities and suitably disposed inserts in the soap cake regardless of slight variations in the amount of soap in each blank.

The lateral float of each die box 96 insures perfect alignment between the die members at each station and thereby insures that the insert elements are always accurately thrust into the cavities in the soap cake.

While I have described the automatic machine with reference only to formation of the letter O in the soap to avoid undue complexity in describing the die structure, it is apparent that the same principles apply to the formation of other letters, or designs, or combinations of either or both, and the die assemblies may be so constructed.

It will further be appreciated that features of the herein described machine are not essentially limited to soap or like inlay machines but are of more general application as may be ascertained from the scope of the claims herein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for making an inlaid product of soap or a like solid plastic substance comprising a hollow die member shaped to define a closed outline letter or figure, means for forcing said hollow die member into a body of said substance to form in a surface of said body a deep closed outline cavity corresponding to said die member, means for withdrawing said die member from said body, and means comprising an element relatively movable with respect to said hollow die member surrounded by said hollow die member for firmly backing said surface all along the cavity edges within said closed outline during said withdrawal to retain said substance within said closed outline integral with said body.

2. Apparatus for making an inlaid product of soap or like solid plastic material comprising means for compressing a body of said material and forcing into a surface thereof a die member adapted to form therein a relatively deep cavity of predetermined shape and size, means for charging an apertured die by indirect extrusion from a mass of solid plastic soap or like substance with an insert element of corresponding shape and dimensions, and means for bringing said charged die and said formed body into correspondence with said die aligned with said cavity operable to force said insert element into said cavity.

3. Apparatus for making an inlaid product of soap or like solid plastic material comprising a die member having two relatively movable parts, resilient means normally urging said parts away from each other, a hollow plunger rigid with one of said parts and slidably connected with the other of said parts adapted to project from said other part when said parts are moved toward each other against the force of said resilient means, and a stem rigid with said other die part slidable within said hollow plunger portion and adapted at its lower end to maintain contact with the surface of a body of said material penetrated by said plunger, said other die part sheathing the end of said plunger when said parts are normally separated by said resilient means.

4. Apparatus for making a preformed insert element of solid plastic material comprising a die member having a face adapted to contact a surface of a mass of said material and being formed with a recess shaped and dimensioned to correspond in section to said element, a plunger slidably mounted in said recess, said plunger terminating at said face and transversely filling said recess, said plunger being moved outwardly by extrusion of said material into said recess when said face and said surface are contacted under pressure, and means limiting outward movement of said plunger to control the length of the element extruded into said recess.

5. In the apparatus defined in claim 4, said plunger having a hollow portion defining a closed outline figure, and a stem rigid with said die member extending slidably through said plunger, said stem terminating in a face adapted to contact said surface of said mass during said extrusion operation.

6. Apparatus for making an inlaid soap product comprising a first die part having a recess defining a closed outline figure adapted to contain an insert element of solid plastic material, a hollow plunger slidable in said recess with one end adapted to contact with said element, a second die part means for moving said die parts toward and away from each other, means rigidly connecting said plunger and said second die part, a stem slidable within said hollow plunger, and means separate from said plunger and second die part secured to said stem, said plunger being adapted to force said element out of said recess when said die parts move toward each other.

7. In apparatus for compressing a body of solid plastic material, a die assembly having side walls and opposite relatively movable end walls, mechanical means for relatively advancing one of said end walls with respect to a die box unit composed of said side walls and the other of said end walls for partly compressing a body of said material within said die assembly, and subsequently acting fluid pressure means for completing compression of said body.

8. In apparatus for compressing and indenting solid plastic material, a die box part having side walls and a relatively movable end wall, a resiliently mounted separable other end wall for said die box, a cavity forming plunger slidably mounted for projection through said other end wall, mechanical means for relatively moving said die box part and said other end wall to enclose and partly compress a body of said material, said plunger being adapted to penetrate and indent a surface of said body during said operation, and subsequently acting fluid pressure means for relatively moving said one end wall and said side walls for completing said compression and indentation of said body.

9. In the apparatus defined in claim 8, means for arresting said relative movement of said die box unit and said other end wall for predetermining the depth of penetration of said plunger into said body.

10. In the apparatus defined in claim 8, means for locking said side walls and said one end wall in the furthermost position of said relative movement therebetween for prelocating said surface of said body in a predetermined plane.

11. In the apparatus defined in claim 8, means providing relative float between said die box unit and said other wall in a direction substantially normal to said relative movements to insure accurate alignment therebetween.

12. In apparatus for depositing an insert element of solid plastic material in a similarly formed deep surface cavity in a body of solid plastic material, a die box for said body, a hollow die for said insert element, means for charging said hollow die with said insert element at a station remote from said die box, means for bringing said hollow die and said body into adjacent relation with said element in alignment with said cavity, means for moving said die box and hollow die toward each other, and means for ejecting said insert from said hollow die and into the cavity in said body during said movement.

13. In apparatus for depositing an insert element of solid plastic material in a similarly formed deep surface cavity in a body of solid plastic material, a die member having a recess adapted to contain said element, a plunger slidably mounted in said recess adapted to have an end in contact with said element, means supporting said die member at a charging station and at a discharging station, a reservoir adapted to contain solid material for said element, means for relatively moving said die member at said charging station and said reservoir to bring said die member into contact with solid material in said reservoir for charging said recess with said element by indirect extrusion from the solid material in said reservoir, a support for said body of solid plastic material, means for moving said charged die member from said charging station to said discharging station adjacent said support with said insert aligned with said cavity, and means for relatively moving said plunger and die member to eject said element from said die member into said cavity.

14. In the apparatus defined in claim 13, said plunger being hollow to define a closed outline figure, and a stem operatively connected with said die member and slidably surrounded by said plunger.

15. Apparatus for making an inlaid product of solid plastic material comprising an intermittently movable turret rotatable about a vertical axis, a plurality of open top die boxes on said turret adapted to be stopped at a plurality of stations in succession, means for depositing a body of said material in each die box at a first station, means for compressing said body and indenting it with a cavity of predetermined shape and size at a second station, means for placing a preformed insert element of solid plastic material of substantially said shape and size within the cavity at a further insert station, means for compressing said inlaid body at a still further station, and means at a succeeding discharge station for removing the inlaid body from the die box.

16. The apparatus defined in claim 15 in which the means at the insert station comprises an intermittently driven synchronized turret carrying a plurality of dies for forming said insert elements at a charging station and carrying them to said insert station in timed relation with the movement of said die boxes.

17. Apparatus for pressing solid plastic material comprising an intermittently movable horizontal conveyor adapted to be indexed at successive stations, a plurality of spaced upper die members in said apparatus fixedly located at certain of said stations, a plurality of cooperating lower die boxes each serving as a receptacle for a body of said material mounted for vertical reciprocation on said conveyor, and means operable in timed relation with said intermittent movement of said conveyor for simultaneously raising said lower die boxes into operative relation with said upper die members when said conveyor is stopped.

18. The apparatus defined in claim 17, wherein said upper die members and said die boxes have interengaging parts and have relative lateral float providing accurate registry at said stations.

19. In the article handling apparatus defined in claim 17, a die cleaning member carried by the conveyor and a second die cleaning member stationary on said apparatus, and means operable in timed relation with intermittent movement of said conveyor for periodically causing relative vertical movement between each die cleaning member and a die surface to be engaged and cleaned thereby.

20. In apparatus for working solid plastic material, an intermittently movable horizontal conveyor adapted to be stopped at a series of stations in succession, a plurality of vertically movable members on said conveyor each adapted to support a body of said material and adapted to be indexed at a station when the conveyor stops, a plurality of elevators disposed at a plurality of said stations and adapted to be coupled to said members when the latter arrive at said stations, and means operable in timed relation with said intermittent movement of said conveyor for simultaneously raising and lowering said elevators during each dwell period of said conveyor.

21. In a die assembly for compressing and reshaping a body of plastic material such as soap, a pair of relatively movable die members adapted to be brought together to define an enclosing space in which is located said body of material, mechanically actuated means for bringing the die members together during the initial phase of said compression and reshaping operation, and sequentially acting fluid pressure means for forcing the die members together with increased force for completion of said operation.

22. In apparatus for pressing solid plastic material, a die box adapted to receive a body of said material and having a movable bottom wall, a support for said die box, elevator mechanism adapted to raise and lower said die box support, fluid pressure responsive means carried by said elevator mechanism operative to raise said bottom wall with respect to said die box, and means for maintaining said bottom wall at the upper limit of its travel relative to said die box.

23. A die assembly for pressing solid plastic material comprising a support, an open top die box mounted for lateral floating movement on said support, means for raising and lowering said support, and means for independently raising and lowering the bottom wall of said die box.

24. In a die assembly for pressing solid plastic material an open-ended die box formed with an internal aperture, a bottom wall member slidable within said aperture, interconnected supports for said die box and bottom member, means for moving both said supports as a unit in one direction for advancing the die member toward a cooperating die member providing the top wall for said die box, means between said supports for permitting relative movement of said die box and bottom member in said direction when movement of one is resisted by said cooperating die member, said last named means being operable to lock said supports together in their relative displaced conditions at the end of said advancing movement and functioning to locate a surface of a body of said material in said die box in a reference plane.

25. In the die member defined in claim 24, means in said connection between said supports permitting their relative movement to advance said bottom wall member through said aperture for ejecting a body of said material from said die box.

26. In apparatus for pressing solid plastic material an intermittently rotatable conveyor carrying a plurality of die members, a cleaning member movably mounted on said conveyor, a relatively stationary die surface mounted adjacent said conveyor adapted to successively cooperate with said die members on said conveyor, and means operated in timed relation with intermittent rotation of the conveyor for advancing said cleaning member into contact with said die surface after each pressing operation.

27. In apparatus for operating on cakes of solid plastic material an intermittently driven conveyor to index cakes in succession at a plurality of stations, a swinging feed device pivotally mounted adjacent to said conveyor, said device being adapted to lift successive cakes from a feed line and deposit them on said conveyor, means operable in timed relation to the intermittent movement of the conveyor for operating said swinging feed device to deposit successive cakes of said material upon the conveyor at the initial station, a second swinging feed device pivotally mounted adjacent to said conveyor and adapted to remove cakes from said conveyor and deposit them on a take-away line, and means operable in timed relation to said intermittent movement of the conveyor for operating said second swinging feed device to remove said cakes from said conveyor at the final station.

28. In apparatus for making an inlaid product of solid plastic material, means for forming a cavity of predetermined shape and size in a body of said material, a reservoir adapted to contain a supply of insert material, means for extracting from the supply of material in said reservoir by indirect extrusion an element of said material having substantially said shape and size of the cavity and thrusting it into said cavity, and means responsive to the amount of said material in the reservoir for periodically replenishing the supply of said insert material in said reservoir.

29. Apparatus for preforming an element of solid plastic material comprising a reservoir adapted to contain a supply of said material, a recessed die member, pressure means for engaging said die member with material in said reservoir for forming said element within the recess of said die member by indirect extrusion, and means responsive to the amount of said material in said reservoir for replenishing said material in the reservoir.

30. The apparatus defined in claim 29, wherein said die member is stationary during formation of said element and said reservoir is mounted for reciprocation toward and away from said die member, and said material replenishing means is responsive to the length of stroke of said reservoir toward said die member.

31. The apparatus defined in claim 29, wherein said material replenishing means comprises a switch actuated by greater relative movement of said die member and reservoir than a predetermined limit, a solenoid in circuit with said switch, and a material dispensing device operated by said solenoid.

32. The method of forming an insert element of solid plastic material in a die having a deep surface recess which comprises subjecting a mass of said material to compressive force generated by relative movement of said die and a confined mass of said material against each other to compress said material until said recess becomes filled with said material and thereby forms said element, and then breaking said element from the remaining material mass by separational movement of said die relative to said material.

33. Apparatus for forming an insert element of solid plastic material of predetermined shape and size comprising means for compressing a mass of said solid plastic material within an enclosing die having a wall portion mounted for controlled displacement in response to said compression to provide a material receiving aperture of said shape and size in the die wall, and means limiting said displacement to accurately control the length of the insert element of said material extruded into said aperture.

PENROSE R. HOOPES.

REFERENCES CITED

The following references are of record in the file of this patent:

UNITED STATES PATENTS

| Number | Name | Date |
|---|---|---|
| 604,590 | McColl | May 24, 1898 |
| 1,524,877 | Norton | Feb. 3, 1925 |
| 1,692,322 | Aiken | Nov. 20, 1928 |
| 2,179,853 | Jones | Nov. 14, 1939 |
| 2,271,979 | Jones | Feb. 3, 1942 |
| 2,292,359 | Block | Aug. 11, 1942 |
| 2,423,576 | Block | July 8, 1947 |

FOREIGN PATENTS

| Number | Country | Date |
|---|---|---|
| 1,576 | Great Britain | of 1897 |
| 1,877 | Great Britain | of 1913 |